US012502407B2

(12) United States Patent
Moseley et al.

(10) Patent No.: US 12,502,407 B2
(45) Date of Patent: Dec. 23, 2025

(54) TREATMENT OF FISTULA WITH BONE MARROW MESENCHYMAL STEM CELL DERIVED EXTRACELLULAR VESICLES

(71) Applicant: Direct Biologics, LLC, Austin, TX (US)

(72) Inventors: Timothy Alexander Moseley, Fallbrook, CA (US); Kenneth Allen Pettine, Fort Collins, CO (US)

(73) Assignee: Direct Biologics, LLC, Austin, TX (US)

( * ) Notice: Subject to any disclaimer, the term of this patent is extended or adjusted under 35 U.S.C. 154(b) by 0 days.

(21) Appl. No.: 19/205,490

(22) Filed: May 12, 2025

(65) Prior Publication Data

US 2025/0332200 A1 Oct. 30, 2025

Related U.S. Application Data

(63) Continuation of application No. PCT/US2024/026444, filed on Apr. 26, 2024.

(60) Provisional application No. 63/638,807, filed on Apr. 25, 2024.

(51) Int. Cl.
*A61K 35/28* (2015.01)
*C12N 5/0775* (2010.01)

(52) U.S. Cl.
CPC ............ *A61K 35/28* (2013.01); *C12N 5/0663* (2013.01); *C12N 2500/02* (2013.01)

(58) Field of Classification Search
None
See application file for complete search history.

(56) References Cited

U.S. PATENT DOCUMENTS

| | | | |
|---|---|---|---|
| 3,610,795 A | 10/1971 | Antoine et al. |
| 4,897,355 A | 1/1990 | Eppstein et al. |
| 5,135,917 A | 8/1992 | Burch et al. |
| 5,712,163 A | 1/1998 | Parenteau et al. |
| 6,410,588 B1 | 6/2002 | Feldmann et al. |
| 7,029,666 B2 | 4/2006 | Bruder et al. |
| 8,021,882 B2 | 9/2011 | Johnstone et al. |
| 8,057,789 B2 | 11/2011 | Hariri |
| 8,372,797 B2 | 2/2013 | Ichim |
| 8,703,710 B2 | 4/2014 | Dzau et al. |
| 8,778,416 B2 | 7/2014 | Cohen |
| 9,408,874 B2 | 8/2016 | Pettine |
| 9,744,130 B2 | 8/2017 | Lipp et al. |
| 9,856,455 B2 | 1/2018 | March et al. |
| 9,980,984 B2 | 5/2018 | Pettine |
| 10,456,425 B2 | 10/2019 | Herrera Sanchez et al. |
| 10,744,160 B2 | 8/2020 | Sokolov et al. |
| 10,881,693 B2 | 1/2021 | Alford |
| 11,376,283 B2 | 7/2022 | Sokolov et al. |
| 11,529,306 B2 | 12/2022 | Yi et al. |
| 12,213,995 B2 | 2/2025 | Pettine et al. |
| 12,233,092 B2 | 2/2025 | Aricha et al. |
| 2004/0248970 A1 | 12/2004 | Webster et al. |
| 2007/0254827 A1 | 11/2007 | Sutton et al. |
| 2008/0241112 A1 | 10/2008 | Westenfelder |
| 2009/0177487 A1 | 7/2009 | Eerkes |
| 2010/0178274 A1 | 7/2010 | Sekiya et al. |
| 2011/0003008 A1 | 1/2011 | Lim |
| 2011/0014251 A1 | 1/2011 | Ray |
| 2012/0064049 A1 | 3/2012 | Hunziker |
| 2013/0115198 A1 | 5/2013 | Hoffmann et al. |
| 2013/0129688 A1 | 5/2013 | Brenner et al. |
| 2013/0195899 A1 | 8/2013 | Ichim et al. |
| 2013/0210725 A1 | 8/2013 | Naughton et al. |
| 2013/0236427 A1 | 9/2013 | Pernock |
| 2014/0004601 A1 | 1/2014 | Lim |
| 2014/0065240 A1 | 3/2014 | Mitsialis et al. |
| 2014/0220053 A1 | 8/2014 | Muraca et al. |
| 2015/0086513 A1 | 3/2015 | Savkovic et al. |
| 2015/0125950 A1 | 5/2015 | Lim et al. |
| 2016/0113967 A1 | 4/2016 | Hedrick et al. |
| 2016/0263160 A1 | 9/2016 | Nolta et al. |
| 2016/0281045 A1 | 9/2016 | McCall et al. |
| 2017/0051359 A1 | 2/2017 | Pegtel et al. |
| 2017/0055561 A1 | 3/2017 | Naughton et al. |
| 2017/0107488 A1 | 4/2017 | Petcavich |
| 2017/0166864 A1 | 6/2017 | Kihm et al. |
| 2017/0189449 A1 | 7/2017 | Lim |
| 2017/0304368 A1 | 10/2017 | Marban et al. |
| 2018/0100149 A1 | 4/2018 | Marbán et al. |
| 2018/0214489 A1 | 8/2018 | Riordan |
| 2018/0242590 A1 | 8/2018 | Friedman |

(Continued)

FOREIGN PATENT DOCUMENTS

| | | |
|---|---|---|
| AU | 2004203482 A1 | 8/2004 |
| CA | 2880404 A1 | 2/2014 |

(Continued)

OTHER PUBLICATIONS

360 Health Alert Newsletter: 2023 Research: Advanced use of Extracellular Vesicles for Today's Top Chronic Disorders (2023).
Aatonen, Maria. et al. Isolation and Characterization of Platelet-derived Extracellular Vesicles. Journal of Extracellular Vesicles 3:1-15 (2014).
Abraham et al.: Mesenchymal stem cell-derived extracellular vesicles for the treatment of acute respiratory distress syndrome. Stem Cells Transl Med. 9(1):28-38 (2019).
Aggarwal, Sudeepta. et al. Human mesenchymal stem cells modulate allogeneic immune cell responses. Blood 105(4):1815-1822 (2005).

(Continued)

*Primary Examiner* — Blaine Lankford
(74) *Attorney, Agent, or Firm* — Wilson Sonsini Goodrich & Rosati

(57) ABSTRACT

Disclosed are methods of treating perianal fistula a subject by administering a therapeutic MSC secretome product made by a method comprising culturing bone marrow-derived MSCs under conditions that include oxygen tension below 5% and a culture media with a pH below 7.

19 Claims, No Drawings

(56) References Cited

U.S. PATENT DOCUMENTS

| | | |
|---|---|---|
| 2018/0264043 A1 | 9/2018 | Pettine et al. |
| 2018/0282762 A1 | 10/2018 | Gori |
| 2018/0318356 A1 | 11/2018 | Pettine et al. |
| 2018/0338866 A1 | 11/2018 | Kharazmi |
| 2019/0000886 A1 | 1/2019 | Ross |
| 2019/0015331 A1 | 1/2019 | Elliman et al. |
| 2019/0046576 A1 | 2/2019 | Gangaraju et al. |
| 2019/0133922 A1 | 5/2019 | Kang et al. |
| 2019/0195863 A1 | 6/2019 | Brivanlou et al. |
| 2019/0209665 A1 | 7/2019 | Pluchino et al. |
| 2019/0269739 A1 | 9/2019 | Brodie et al. |
| 2019/0328792 A1 | 10/2019 | Traweger et al. |
| 2019/0330594 A1 | 10/2019 | You et al. |
| 2020/0030253 A1 | 1/2020 | Kharazmi |
| 2020/0316226 A1 | 10/2020 | Marban et al. |
| 2020/0325452 A1 | 10/2020 | Alford |
| 2020/0360443 A1 | 11/2020 | Sokolov et al. |
| 2021/0000882 A1 | 1/2021 | Coronado |
| 2021/0030807 A1 | 2/2021 | Aricha et al. |
| 2021/0035368 A1 | 2/2021 | Schouela et al. |
| 2021/0038652 A1 | 2/2021 | Naughton et al. |
| 2021/0128627 A1 | 5/2021 | Aricha et al. |
| 2021/0169939 A1 | 6/2021 | Ilagan et al. |
| 2021/0196759 A1 | 7/2021 | Moseley et al. |
| 2021/0228643 A1 | 7/2021 | Bobis-Wozowicz et al. |
| 2021/0254056 A1 | 8/2021 | Liu et al. |
| 2021/0267892 A1 | 9/2021 | Machluf et al. |
| 2021/0299036 A1 | 9/2021 | Naughton |
| 2021/0348114 A1 | 11/2021 | Hudson et al. |
| 2021/0363525 A1 | 11/2021 | Saetrom et al. |
| 2021/0369617 A1 | 12/2021 | Alford |
| 2022/0000932 A1 | 1/2022 | Zhang et al. |
| 2022/0023347 A9 | 1/2022 | Mitsialis et al. |
| 2022/0079987 A1 | 3/2022 | Pettine |
| 2022/0079990 A1 | 3/2022 | Moseley et al. |
| 2022/0096560 A1 | 3/2022 | Mitsialis et al. |
| 2022/0110970 A1 | 4/2022 | Jhan et al. |
| 2022/0125848 A1 | 4/2022 | Pettine et al. |
| 2022/0136011 A1 | 5/2022 | Kalluri |
| 2022/0136053 A1 | 5/2022 | Pettine et al. |
| 2022/0151934 A1 | 5/2022 | Ridall et al. |
| 2022/0152151 A1 | 5/2022 | Pettine |
| 2022/0175843 A1 | 6/2022 | Westenfelder et al. |
| 2022/0195384 A1 | 6/2022 | Kim et al. |
| 2022/0195390 A1 | 6/2022 | Uzan et al. |
| 2022/0202871 A1 | 6/2022 | Pettine |
| 2022/0218755 A1 | 7/2022 | Ilagan et al. |
| 2022/0249699 A1 | 8/2022 | Guild et al. |
| 2022/0264872 A1 | 8/2022 | March et al. |
| 2022/0273725 A1 | 9/2022 | Ochiya |
| 2022/0387518 A1 | 12/2022 | Mishra et al. |
| 2023/0000954 A1 | 1/2023 | Alford et al. |
| 2023/0002476 A1 | 1/2023 | Alford et al. |
| 2023/0013636 A1 | 1/2023 | Kalluri |
| 2023/0105667 A1 | 4/2023 | Brodie |
| 2023/0142496 A1 | 5/2023 | Cheng |
| 2023/0143893 A1 | 5/2023 | Bird et al. |
| 2023/0159932 A1* | 5/2023 | Pettine .............. A61K 38/1709 424/450 |
| 2023/0172990 A1 | 6/2023 | Ohneda et al. |
| 2023/0181649 A1 | 6/2023 | Hariri et al. |
| 2023/0190818 A1 | 6/2023 | Jurga |
| 2023/0226267 A1 | 7/2023 | Madelska |
| 2023/0248773 A1 | 8/2023 | Jurga |
| 2023/0257712 A1* | 8/2023 | Jurga .................. C12N 5/0665 435/325 |
| 2023/0310507 A1 | 10/2023 | Lebovits et al. |
| 2023/0313144 A1 | 10/2023 | Yoshimura et al. |
| 2023/0313191 A1 | 10/2023 | Hicok et al. |
| 2024/0197832 A1 | 6/2024 | Hu et al. |
| 2025/0186501 A1 | 6/2025 | Pettine et al. |
| 2025/0277217 A1 | 9/2025 | Pettine et al. |

FOREIGN PATENT DOCUMENTS

| | | |
|---|---|---|
| CN | 104622904 A | 5/2015 |
| CN | 108042572 A | 5/2018 |
| CN | 108498452 A | 9/2018 |
| CN | 111150743 A | 5/2020 |
| CN | 109718392 B | 11/2021 |
| CN | 118806794 A | 10/2024 |
| EP | 2533859 A1 | 12/2012 |
| EP | 2582791 A2 | 4/2013 |
| EP | 2687219 A1 | 1/2014 |
| EP | 2296672 B1 | 9/2015 |
| EP | 2683389 B1 | 5/2017 |
| EP | 2877187 B1 | 6/2019 |
| EP | 3492585 A1 | 6/2019 |
| EP | 3515474 A1 | 7/2019 |
| EP | 3568143 A1 | 11/2019 |
| EP | 3668319 A1 | 6/2020 |
| EP | 3672606 A1 | 7/2020 |
| EP | 3723773 A1 | 10/2020 |
| EP | 3402489 B1 | 6/2021 |
| EP | 3920889 A1 | 12/2021 |
| EP | 3952892 A1 | 2/2022 |
| EP | 4003305 A1 | 6/2022 |
| EP | 4069205 A1 | 10/2022 |
| EP | 4069826 A1 | 10/2022 |
| EP | 4132546 A2 | 2/2023 |
| EP | 4146247 A1 | 3/2023 |
| EP | 4178591 A1 | 5/2023 |
| EP | 4180050 A1 | 5/2023 |
| EP | 4181935 A1 | 5/2023 |
| JP | 2008544957 A | 12/2008 |
| JP | 2016065106 A | 4/2016 |
| JP | 2017180553 A | 10/2017 |
| JP | 2018538132 A | 12/2018 |
| JP | WO2019235362 A1 | 7/2021 |
| JP | 2024524472 A | 7/2024 |
| KR | 20180023865 A | 3/2018 |
| KR | 20180127280 A | 11/2018 |
| WO | WO-03051331 A1 | 6/2003 |
| WO | WO-2006036213 A2 | 4/2006 |
| WO | WO-2006071011 A1 | 7/2006 |
| WO | WO-2009105044 A1 | 8/2009 |
| WO | WO-2009150199 A1 | 12/2009 |
| WO | WO-2012061537 A2 | 5/2012 |
| WO | WO-2012125471 A1 | 9/2012 |
| WO | WO-2012142569 A2 | 10/2012 |
| WO | WO-2012174282 A2 | 12/2012 |
| WO | WO-2013006327 A1 | 1/2013 |
| WO | WO-2013090523 A2 | 6/2013 |
| WO | WO-2013150303 A1 | 10/2013 |
| WO | WO-2013159091 A2 | 10/2013 |
| WO | WO-2014005183 A1 | 1/2014 |
| WO | WO-2015031110 A2 | 3/2015 |
| WO | WO-2015048842 A1 | 4/2015 |
| WO | WO-2016082882 A1 | 6/2016 |
| WO | WO-2016149358 A1 | 9/2016 |
| WO | WO-2016156865 A1 | 10/2016 |
| WO | WO-2017001649 A1 | 1/2017 |
| WO | WO-2017023689 A1 | 2/2017 |
| WO | WO-2017076924 A1 | 5/2017 |
| WO | WO-2017117585 A1 | 7/2017 |
| WO | WO-2017122095 A1 | 7/2017 |
| WO | WO-2017123022 A1 | 7/2017 |
| WO | WO-2017139795 A1 | 8/2017 |
| WO | WO-2017196798 A1 | 11/2017 |
| WO | WO-2017218846 A1 | 12/2017 |
| WO | WO-2018038575 A1 | 3/2018 |
| WO | WO-2018078524 A1 | 5/2018 |
| WO | WO-2018083700 A1 | 5/2018 |
| WO | WO-2018102696 A1 | 6/2018 |
| WO | WO-2018130554 A1 | 7/2018 |
| WO | WO-2018131003 A1 | 7/2018 |
| WO | WO-2018131900 A2 | 7/2018 |
| WO | WO-2018144637 A1 | 8/2018 |
| WO | WO-2018150440 A1 | 8/2018 |
| WO | WO-2018162696 A1 | 9/2018 |
| WO | WO-2018204889 A1 | 11/2018 |
| WO | WO-2018208670 A1 | 11/2018 |

(56) References Cited

FOREIGN PATENT DOCUMENTS

| | | |
|---|---|---|
| WO | WO-2018211510 A1 | 11/2018 |
| WO | WO-2018226758 A2 | 12/2018 |
| WO | WO-2019035880 A1 | 2/2019 |
| WO | WO-2019040896 A1 | 2/2019 |
| WO | WO-2019099955 A1 | 5/2019 |
| WO | WO-2019118817 A1 | 6/2019 |
| WO | WO-2019143847 A1 | 7/2019 |
| WO | WO-2019152522 A1 | 8/2019 |
| WO | WO-2019161590 A1 | 8/2019 |
| WO | WO-2019217091 A1 | 11/2019 |
| WO | WO-2019222170 A1 | 11/2019 |
| WO | WO-2019231562 A1 | 12/2019 |
| WO | WO-2019235362 A1 | 12/2019 |
| WO | WO-2020021312 A1 | 1/2020 |
| WO | WO-2020030750 A1 | 2/2020 |
| WO | WO-2020061408 A1 | 3/2020 |
| WO | WO-2020081859 A1 | 4/2020 |
| WO | WO-2020139975 A1 | 7/2020 |
| WO | WO-2020142769 A1 | 7/2020 |
| WO | WO-2020160342 A1 | 8/2020 |
| WO | WO-2020163705 A1 | 8/2020 |
| WO | WO-2020163803 A1 | 8/2020 |
| WO | WO-2020172270 A1 | 8/2020 |
| WO | WO-2020182938 A1 | 9/2020 |
| WO | WO-2020210248 A1 | 10/2020 |
| WO | WO-2020223349 A1 | 11/2020 |
| WO | WO-2020230954 A1 | 11/2020 |
| WO | WO-2020251181 A1 | 12/2020 |
| WO | WO-2020257720 A1 | 12/2020 |
| WO | WO-2021009660 A1 | 1/2021 |
| WO | WO-2021011935 A1 | 1/2021 |
| WO | WO-2021016368 A1 | 1/2021 |
| WO | WO-2021016727 A1 | 2/2021 |
| WO | WO-2021113299 A1 | 6/2021 |
| WO | WO-2021113761 A1 | 6/2021 |
| WO | WO-2021147923 A1 | 7/2021 |
| WO | WO-2021177473 A1 | 9/2021 |
| WO | WO-2021181399 A1 | 9/2021 |
| WO | WO-2021195154 A1 | 9/2021 |
| WO | WO-2021207282 A2 | 10/2021 |
| WO | WO-2021216903 A1 | 10/2021 |
| WO | WO-2021221471 A1 | 11/2021 |
| WO | WO-2021226108 A1 | 11/2021 |
| WO | WO-2021262879 A1 | 12/2021 |
| WO | WO-2022008654 A1 | 1/2022 |
| WO | WO-2022008657 A1 | 1/2022 |
| WO | WO-2022018729 A1 | 1/2022 |
| WO | WO-2022050373 A1 | 3/2022 |
| WO | WO-2022076419 A1 | 4/2022 |
| WO | WO-2022096708 A1 | 5/2022 |
| WO | WO-2022150696 A1 | 7/2022 |
| WO | WO-2022150839 A1 | 7/2022 |
| WO | WO-2022174079 A1 | 8/2022 |
| WO | WO-2022190091 A1 | 9/2022 |
| WO | WO-2022251167 A2 | 12/2022 |
| WO | WO-2022261636 A1 | 12/2022 |
| WO | WO-2022265864 A2 | 12/2022 |
| WO | WO-2022266399 A1 | 12/2022 |
| WO | WO-2023004087 A2 | 1/2023 |
| WO | WO-2023275164 A1 | 1/2023 |
| WO | WO-2023278883 A1 | 1/2023 |
| WO | WO-2023281524 A1 | 1/2023 |
| WO | WO-2023282424 A1 | 1/2023 |
| WO | WO-2023021525 A1 | 2/2023 |
| WO | WO-2023024637 A1 | 3/2023 |
| WO | WO-2023033500 A1 | 3/2023 |
| WO | WO-2023064555 A1 | 4/2023 |
| WO | WO-2023075557 A1 | 5/2023 |
| WO | WO-2023082012 A1 | 5/2023 |
| WO | WO-2023091904 A1 | 5/2023 |
| WO | WO-2023123216 A1 | 7/2023 |
| WO | WO-2023127645 A1 | 7/2023 |
| WO | WO-2023164241 A1 | 8/2023 |
| WO | WO-2023192916 A2 | 10/2023 |
| WO | WO-2023200882 A1 | 10/2023 |
| WO | WO-2024030909 A1 | 2/2024 |
| WO | WO-2024192119 A1 | 9/2024 |
| WO | WO-2024254459 A2 | 12/2024 |
| WO | WO-2024254540 A2 | 12/2024 |
| WO | WO-2025101653 A1 | 5/2025 |
| WO | WO-2025101658 A1 | 5/2025 |
| WO | WO-2025101659 A1 | 5/2025 |
| WO | WO-2025101663 A1 | 5/2025 |

OTHER PUBLICATIONS

Alam et al., An osteopontin-derived peptide inhibits human hair growth at least in part by decreasing fibroblast growth factor-7 production in outer root sheath keratinocytes. Br J Dermatol 182(6):1404-1414 (2020).

Alipoor, Shamila D. et al. Exosomes and Exosomal miRNA in Respiratory Diseases. Mediators Inflamm 2016:5628404, 1-11 (2016).

Allison, Malorye. Genzyme backs Osiris, despite Prochymal flop. Nature Biotechnology 27(11):966-967 (2009).

Anderson, Monique R. et al. Exosomes in Viral Disease. Neurotherapeutics 13(3):535-546 (2016).

Arima, Ken. et al. Autologous Transplantation of Bone Marrow Mononuclear Cells Improved Ischemic Peripheral Neuropathy in Humans. Journal of the American College of Cardiology 56(3):238-239 (2010).

Attur, Mukundan et al. Interleukin 1 receptor antagonist (IL1RN) gene variants predict radiographic severity of knee osteoarthritis and risk of incident disease. Annals of the rheumatic diseases 79(3):400-407 (2020). Published online Dec. 18, 2019.

Atwell, Karina. et al. Diagnosis and Management of Hypermobility Spectrum Disorders in Primary Care. The Journal of the American Board of Family Medicine 34(4):838-848 (2021).

Aversa et al., Platelet-derived growth factor (PDGF) and PDGF receptors in rat corpus cavernosum: changes in expression after transient in vivo hypoxia. J Endocrinol. 170(2):395-402 (2001).

Baberg, Falk. et al. Secretome analysis of human bone marrow derived mesenchymal stromal cells. Biochimica et Biophysica Acta (BBA)-Proteins and Proteomics 1867(4):434-441 (2019).

Backlund, Lena. et al. Cognitive manic symptoms associated with the P2RX7 gene in bipolar disorder. Bipolar disorders 13(5-6):500-508 (2011).

Bagshawe, K. D., et al. A cytotoxic agent can be generated selectively at cancer sites. British Journal of Cancer 58(6):700-703 (1988).

Bagshawe, K. D. Towards generating cytotoxic agents at cancer sites. The First Bagshawe Lecture. Br. J. Cancer 60:275-281 (1989).

Ball et al., Arthroscopic treatment of post-traumatic elbow contracture. Journal of Shoulder and Elbow Surgery 11(6):624-629 (2002).

Barbash, Israel M. et al. Systemic delivery of bone marrow-derived mesenchymal stem cells to the infarcted myocardium: feasibility, cell migration, and body distribution. Circulation 108(7):863-868 (2003).

Bari et al.: Mesenchymal Stromal Cell Secretome for Severe COVID-19 Infections: Premises for the Therapeutic Use. Cells. 9(924):1-5 (2020).

Barnett, J H, and J W Smoller. The genetics of bipolar disorder. Neuroscience 164(1):331-343 (2009).

Barnhoorn, Marieke C. et al. Long-term Evaluation of Allogeneic Bone Marrow-derived Mesenchymal Stromal Cell Therapy for Crohn's Disease Perianal Fistulas. Journal of Crohn's and Colitis 14(1):64-70 (2020).

Bartaula-Brevik et al.: Secretome of Mesenchymal Stem Cells Grown in Hypoxia Accelerates Wound Healing and Vessel Formation In Vitro. International Journal of Stem Cell Research and Therapy. 4(1):1-9 (2017).

Bartholomew, Amelia. et al. Mesenchymal stem cells suppress lymphocyte proliferation in vitro and prolong skin graft survival in vivo. Exp Hematol 30(1): 42-48 (2002).

Bassir, Seyed Hossein et al. Potential for Stem Cell-based Periodontal Therapy. Journal of Cellular Physiology 231(1):50-61 (2016).

Batch et al., Identification and localization of insulin-like growth factor-binding protein (IGFBP) messenger RNAs in human hair follicle dermal papilla. J Invest Dermatol. 106(3):471-475 (1996).

(56) References Cited

OTHER PUBLICATIONS

Battelli et al., T lymphocyte killing by a xanthine-oxidase-containing immunotoxin. Cancer Immunology, Immunotherapy 35(6):421-425 (1992).
Behr, Luc. et al. Intra renal arterial injection of autologous mesenchymal stem cells in an ovine model in the postischemic kidney. Nephron Physiology 107(3):p. 65-p. 76 (2007).
Beitzel et al., The future role of mesenchymal stem cells in the management of shoulder disorders. Arthroscopy 29(10):1702-1711 (2013).
Bender et al.: Intra-Articular Injection of an Extracellular Vesicle Isolate to Treat Shoulder Osteoarthritis in an Athlete. J Regen Biol Med. 2(1):1-6 (2020).
Bender et al.: Treatment of Elbow Arthritis with a Bone Marrow derived Mesenchymal Stem Cell Extracellular Vesicle Isolate Product. J Orthop Study Sports Med. 1(1):1-6 (2021).
Bertolini et al., Abnormal interactions between perifollicular mast cells and CD8+ T-cells may contribute to the pathogenesis of alopecia areata. PLoS ONE. 9:e94260 (2014).
Bisaga et al., The use of mesenchymal stem cells in optic nerve atrophy in patients with multiple sclerosis: a pilot study. Annals of Clinical and Experimental Neurology 11(2):201 [2201] (2017).
Biswas et al., Primary and secondary arthritis of the elbow. Arthritis. May 27, 2013, (2013).
Black et al., Effect of adipose-derived mesenchymal stem and regenerative cells on lameness in dogs with chronic osteoarthritis of the coxofemoral joints: a randomized, double-blinded, multicenter, controlled trial. Vet Ther 8:272-284 (2007).
Black et al., Effect of intraarticular injection of autologous adipose-derived mesenchymal stem and regenerative cells on clinical signs of chronic osteoarthritis of the elbow joint in dogs. Vet Ther. 9:192-200 (2008).
Bligh, Richard, and Robert Besancenez. Safety and Efficacy of Bone Marrow Mesenchymal Stem Cell Extracellular Vesicles in Long COVID Patients: A Case Series. Journal of Stem Cells Research Development & Therapy 10(1):1000112, 1-8 (2024).
Bligh: Treatment of Idiopathic Pulmonary Fibrosis With an Extracellular Vesicle Isolate Product. International Journal of Science and Research Archive. 02(02):231-236 (2021).
Blood and Marrow Stem Cell Transplantation. Leukemia & Lymphoma Society Retrieved from Internet URL: http://www.lls.org/resource-center/download-or-order-free-publications. Accessed on Jul. 8, 2016.
Bonovas, Stefanos et al. Biologic Therapies and Risk of Infection and Malignancy in Patients With Inflammatory Bowel Disease: A Systematic Review and Network Meta-analysis. Clin Gastroenterol Hepatol 14(10):1385-1397.e10 (2016).
Boraschi CA, IL-18 in autoimmunity: review. Eur Cytokine Netw. 17:224-252 (2006).
Botchkarev et al., Edar signaling in the control of hair follicle development. J Investig Dermatol Symp Proc. 10(3):247-251 (2005).
Bracho-Sanchez, Evelyn. et al. Suppression of local inflammation via galectin-anchored indoleamine 2, 3-dioxygenase. Nature biomedical engineering 7(9):1156-1169 (2023).
Brigham et al. Expression of a prokaryotic gene in cultured lung endothelial cells after lipofection with a plasmid vector. Am. J. Resp. Cell. Mol. Biol. 1:95-100 (1989).
Brock, Isabelle. et al. Mast Cell Activation Disease and Immunoglobulin Deficiency in Patients With Hypermobile Ehlers-danlos Syndrome/hypermobility Spectrum Disorder. American Journal of Medical Genetics Part C: Seminars in Medical Genetics 187(4):473-481 (2021).
Brown et al., Molecular and cellular mechanisms of receptor-mediated endocytosis. DNA and Cell Biology 10(6):399-409 (1991).
Bruno, Stefania. et al. Mesenchymal stem cell-derived microvesicles protect against acute tubular injury. Journal of the American Society of Nephrology 20(5):1053-1067 (2009).
Budhiparama, Nicolaas C. et al. The role of genetic polymorphisms of interleukin-1 (IL-1R1 and IL-1RN) in primary knee osteoarthritis in Indonesia. Scientific reports 13(1):7967, 1-10 (2023).
Burian, Egon. et al. Effect of hypoxia on the proliferation of porcine bone marrow-derived mesenchymal stem cells and adipose-derived mesenchymal stem cells in 2- and 3-dimensional culture. Journal of cranio-maxillo-facial surgery45(3):414-419 (2017). Published online Dec. 20, 2016.
Burnett et al., GGF2 is neuroprotective in a rat model of cavernous nerve injury-induced erectile dysfunction. J Sex Med. 12(4):897-905 (2015).
Bustos, Martha L. et al. Activation of human mesenchymal stem cells impacts their therapeutic abilities in lung injury by increasing interleukin (IL)-10 and IL-1RN levels. Stem cells translational medicine 2(11):884-895 (2013).
Cabana: An Update on Exosomes. Aesthetic Authority. Technology Pipeline: Aestic Authority 2(1):22 (2020) https://www.dermatologytimes.com/view/an-update-on-exosomes.
Cai et al., Suppression of hepatocyte growth factor production impairs the ability of adipose-derived stem cells to promote ischemic tissue revascularization. Stem Cells 25(12):3234-3243 (2007).
Cai, L. et al. A slow release formulation of insulin as a treatment for osteoarthritis. Osteoarthritis and Cartilage 10(9):692-706 (2002).
Cai, Yu. et al. Anti-inflammatory and chondroprotective effects of platelet-derived growth factor-BB on osteoarthritis rat models. The Journals of Gerontology: Series A 78(1):51-59 (2023).
Cao, Yantian. et al. Efficacy of Stem Cells Therapy for Crohn's Fistula: a Meta-analysis and Systematic Review. Stem Cell Research and Therapy 12(1):32, 1-11 (2021).
Caplan et al., Mesenchymal stem cells as trophic mediators. J Cell Biochem 98:1076-1084 (2006).
Caplan et al., The MSC: an injury drugstore. Cell Stem Cell 9(1):11-5 (2011).
Carneiro et al., Emerging role for TNF-a in erectile dysfunction. J Sex Med. 7(12):3823-3834 (2010).
Caron, Benedicte. et al. Endpoints for Perianal Crohn's Disease Trials: past, present and future. Journal of Crohn's and Colitis 15(8):1387-1398 (2021).
Celik et al., Genetic analysis of interleukin 18 gene polymorphisms in alopecia areata. J Clin Lab Anal. 32(5):e22386 (2018).
Centeno: Exosomes, Mary Kaye, and Pink Caddys (2019) https://regenexx.com/blog/direct-biologics-exosomes/.
Centers for Disease Control and Prevention (CDC) Prevalence and most common causes of disability among adults—United States, 2005. Morbidity and Mortality Weekly Report 58(16):421-426 (2009).
Chambaz, Marion. et al. Deep Remission on Magnetic Resonance Imaging Impacts Outcomes of Perianal Fistulizing Crohn's Disease. Digestive and Liver Disease 51(3):358-363 (2019).
Chang et al., Exosomes and stem cells in degenerative disease diagnosis and therapy. Cell Transplantation 27(3):349-363 (2018).
Chang et al., Tissue engineering based cartilage repair with mesenchymal stem cells in a porcine model. J Orthop Res 29:1874-1880 (2011).
Chang, Shannon. et al. A Review of Available Medical Therapies to Treat Moderate-to-Severe Inflammatory Bowel Disease. Am J Gastroenterol 119(1):55-80 (2024). Published Online Aug. 24, 2023.
Chen et al., Regenerative hair waves in aging mice and extra-follicular modulators follistatin, dkk1, and sfrp4. J Invest Dermatol. 134(8):2086-2096 (2014).
Chen, George L. et al. Remestemcel-L for Acute Graft-versus-host Disease Therapy. Expert Opinion on Biological Therapy 14(2):261-269 (2014).
Chen, Lei. et al. Pre-vascularization Enhances Therapeutic Effects of Human Mesenchymal Stem Cell Sheets in Full Thickness Skin Wound Repair. Theranostics 7(1):117-131 (2017).
Chen, Liang-Yun. et al. Frontier Review of the Molecular Mechanisms and Current Approaches of Stem Cell-derived Exosomes. Cells 12(7):1018, 1-29 (2023).
Chen, Liwen. et al. Paracrine factors of mesenchymal stem cells recruit macrophages and endothelial lineage cells and enhance wound healing. PloS one 3(4):e1886, 1-12 (2008).
Cheng, Daye. et al. The relationship between interleukin-18 polymorphisms and allergic disease: a meta-analysis. BioMed Research International 2014(1):290687, 1-11 (2014).

(56) References Cited

OTHER PUBLICATIONS

Cheng et al., Focus on mesenchymal stem cell-derived exosomes: opportunities and challenges in cell-free therapy. Stem Cells Int. 2017:6305295 (2017).

Chew et al., Mesenchymal stem cell exosomes enhance periodontal ligament cell functions and promote periodontal regeneration. Acta Biomater 15:89:252-264 (2019).

Chew et al., Mesenchymal stem cells in human meniscal regeneration: a systemic review. Ann Med Surg. 24:3-7 (2017).

Chia, Shi-Lu. et al. Fibroblast growth factor 2 is an intrinsic chondroprotective agent that suppresses ADAMTS-5 and delays cartilage degradation in murine osteoarthritis. Arthritis & rheumatism: official Journal of the American College of rheumatology 60(7):2019-2027 (2009).

Chinese Clinical Trial Registry ChiCTR2000030261. A Study for the key technology of mesenchymal stem cells exosomes atomization in the treatment of novel coronavirus phnumonia (COVID019). Record Version as of Feb. 26, 2020.

Ching-Ping et al.: Hypoxic preconditioning enhances the therapeutic potential of the secretome from cultured human mesenchymal stem cells in experimental traumatic brain injury. Clinical science. 124(3):165-176 (2012).

Cho, Yong Beom. et al. Autologous adipose tissue-derived stem cells for the treatment of Crohn's fistula: a phase I clinical study. Cell Transplant 22(2):279-285 (2013) Published online Sep. 21, 2012.

Cho, Yong Beom. et al. Long-term results of adipose-derived stem cell therapy for the treatment of Crohn's fistula. Stem Cells Transl Med 4(5):532-537 (2015).

Choi et al., Exosomes secreted by human adipose-derived stem cells regulate the expression of collagen synthesis—related genes in human dermal fibroblasts. Abstract Book: ISEV2017, Journal of Extracellular Vesicles 6:supl:1310414; PF11.07; 141-141 (2017).

Ciavarella, Sabino. et al. A peculiar molecular profile of umbilical cord-mesenchymal stromal cells drives their inhibitory effects on multiple myeloma cell growth and tumor progression. Stem cells and development 24(12):1457-1470 (2015).

Ciccocioppo et al., Autologous bone marrow-derived mesenchymal stromal cells in the treatment of fistulising Crohn's disease. Gut 60(6):788-798 (2011).

Clinical Trial No. NCT04493242. Extracellular Vesicle Infusion Treatment for COVID-19 Associated ARDS. https://clinicaltrials.gov/study/NCT04493242 (Jul. 29, 2020).

Clinical Trial No. NCT04657458. Expanded Access for Use of bmMSC-Derived Extracellular Vesicles in Patients With COVID-19 Associated ARDS. https://clinicaltrials.gov/study/NCT04657458 (Dec. 7, 2020).

Clinical Trial No. NCT05116761. ExoFlo™ Infusion for Post-Acute COVID-19 and Chronic Post-COVID-19 Syndrome. https://clinicaltrials.gov/study/NCT05116761 (Nov. 9, 2021).

Clinical Trial No. NCT05125562. Extracellular Vesicles Infusion Treatment for Mild-to-Moderate COVID-19. https://clinicaltrials.gov/study/NCT05125562 (Nov. 16, 2021).

Clinical Trial No. NCT05127122. Bone Marrow Mesenchymal Stem Cell Derived Extracellular Vesicles Infusion Treatment for ARDS. https://clinicaltrials.gov/study/NCT05127122 (Nov. 9, 2021).

Clinical Trial No. NCT05130983. Study of ExoFlo for the Treatment of Medically Refractory Crohn's Disease. https://clinicaltrials.gov/study/NCT05130983 (Nov. 16, 2021).

Clinical Trial No. NCT05176366. Study of ExoFlo for the Treatment of Medically Refractory Ulcerative Colitis. https://clinicaltrials.gov/study/NCT05176366 (Dec. 14, 2021).

Clinical Trial No. NCT05215288. Expanded Access for Use of ExoFlo in Abdominal Solid Organ Transplant Patients https://clinicaltrials.gov/study/NCT05215288 (Jan. 18, 2022).

Clinical Trial No. NCT05354141. Extracellular Vesicle Treatment for Acute Respiratory Distress Syndrome (ARDS) (Extinguish ARDS). https://clinicaltrials.gov/study/NCT05354141 (Apr. 22, 2022).

Clinical Trial No. NCT05836883. Study of ExoFlo for the Treatment of Perianal Fistulas. https://clinicaltrials.gov/study/NCT05836883 (Apr. 19, 2023).

Colombel, Jean-Frédéric. et al. Adalimumab for maintenance of clinical response and remission in patients with Crohn's disease: the CHARM trial. Gastroenterology 132(1):52-65 (2007) Published online Nov. 29, 2006.

Colombo, M. et al., "Biogenesis, secretion, and intercellular interactions of exosomes and other extracellular vesicles." Annu Rev Cell Dev Biol, 2014, 30:255-289.

Conese et al.: Paracrine Effects and Heterogeneity of Marrow-Derived Stem/Progenitor Cells: Relevance for the Treatment of Respiratory Diseases. Cells Tissues Organs. 197:445-473 (2013).

Cook, Andrew D. et al. Granulocyte-macrophage colony-stimulating factor is a key mediator in experimental osteoarthritis pain and disease development. Arthritis research & therapy 14(5):R199, 1-9 (2012).

Co-pending Appl. Serial No. PCT/US2019/026595 Application as Filed Apr. 9, 2019.

Co-pending Appl. Serial No. PCT/US2019/068615 Application as Filed Dec. 26, 2019.

Co-pending Appl. Serial No. PCT/US2020/012359 Application as Filed Jan. 6, 2020.

Co-pending Appl. Serial No. PCT/US2020/015982 Application as Filed Jan. 30, 2020.

Co-pending Appl. Serial No. PCT/US2020/017341 Application as Filed Feb. 7, 2020.

Co-pending Appl. Serial No. PCT/US2020/018821 Application as Filed Feb. 19, 2020.

Co-pending Appl. Serial No. PCT/US2020/030476 Application as Filed Apr. 29, 2020.

Co-pending Appl. Serial No. PCT/US2020/042762 Application as Filed Jul. 20, 2020.

Co-pending Appl. Serial No. PCT/US2021/028686 Application as Filed Apr. 22, 2021.

Co-pending Appl. Serial No. PCT/US2023/065115 Application as Filed Mar. 29, 2023.

Co-pending Appl. Serial No. PCT/US2024/019725 Application as Filed Mar. 13, 2024.

Co-pending Appl. Serial No. PCT/US2024/026444 Application as Filed Apr. 26, 2024.

Co-pending Appl. Serial No. PCT/US2024/033022 Application as Filed Jun. 7, 2024.

Co-pending Appl. Serial No. PCT/US2024/033123 Application as Filed Jun. 7, 2024.

Co-pending U.S. Appl. No. 17/059,874 Claims as of May 7, 2024.
Co-pending U.S. Appl. No. 17/418,342 Claims as of May 21, 2024.
Co-pending U.S. Appl. No. 17/420,500 Claims as of Jun. 13, 2024.
Co-pending U.S. Appl. No. 17/427,192 Claims as of Jun. 13, 2024.
Co-pending U.S. Appl. No. 17/429,553 Claims as of Aug. 9, 2021.
Co-pending U.S. Appl. No. 17/432,138 Claims as of Aug. 19, 2021.
Co-pending U.S. Appl. No. 17/606,514 Claims as of Oct. 26, 2021.
Co-pending U.S. Appl. No. 17/628,011 Claims as of Jan. 18, 2022.
Co-pending U.S. Appl. No. 17/920,997 Claims as of Oct. 24, 2022.
Co-pending U.S. Appl. No. 18/192,593 Claims as of Jun. 7, 2023.
Co-pending U.S. Appl. No. 18/988,110 Claims as of Dec. 19, 2024.
Co-pending U.S. Appl. No. 19/098,197 Claims as of Apr. 2, 2025.

Cosenza, et al. Mesenchymal stem cells derived exosomes and microparticles protect cartilage and bone from degradation in osteoarthritis. Sci Rep 7(1):16214, 1-12 (2017).

Crose et al.: Bone marrow mesenchymal stem cell-derived extracellular vesicle infusion for amyotrophic lateral sclerosis. Neurodegenerative Disease Management. 14(3-4):111-117 (2024).

Crose, Joshua J: Treating amyotrophic lateral sclerosis with a bone marrow derived mesenchymal stem cell extracellular vesicles. A case report. International Journal of Science and Research Archive. 02(02):167-171 (2021).

Crose, Joshua James. Treating amyotrophic lateral sclerosis with a bone marrow derived mesenchymal stem cell extracellular vesicles—A case report. IJSRA 2:167-171 (2021).

Cui et al.: Plant extracellular vesicles. Protoplasma. 1-10 (2019).

(56) References Cited

OTHER PUBLICATIONS

Cunningham et al., The therapeutic potential of the mesenchymal stem cell secretome in ischaemic stroke. J Cereb Blood Flow Metab. 38(8):1276-1292 (2018).
Da Costa Goncalves, Fabiany. et al. Intravenous vs intraperitoneal mesenchymal stem cells administration: what is the best route for treating experimental colitis?. World Journal of Gastroenterology 20(48):18228-18239 (2014).
Daly, Andrew. Remestemcel-L, The First Cellular Therapy Product for the Treatment of Graft-versus-host Disease. Drugs Today (Barc) 48(12):773-783 (2012).
Dankbar, Berno. et al. Hepatocyte growth factor induction of macrophage chemoattractant protein-1 and osteophyte-inducing factors in osteoarthritis. Journal of orthopaedic research 25(5):569-577 (2007).
Database WPI Week 201851 Thomson Scientific, London, GB; AN 2018-41069T XP002807292, & CN 108 042 572 A (Beijing Doing Time Translational Medicin) May 18, 2018.
Database WPI Week 201877 Thomson Scientific, London, GB; AN 2018-724966 XP002807291, & CN 108 498 452 A (Univ Shanghai Second Med Renji Hospital) Sep. 7, 2018.
De Boeck, Astrid. et al. Bone marrow-derived mesenchymal stem cells promote colorectal cancer progression through paracrine neuregulin 1/HER3 signalling. Gut 62(4):550-560 (2013). Online Published Apr. 25, 2012.
De La Portilla, Fernando et al. Local mesenchymal stem cell therapy in experimentally induced colitis in the rat. International Journal of Stem Cells 11(1):39-47 (2018).
Derkus, Burak. et al. A new approach in stem cell research-Exosomes: Their mechanism of action via cellular pathways. Cell Biol 41(5):466-475 (2017).
Dietz, Allan B. et al. Autologous Mesenchymal Stem Cells, Applied in a Bioabsorbable Matrix, for Treatment of Perianal Fistulas in Patients With Crohn's Disease. Gastroenterology 153(1):59-62.e2 (2017).
Direct Biologics, LLC Announces the Launch of ExoFlo Exosomes. Press Release (2019).
Direct Biologics Received FDA Approval to Initiate 'EXIT-COVID-19,' a Phase II Investigational New Drug Trial. (2020).
Dong, Liang. et al. Treatment of MSCs with Wnt1a-conditioned medium activates DP cells and promotes hair follicle regrowth. Scientific Reports 4(1):5432, 1-9 (2014).
Doyle, Tom A., and Colin ME Halverson. Use of complementary and alternative medicine by patients with hypermobile Ehlers-Danlos Syndrome: A qualitative study. Frontiers in medicine 9:1056438, 1-10 (2022).
Drela, Katarzyna. et al. Low oxygen atmosphere facilitates proliferation and maintains undifferentiated state of umbilical cord mesenchymal stem cells in an hypoxia inducible factor-dependent manner. Cytotherapy 16(7):881-892 (2014).
Dreschnack, Paul A., and Ina Belshaku. Treatment of idiopathic facial paralysis (Bell's Palsy) and secondary facial paralysis with extracellular vesicles: a pilot safety study. BMC neurology 23(1):342, 1-9 (2023).
Duijvestein, Marjolijn. et al. Autologous bone marrow-derived mesenchymal stromal cell treatment for refractory luminal Crohn's disease: results of a phase I study. Gut 59(12):1662-1669 (2010).
Dwyer et al., The acetabular labrum regulates fluid circulation of the hip joint during functional activities. Am J Sports Med. 42(4):812-819 (2014).
East et al.: Can IV Infusions of Bone Marrow Derived Mesenchymal Stem Cell Extracellular Vesicles Be the Fountain of Youth? Journal of Regenerative Biology and Medicine. 1(2):1-10 (2019).
East et al.: Intra-Articular Injection of an Extracellular Vesicle Isolate Product to Treat Hip Labral Tears. Journal of Regenerative Biology and Medicine. J Regen Biol Med. 2019;1(1):1-6 (2019).
East et al.: Intra-Articular Injection of an Extracellular Vesicle Isolate Product to Treat Knee Osteoarthritis in an Athlete. Journal of Biomedical Research and Clinical Investigation. 1(1):1005 (2020).
East et al.: Pilot Safety Study of an Extracellular Vesicle Isolate Product for Treatment of Osteoarthritis in Combat-Related Injuries: One Year Follow Up. Genesis-JSCR-2(2)-21:1-10 (2021).
East et al.: The Safety Profile of a Bone Marrow-Derived Mesenchymal Stem Cell Extracellular Vesicle Isolate Product. J of Stem Cell Research. 6:026 (2020).
East, J., and M. Dordevic. Pilot safety study of an extracellular vesicle isolate product for treatment of osteoarthritis in combat-related injuries: one year follow up. Journal of Stem Cell Research 2(2):21, 1-10 (2021).
East, Johnny. et al. IRB \ Safety Study of an Extracellular Vesicle Isolate Product Evaluating the Treatment of Osteoarthritis in Combat-Related Injuries. Stem Cell Research 1(2):1-10 (2020).
Eirin, Alfonso. et al. Adipose tissue-derived mesenchymal stem cells improve revascularization outcomes to restore renal function in swine atherosclerotic renal artery stenosis. Stem cells 30(5):1030-1041 (2012).
Eirin, Alfonso. et al. Mesenchymal stem cell-derived extracellular vesicles attenuate kidney inflammation. Kidney international 92(1):114-124 (2017).
Eisner, M. D., and C. S. August. Impact of Donor and Recipient Characteristics on the Development of Acute and Chronic Graft-versus-host Disease Following Pediatric Bone Marrow Transplantation. Bone Marrow Transplantation 15(5):663-668 (1995).
English, Karen. Mechanisms of Mesenchymal Stromal Cell Immunomodulation. Immunology and Cell Biology 91(1):19-26 (2013).
Epifanova et al., [Investigation of mechanisms of action of growth factors of autologous platelet-rich plasma used to treat erectile dysfunction]. Urologiia. Sep. 2017;(4):46-48 (2017) Russian. English Abstract Provided.
Erhardt et al., Association of polymorphisms in P2RX7 and CaMKKb with anxiety disorders. Journal of Affective Disorders 101(1-3):159-168 (2007).
Falloon, Katherine A, and Claudio Fiocchi. Current Therapy in Inflammatory Bowel Disease: Why and How We Need to Change?. Innovations 6(1):40-49 (2022).
Fan et al., Synovium-derived mesenchymal stem cells: a new source for musculoskeletal regeneration. Tissue Engineering Part B Review 15(1):75-86 (2009).
Federal Register. vol. 76, No. 27 (2011): p. 7166.
Felgner, Philip L. et al. Lipofection: a highly efficient, lipid-mediated DNA-transfection procedure. Proceedings of the National Academy of Sciences 84(21):7413-7417 (1987).
Feng et al. Transplantation of mesenchymal stem cells and nucleus pulposus cells in a degenerative disc model in rabbits: a comparison of 2 cell types as potential candidates for disc regeneration. J Neurosurgery Spine 14:322-329 (2011).
Ferrante, Marc. et al. Validation of Endoscopic Activity Scores in Patients with Crohn's Disease Based on a Post Hoc Analysis of Data From SONIC. Gastroenterology 145(5):978-986 (2013).
Ferrone et al.: Handbook of Monoclonal Antibodies. Noges Publications 22:303-357 (1985).
Fischer, Uwe M. et al. Pulmonary passage is a major obstacle for intravenous stem cell delivery: the pulmonary first-pass effect. Stem cells and development 18(5):683-692 (2009).
Forbes, Geoffrey M. et al. A phase 2 study of allogeneic mesenchymal stromal cells for luminal Crohn's disease refractory to biologic therapy. Clin Gastroenterol Hepatol 12(1):64-71 (2014). Published online Jul. 19, 2013.
Fouad et al., Interleukin-18 gene polymorphisms in systemic lupus erythematosus: relation to disease status. Egypt J Immunol. 21:1-12 (2014).
François, Moïra. et al. Human MSC suppression correlates with cytokine induction of indoleamine 2, 3-dioxygenase and bystander M2 macrophage differentiation. Molecular therapy 20(1):187-195 (2012).
Freitag et al., Mesenchymal stem cell therapy in the treatment of Osteoarthritis: reparative pathways,safety, and efficacy: a review. BMC Musculoskeletal Disorders 17:230 (2016).
Freyman, Toby. et al. A quantitative, randomized study evaluating three methods of mesenchymal stem cell delivery following myocardial infarction. European heart journal 27(9):1114-1122 (2006).

(56) References Cited

OTHER PUBLICATIONS

Frisbie et al., Clinical update on the use of mesenchymal stem cells in equine orthopaedics. Equine Veterinary Journal, 42:86-89 (2010).
Fu, H et al., Identification of human fetal liver miRNAs by a novel method. FEBS letters 579(17):3849-3854 (2005).
Fu, Z. Q., et al. Anti-tumor mechanism of IL-21 used alone and in combination with 5-fluorouracil in vitro on human gastric cancer cells. Journal of biological regulators and homeostatic agents 32(3):619-625 (2018).
Fujii et al. Graft-Versus-Host Disease Amelioration by Human Bone Marrow Mesenchymal Stromal/Stem Cell-Derived Extracellular Vesicles Is Associated with Peripheral Preservation of Naive T Cell Populations. Stem Cells 36(3):434-445 (2018). Retrieved Mar. 26, 2025. Retrieved from https://academic.oup.com/stmcls/article/36/3/434/6453146.
Fujii et al. Supporting Information 1—Graft-Versus-Host Disease Amelioration by Human Bone Marrow Mesenchymal Stromal/Stem Cell-Derived Extracellular Vesicles Is Associated with Peripheral Preservation of Naive T Cell Populations. Stem Cells 36:S1-S8 (2018). Retrieved Mar. 26, 2025. Retrieved from https://academic.oup.com/stmcls/article/36/3/434/6453146.
Fujii et al. Supporting Information 4—Graft-Versus-Host Disease Amelioration by Human Bone Marrow Mesenchymal Stromal/Stem Cell-Derived Extracellular Vesicles Is Associated with Peripheral Preservation of Naive T Cell Populations. Stem Cells 36:S1-S12 (2018). Retrieved Mar. 26, 2025. Retrieved from https://oup.silverchair-cdn.com/oup/backfile/Content_public/Journal/stmcls/36/3/10.1002_stem.2759/3/stmcls_36_3_434_s4.pdf?Expires=1746031876&Signature=zoiTnyJVT2n9ym04KWxmsHCnG5aS5E~WHzOk86JRdwkGFmxoVaJK1p7sHSwPNi1ehXRchoDy8MJ6FtIW-oofPo82YLQx7R9ix7WNXLS8v324bKPK5SNiQlo5HRayd1BKmRqM44ibeZX1M2U3OT08wAECghSqPw~flKEnY0UtLLXrlkNMGues8ff1hlixE4UjM2KvRFGqTkGUVVQWtmBvdkfW~IEtayDhmBuGqnc3qXLQVMYMNH8PsAe8hT~i5uoDccQ9z7WQMdh5olw1BYE1S-onq-42K7Zgv3Gp9-5z~9j1c6LFTm2ySQ3HUPDBS6AY3PZgA80MeudUFbQN5ZJ4LA_&Key-Pair-Id=APKAIE5G5CRDK6RD3PGA.
Furuta et al. Mesenchymal Stem Cell-Derived Exosomes Promote Fracture Healing in a Mouse Model. Stem Cells Translational Medicine 5(12):1620-1630 (2016).
Gao, Lei. et al. Association of endothelial nitric oxide synthase polymorphisms with an increased risk of erectile dysfunction. Asian journal of andrology 19(3):330-337 (2017).
Gao, Wei. et al. miR-1246-overexpressing exosomes suppress UVB-induced photoaging via regulation of TGF-ß/Smad and attenuation of MAPK/AP-1 pathway. Photochemical and Photobiological Sciences 22(1):135-146 (2023).
Garcia-Olmo, Damian. et al. Autologous stem cell transplantation for treatment of rectovaginal fistula in perianal Crohn's disease: a new cell-based therapy. Int J Colorectal Dis 18(5):451-454 (2003).
Garcia-Olmo, Damian. et al. Expanded adipose-derived stem cells for the treatment of complex perianal fistula: a phase II clinical trial. Dis Colon Rectum 52(1):79-86 (2009).
Garcia-Olmo, Damian. et al. Follow-up Study to Evaluate the Long-term Safety and Efficacy of Darvadstrocel (Mesenchymal Stem Cell Treatment) in Patients With Perianal Fistulizing Crohn's Disease: Admire-cd Phase 3 Randomized Controlled Trial. Diseases of the Colon and Rectum 65(5):713-720 (2022).
Garcia-Olmo, Damián. et al. A phase I clinical trial of the treatment of Crohn's fistula by adipose mesenchymal stem cell transplantation. Dis Colon Rectum 48(7):1416-1423 (2005).
Gennaro, A.R., Remington: The science and practice of pharmacy. 19th edition. 1995. 12 Pages.
Gharibi, Tohid. et al. Immunomodulatory Characteristics of Mesenchymal Stem Cells and Their Role in the Treatment of Multiple Sclerosis. Cellular Immunology 293(2):113-121 (2015).
Gilhar A. Collapse of immune privilege in alopecia areata: coincidental or substantial? J Invest Dermatol. 130(11):2535-2537 (2010).
Giugliano et al., Erectile dysfunction associates with endothelial dysfunction and raised proinflammatory cytokine levels in obese men. J Endocrinol Invest. 27(7):665-669 (2004).
Gonzalez, Manuel A. et al. Adipose-derived mesenchymal stem cells alleviate experimental colitis by inhibiting inflammatory and autoimmune responses. Gastroenterology 136(3):978-989 (2009).
Gonzalez-Rey, Elena. et al. Human adult stem cells derived from adipose tissue protect against experimental colitis and sepsis. Gut 58(7):929-939 (2009).
Guerico et al., Production of canine mesenchymal stem cells from adipose tissue and their application in dogs with chronic osteoarthritis of the humeroradial joints. Cell Biol Int 36:189-194 (2012).
Guo et al., Exosomes derived from platelet-rich plasma promote the re-epithelization of chronic cutaneous wounds via activation of YAP in a diabetic rat model. Theranostics 7(1):81-96 (2017).
Gutowski, Lukasz. et al. Mast Cell Involvement in the Pathogenesis of Selected Musculoskeletal Diseases. Life 13(8):1690, 1-21 (2023).
Guyatt, Gordon. et al. A New Measure of Health Status for Clinical Trials in Inflammatory Bowel Disease. Gastroenterology 96(2):804-810 (1989).
Haber et al.: Biologic Effects of Specific Antibodies in Reversing the Pharmacologic and Toxic Effects of Digoxin. Raven Press 365-389(1977).
Hamilton, John L. et al. Targeting VEGF and Its Receptors for the Treatment of Osteoarthritis and Associated Pain. Journal of bone and mineral research : the official journal of the American Society for Bone and Mineral Research 31(5):911-924 (2016).
Hanauer, Stephen B. et al. Human anti-tumor necrosis factor monoclonal antibody (adalimumab) in Crohn's disease: the CLASSIC-I Trial. Gastroenterology 130(2):323-333 (2006).
Hanauer, Stephen B. et al. Maintenance infliximab for Crohn's disease: the Accent I randomised trial. The Lancet 359(9317):1541-1549 (2002).
Handayani, Erika Yusticia, and Heri Krisnata Ginting. Osteoarthritis and Hypothyroidism: What's the Association? A Literature Review. Asian Journal of Healthy and Science 3(6):113-119 (2024).
Hara, Tomonori. et al. Genetics of bipolar disorder: insights into its complex architecture and biology from common and rare variants. Journal of human genetics 68(3):183-191 (2023). Published online May 26, 2022.
Hare, Joshua M. et al. A randomized, double-blind, placebo-controlled, dose-escalation study of intravenous adult human mesenchymal stem cells (prochymal) after acute myocardial infarction. J Am Coll Cardiol. 54(24):2277-2286 (2009).
Harris JD. Hip labral repair: options and outcomes. Curr Rev Musculoskelet Med. 9(4):361-367 (2016).
Haynesworth, Stephen E. et al. Cytokine expression by human marrow-derived mesenchymal progenitor cells in vitro: Effects of dexamethasone and IL-1α. Journal of cellular physiology 166(3):585-592 (1996).
Hazehara-Kunitomo, Yuri. et al. Acidic Pre-conditioning Enhances the Stem Cell Phenotype of Human Bone Marrow Stem/progenitor Cells. International Journal of Molecular Sciences 20(5):1097, 1-10 (2019).
He, Xiao-Wen. et al. Systemic Infusion of Bone Marrow-derived Mesenchymal Stem Cells for Treatment of Experimental Colitis in Mice. Digestive Diseases and Sciences 57:3136-3144 (2012).
Heijnen, Harry F. et al. Activated Platelets Release Two Types of Membrane Vesicles Microvesicles by Surface Shedding and Exosomes Derived From Exocytosis of Multivesicular Bodies and Alpha-granules. Blood 94(11)3791-3799 (1999).
Hermann, Jacek. et al. Treatment of Crohn's Anal Fistulas Guided by Magnetic Resonance Imaging. Przegld Gastroenterologiczny 14(1):55-61 (2019).
Hessvik et al.: Current knowledge on exosome biogenesis and release description. Cell. Mol. Life Sci. 75:193-208 (2018).
Hicok et al.: Exosome Origins: Why the Cell Source Matters. Stem Cells Regen Med. 4(1):1-4 (2020).
Hildreth, Cade. Direct Biologics Receives FDA Approval to Proceed with Second ExoFlo IND for Post-Acute COVID-19 Syndrome and Chronic Post-COVID-19 Syndrome. Direct BioInformant Blog Jun. 9, 2021. Retrieved Mar. 26, 2025. Retrieved from https://bioinformant.com/direct-biologics-second-exoflo-ind/.

(56) References Cited

OTHER PUBLICATIONS

Hindryckx, Pieter. et al. Development and Validation of a Magnetic Resonance Index for Assessing Fistulas in Patients With Crohn's Disease. Gastroenterology 157(5):1233-1244 (2019).
Hiyama et al., Transplantation of mesenchymal stem cells in a canine disc degeneration model. J Orthop Res 26:589-600 (2008).
Ho, Chih-Yi. et al. Clinical and genetic aspects of alopecia areata: a cutting edge review. Genes 14(7):1362, 1-20 (2023).
Horton, Jason A. et al. Mesenchymal Stem Cells Inhibit Cutaneous Radiation-induced Fibrosis by Suppressing Chronic Inflammation. Stem Cells 31(10):2231-2241 (2013).
Hotaling et al., DCCT/EDIC Research Group. Pilot genome-wide association search identifies potential loci for risk of erectile dysfunction in type 1 diabetes using the DCCT/EDIC study cohort. J Urol. 188(2):514-520 (2012).
Hou, Chun et al., Expression of matrix metalloproteinases and tissue inhibitor of matrix metalloproteinases in the hair cycle. Exp Ther Med. 12(1):231-237 (2016).
Howe et al., The miracle of stem cells. Stemedica Cell Technologies pp. 202-210 (2011).
Howell, T. Howard. et al. A Phase I/II Clinical Trial to Evaluate a Combination of Recombinant Human Platelet-derived Growth Factor-BB and Recombinant Human Insulin-like Growth Factor-I in Patients with Periodontal Disease. Journal of Periodontology 68(12):1186-1193 (1997).
Hu, Jianxia. et al. Safety and therapeutic effect of mesenchymal stem cell infusion on moderate to severe ulcerative colitis. Exp Ther Med 12(5):2983-2989 (2016).
Huang, Lina. et al. Exosomes in mesenchymal stem cells, a new therapeutic strategy for cardiovascular diseases?. Int J Biol Sci 11(2):238-245 (2015).
Hughes et al., Monoclonal antibody targeting of liposomes to mouse lung in vivo. Cancer Research 49(22):6214-6220 (1989).
Hwang, Insik. et al. Neural stem cells and the secreted proteins TIMPs ameliorate UVB-induced skin photodamage. Biochemical and biophysical research communications 518(2):388-395 (2019).
Istanbul Med Assist further considers whether exosomes work for hair loss (IMA) https://www.istanbulmedassist.com/blog/do-exosomes-really-work-for-hair-loss/#:~:text=Do%20Exosomes%20Actually%20Work?,%2C%20and%20overall%20health (2024).
Jacob et al., Association of the oxytocin receptor gene (OXTR) in caucasian children and adolescents with autism. Neuroscience Letters 417(1):6-9 (2007).
Jaeger et al., "Improved predictions of secondary structures for RNA", Proceedings of the National Academy of Sciences, vol. 86, No. 20, Oct. 1, 1989, pp. 7706-7710.
Jaeger, John A, et al., [17] Predicting optimal and suboptimal secondary structure for RNA. Methods in Enzymology 183:281-306 (1989).
Johnston et al., A point mutation in PDGFRB causes autosomal-dominant Penttinen syndrome. Am J Hum Genet. 97(3):465-474 (2015).
Jong, Olivier G De. et al. Extracellular vesicles: potential roles in regenerative medicine. Front Immunol 5:608, 1-13 (2014).
Jorgenson, Eric. et al. Genetic variation in the SIM1 locus is associated with erectile dysfunction. Proceedings of the National Academy of Sciences 115(43):11018-11023 (2018).
Julianto et al., Topical delivery of mesenchymal stem cells "secretomes" in wound repair. Acta Med Indones 48(3):217-220 (2016).
Kalladka, et al. Human Neural Stem Cells In Patients With Chronic Ischaemic Stroke (PISCES): A Phase 1, First-in-man Study. Lancet 388(10046):787-796 (2016).
Kalluri, Raghu, and Valerie S. LeBleu. The biology, function, and biomedical applications of exosomes. Science 367(6478): eaau6977, 1-15 (2020).
Kambur et al., Genetic variation in P2RX7 and pain tolerance. Pain 159(6):1064-1073 (2018).
Kandola et al., How does rheumatoid arthritis affect the wrists? Medical News Today https://www.medicalnewstoday.com/articles/323056 (2018).
Kato, Jiro. et al. Mesenchymal stem cells ameliorate impaired wound healing through enhancing keratinocyte functions in diabetic foot ulcerations on the plantar skin of rats. Journal of Diabetes and its Complications 28(5):588-595 (2014).
Kavoussi et al., Recombinant PAI-1 therapy restores myoendothelial junctions and erectile function in PAI-1-deficient mice. Andrologia 47(10):1147-1152 (2015).
Kawabe et al., Localization of TIMP in cycling mouse hair. Development 111(4):877-879 (1991).
Kebriaei, Partow. et al. Adult Human Mesenchymal Stem Cells Added to Corticosteroid Therapy for the Treatment of Acute Graft-versus-host Disease. Biology of Blood and Marrow Transplantation 15(7):804-811 (2009).
Kellgren et al., Radiological assessment of osteo-arthrosis. Ann Rheum Dis Dec. 16(4):494-502 (1957).
Kelly et al., Arthroscopic debridement without radial head excision of the osteoarthritic elbow. Arthroscopy 23(2):151-156 (2007).
Kiener, Hans P. et al. Tumor necrosis factor a promotes the expression of stem cell factor in synovial fibroblasts and their capacity to induce mast cell chemotaxis. Arthritis & Rheumatism: Official Journal of the American College of Rheumatology 43(1):164-174 (2000).
Kim et al., Association between interleukin 18 polymorphisms and alopecia areata in Koreans. J Interferon Cytokine Res. 34:349-353 (2014).
Kim et al., Mesenchymal stem cells vs. mesenchymal stem cell secretome for rheumatoid arthritis treatment. JSM Arthritis, vol. 1(1):1001 (2016).
Kim et al.: Wound healing effect of adipose-derived stem cells: A critical role of secretory factors on human dermal fibroblasts. Journal of Dermatological Science. 48:15-24 (2007).
Kim, Soochong. et al. Insulin-like growth factor-1 regulates platelet activation through PI3-K alpha isoform. Blood, The Journal of the American Society of Hematology 110(13):4206-4213 (2007).
Kimbrel, Erin A. et al. Mesenchymal Stem Cell Population Derived From Human Pluripotent Stem Cells Displays Potent Immunomodulatory and Therapeutic Properties. Stem Cells and Development 23(14):1611-1624 (2014).
Kin, Cindy, and M. Kate Bundorf. As Infliximab Use for Ulcerative Colitis Has Increased, So Has the Rate of Surgical Resection. Journal of Gastrointestinal Surgery 21(7):1159-1165 (2017).
Kinane, Denis F. et al. Periodontal diseases. Nature reviews Disease primers 3:17038, 1-14 (2017).
Kinnaird, T. et al. Marrow-derived stromal cells express genes encoding a broad spectrum of arteriogenic cytokines and promote in vitro and in vivo arteriogenesis through paracrine mechanisms. Circulation Research 94(5):678-685 (2004).
Klyushnenkova, Elena. et al. T cell responses to allogeneic human mesenchymal stem cells: immunogenicity, tolerance, and suppression. Journal of Biomedical Science 12(1):47-57 (2005).
Knights, Alexander J. et al. Synovial macrophage diversity and activation of M-CSF signaling in post-traumatic osteoarthritis. bioRxiv :1-29 (2023).
Koga et al., Synovial stem cells are regionally specified according to local microenvironments after implantation for cartilage regeneration. Stem Cells 25:689-696 (2007).
Koizumi et al., Distribution of IL-18 and IL-18 receptor in human skin: various forms of IL-18 are produced in keratinocytes. Arch Dermatol Res. 293(7):325-333 (2001).
Kondo, Ayano, and Tsuyoshi Osawa. Establishment of an Extracellular Acidic pH Culture System. Journal of Visualized Experiments 129:e56660, 1-7 (2017).
Kordelas, L. et al. MSC-derived Exosomes: A Novel Tool to Treat Therapy-refractory Graft-versus-host Disease. Leukemia 28(4):970-973 (935-979) (2014).
Krych et al., Modest mid-term outcomes after isolated arthroscopic debridement of acetabular tears. Knee Surg Sports Traumatol Arthrosc. 22(4):763-767 (2014).
Kurtzberg, Joanne. et al. Allogeneic Human Mesenchymal Stem Cell Therapy (Remestemcel-I, Prochymal) as a Rescue Agent for Severe Refractory Acute Graft-versus-host Disease in Pediatric Patients. Biology of Blood and Marrow Transplantation 20(2):229-235 (2014).

(56) References Cited

OTHER PUBLICATIONS

Lai et al., Androgenic alopecia is associated with less dietary soy, higher blood vanadium and rs1160312 1 polymorphism in Taiwanese communities. PLos One 8(12):e79789, 1-11 (2013).
Lai, Ruenn Chai. et al. Exosome secreted by MSC reduces myocardial ischemia/reperfusion injury. Stem Cell Res 4(3):214-222 (2010).
Lankford, Karen L, et al., Intravenously Delivered Mesenchymal Stem Cell-derived Exosomes Target M2-type Macrophages In The Injured Spinal Cord. PLoS One 13(1):e0190358, 20 Pages (2018).
Lanyu, Zhang, and Hei Feilong. et al. Emerging role of extracellular vesicles in lung injury and inflammation. Biomed Pharmacother 113:108748, 1-9 (2019).
Le Blanc, Katarina. et al. Mesenchymal Stem Cells for Treatment of Steroid-resistant, Severe, Acute Graft-versus-host Disease: a Phase II Study. The Lancet 371(9624):1579-1586 (2008).
Le Blanc, Katarina. et al. Treatment of Severe Acute Graft-versus-host Disease With Third Party Haploidentical Mesenchymal Stem Cells. The Lancet 363(9419):1439-1441 (2004).
Lecuyer et al., Dual role of ALCAM in neuroinflammation and blood-brain barrier homeostasis. Proc Natl Acad Sci USA. 114(4):E524-E533 (2017).
Lee et al., Injectable mesenchymal stem cell therapy for large cartilage defects-a porcine model. Stem Cells 25:2964-2971 (2007).
Lee, Jae W. et al. Concise review: Mesenchymal stem cells for acute lung injury: role of paracrine soluble factors. Stem Cells 29(6):913-919 (2011).
Lee, Jong Lyul. et al. Treatment Strategy for Perianal Fistulas in Crohn Disease Patients: The Surgeon's Point of View. Annals of Coloproctology 37(1):5-15 (2021).
Lee, Ryang Hwa. et al. Intravenous hMSCs Improve Myocardial Infarction in Mice Because Cells Embolized in Lung Are Activated to Secrete the Anti-inflammatory Protein TSG-6. Cell Stem Cell 5(1):54-63 (2009).
Lee, Tanya. et al. Long-term Outcomes of Perianal Fistulizing Crohn's Disease in the Biologic Era. JGH Open 5(2):235-241 (2021).
Lee, Woo Yong. et al. Autologous Adipose Tissue-derived Stem Cells Treatment Demonstrated Favorable and Sustainable Therapeutic Effect for Crohn's Fistula. Stem Cells 31(11):2575-2581 (2013).
Leibacher, Johannes, and Reinhard Henschler. Biodistribution, Migration and Homing of Systemically Applied Mesenchymal Stem/stromal Cells. Stem Cell Research and Therapy 7:1-12 (2016).
Letsinger, Robert. L. et al. Cholesteryl-conjugated oligonucleotides: Synthesis, properties, and activity as inhibitors of replication of human immunodeficiency virus in cell culture. Proceedings of the National Academy of Sciences of the United States of America 86(17):6553-6556 (1989).
Levitte et al.: Mesenchymal stem cell-derived extracellular vesicles for the treatment of acute rejection in pediatric and adult bowl transplant. American Journal of Transplantation. 1-4 (2023).
Li, Chengxin. et al. Association of thyroid hormone with osteoarthritis: from mendelian randomization and RNA sequencing analysis. Journal of Orthopaedic Surgery and Research 19(1):429, 1-11 (2024).
Li et al.: BMSCs-Derived Exosomes Ameliorate Pain via Abrogation of Aberrant Nerve Invasion in Subchondral Bone in Lumbar Facet Joint Osteoarthritis. Journal of Orthopaedic Research. 38(3):670-679 (2019).
Li, et al. Emerging Role of Exosomes in the Joint Diseases. Cell Physiol Biochem 47(5):2008-2017 (2018).
Li et al.: Mesenchymal stem cells and acellular products attenuate murine induced colitis. Stem Cell Research & Therapy. 11:515 (2020).
Li et al., Six novel susceptibility loci for early-onset androgenetic alopecia and their unexpected association with common diseases. PLoS Genetics 8(5):e1002746, 1-9 (2012).
Li, Yun-Xuan. et al. FGF1 reduces cartilage injury in osteoarthritis via regulating AMPK/Nrf2 pathway. Journal of Molecular Histology 54(5):427-438 (2023).
Liang, Lu. et al. Human Umbilical Cord Mesenchymal Stem Cells Ameliorate Mice Trinitrobenzene Sulfonic Acid (TNBS)-induced Colitis. Cell Transplantation 20(9):1395-1408 (2011).
Libro et al., Cannabidiol modulates the immunophenotype and inhibits the activation of the inflammasome in human gingival mesenchymal stem cells. Frontiers in Physiology 7:559 (2016).
Lichtenstein, A et al., Liposome-encapsulated silver sulfadiazine (SSD) for the topical treatment of infected burns: thermodynamics of drug encapsulation and kinetics of drug release. Journal of inorganic biochemistry 60(3):187-198 (1995).
Lightner, Amy L. et al. Bone marrow mesenchymal stem cell-derived extracellular vesicle infusion for the treatment of respiratory failure from COVID-19: a randomized, placebo-controlled dosing clinical trial. Chest 164(6):1444-1453 (2023).
Lightner, Amy L. et al. Mesenchymal Stem Cell Extracellular Vesicles as a New Treatment Paradigm in Solid Abdominal Organ Transplantation: A Case Series. Stem Cells and Development. 33(5-6):107-115 (2024).
Lim et al.: Letter to the Editor re: "Exosomes Derived from Bone Marrow Mesenchymal Stem Cells as Treatment for Severe COVID-19" by Sengupta et al. Stem Cells and Development. 00(00) (2020).
Lin, Shih-Chao. et al. Microencapsulated recombinant human epidermal growth factor ameliorates osteoarthritis in a murine model. Evidence-Based Complementary and Alternative Medicine 2021(1):9163279, 1-10 (2021).
Lin, WeiYu. et al. Function of CSF1 and IL34 in Macrophage Homeostasis, Inflammation, and Cancer. Frontiers in immunology 10:2019, 1-18 (2019).
Linero et al.: Paracrine Effect of Mesenchymal Stem Cells Derived from Human Adipose Tissue in Bone Regeneration. PLoS One. 9(9):e107001 (2014).
Little et al., Total elbow arthroplasty: a systematic review of the literature in the English language until the end of 2003. Journal of Bone and Joint Surgery 87(4):437-444 (2005).
Litzinger et al., Biodistribution and immunotargetability of ganglioside-stabilized dioleoylphosphatidylethanolamine liposomes. Biochimica et Biophysica Acta (BBA)-Biomembranes 1104(1):179-187 (1992).
Liu et al., Prediction of male-pattern baldness from genotypes. European Journal of Human Genetics 24:895-902 (2015).
Liu et al.: Therapeutic potential of mesenchymal stem/stromal cell-derived secretome and vesicles for lung injury and disease. Expert Op Biol Ther. 29(2):125-140 (2019).
Locatelli, Franco. et al. Remestemcel-I for the Treatment of Graft Versus Host Disease. Expert Review of Clinical Immunology 13(1):43-56 (2017).
Logozzi, Mariantonia. et al. Microenvironmental pH and Exosome Levels Interplay in Human Cancer Cell Lines of Different Histotypes. Cancers 10(10):370, 1-15 (2018).
Lotfy, Ahmed. et al. Mesenchymal Stromal/stem Cell (MSC)-derived Exosomes in Clinical Trials. Stem Cell Research and Therapy 14(1):66, 1-18 (2023).
Lou, Danning. et al. Single nucleotide polymorphisms in the non-coding region of STIM1 gene are associated with Parkinson disease risk in Chinese Han population. Medicine 99(9):e19234, 1-10 (2020).
Lundberg, Johan. et al. Targeted intra-arterial transplantation of stem cells to the injured CNS is more effective than intravenous administration: engraftment is dependent on cell type and adhesion molecule expression. Cell transplantation 21(1):333-343 (2012).
Luo, Shi-Xing. et al. Genetic polymorphisms of interleukin-16 and risk of knee osteoarthritis. PloS one 10(5):e0123442, 1-12 (2015).
Luo, Ziwei. et al. IL16 Regulates Osteoarthritis Progression as a Target Gene of Novel-miR-81. Cartilage 15(2):175-183 (2024). Published online Apr. 21, 2023.
Mak, Joyce Wing Yan. et al. Stopping Anti-tumour Necrosis Factor Therapy in Patients With Perianal Crohn's Disease. Alimentary Pharmacology & Therapeutics 50(11-12):1195-1203 (2019).
Makela, Tuomas. et al. Safety and biodistribution study of bone marrow-derived mesenchymal stromal cells and mononuclear cells and the impact of the administration route in an intact porcine model. Cytotherapy 17(4):392-402 (2015).
Makowiec, F. et al. Clinical Course of Perianal Fistulas in Crohn's Disease. Gut 37(5):696-701 (1995).

(56) References Cited

OTHER PUBLICATIONS

Malfait, Fransiska. et al. The 2017 International Classification of the Ehlers-danlos Syndromes. American Journal of Medical Genetics Part C: Seminars in Medical Genetics 175(1):8-26 (2017).
Mancuso et al., Mesenchymal stem cell therapy for osteoarthritis: the critical role of the cell secretome. Front Bioeng Biotechnol 7:9 [1-9] (2019).
Mannon, Peter J. Remestemcel-I: Human Mesenchymal Stem Cells as an Emerging Therapy for Crohn's Disease. Expert Opinion on Biological Therapy 11(9):1249-1256 (2011).
Marcinska et al., Evaluation of DNA variants associated with androgenetic alopecia and their potential to predict male pattern baldness. PLoS One 10(5):1-18, e0127852 (2015).
Marei, Hany E. et al. Potential of stem cell-based therapy for ischemic stroke. Frontiers in neurology 9:271733, 1-7 (2018).
Massa et al.: Clinical Applications of Mesenchymal Stem/Stromal Cell Derived Extracellular Vesicles: Therapeutic Potential of an Accellular Product. Diagnostics. 10:999 (2020).
Massicotte, F. et al. Can altered production of interleukin-1β, interleukin-6, transforming growth factor-β and prostaglandin E2 by isolated human subchondral osteoblasts identify two subgroups of osteoarthritic patients. Osteoarthritis and cartilage 10(6):491-500 (2002).
Massicotte, Frederic. et al. Modulation of insulin-like growth factor 1 levels in human osteoarthritic subchondral bone osteoblasts. Bone 38(3):333-341 (2006). Published online Oct. 27, 2005.
Mathieu, Mathilde. et al. Specificities of exosome versus small ectosome secretion revealed by live intracellular tracking of CD63 and CD9. Nat Commun 12(1):4389, 1-18 (2021).
Matsuzaka, Yasunari. and Ryu Yashiro. Therapeutic Strategy of Mesenchymal-stem-cell- derived Extracellular Vesicles as Regenerative Medicine. International Journal of Molecular Sciences 23(12):6480, 1-19 (2022).
Mazaheri et al., Ameliorating effect of osteopontin on H(2)O(2)-induced apoptosis of human oligodendrocyte progenitor cells. Cell Mol Neurobiol. 38(4):891-899 (2018).
McDowall et al., The role of activins and follistatins in skin and hair follicle development and function. Cytokine Growth Factor Rev. 19(5-6):415-426 (2008).
McQuillin et al., Case-control studies show that a non-conservative amino-acid change from a glutamine to arginine in the P2RX7 purinergic receptor protein is associated with both bipolar-and unipolar-affective disorders. Molecular Psychiatry 14:614-620 (2008).
Meisel, Roland. et al. Human Bone Marrow Stromal Cells Inhibit Allogeneic T-cell Responses by Indoleamine 2, 3-dioxygenase-mediated Tryptophan Degradation. Blood 103(12):4619-4621 (2004).
Messa, Genevieve E. et al. Treatment of a Recurrent Ischial Ulcer With Injected Exosomes. Journal of Surgical Case Reports 2022(6):rjac271, 1-3 (2022).
Mitrani M. et al. Administration of amniotic fluid derived extracellular vesicle is associated with decreased CRP in COVID-19 patients. Cytotherapy 23(5)S27 (2021). Retrieved Mar. 26, 2025. Retrieved from https://www.sciencedirect.com/science/article/pii/S1465324921002887?viSi%3Dihub.
Mitrani, Maria Ines et al., Treatment of a COVID-19 long hauler with an amniotic fluid-derived extracellular vesicle biologic, Respiratory Medicine Case Reports, 34(2021). Retrieved Mar. 26, 2025. Retrieved from https://www.sciencedirect.com/science/article/pii/S2213007121001647.
Moghadasali, Reza. et al. Autologous transplantation of mesenchymal stromal cells tends to prevent progress of interstitial fibrosis in a rhesus Macaca mulatta monkey model of chronic kidney disease. Cytotherapy 17(11):1495-1505 (2015).
Mohammadipoor et al.: Therapeutic potential of products derived from mesenchymal stem/stromal cells in pulmonary disease. Respiratory Research. 19(218):1-15 (2018).
Mokbel et al., Homing and efficacy of intra-articular injection of autologous mesenchymal stem cells in experimental chondral defects in dogs. Clin Exp Rheumatol 29:275-284 (2011).
Molendijk, Ilse. et al. Allogeneic Bone Marrow-Derived Mesenchymal Stromal Cells Promote Healing of Refractory Perianal Fistulas in Patients With Crohn's Disease. Gastroenterology 149(4):918-927.e6 (2015).
Monaco, Ashley. et al. Association of Mast-cell-related Conditions With Hypermobile Syndromes: a Review of the Literature. Immunologic Research 70(4):419-431 (2022).
Monsel et al.: Mesenchymal Stem Cell Derived Secretome and Extracellular Vesicles for Acute Lung Injury and Other Inflammatory Lung Diseases. Expert Opin Biol Ther. 16(7):859-871 (2016).
Moseley, Tim. MSC Extracellular Vesicles in IBD: A Path to Clinical Translation and Therapeutic Innovation. IBD Innovate: Product Development for Crohn's & Colitis Presentation :1-14 (2025).
Muratovic, Dzenita. et al. Elevated levels of active Transforming Growth Factor β1 in the subchondral bone relate spatially to cartilage loss and impaired bone quality in human knee osteoarthritis. Osteoarthritis and cartilage 30(6):896-907 (2022).
Murphy et al., Stem cell therapy in a caprine model of osteoarthritis. Arthritis Rheum 48:3464-3474 (2003).
Nabity, Thomas, and John T. Ransom. Treatment of Severe, Chronic Traumatic Brain Injury with Bone Marrow Derived Mesenchymal Stem Cell Extracellular Vesicles. Brain Injury :1-9 (2025).
Nabity, Thomas S, and John T. Ransom. Treatment of Severe, Acquired Traumatic Brain Injury with Human Bone Marrow Mesenchymal Stem Cell Extracellular Vesicles: A Case Report. Brain Injury :1-12 (2025).
Nagao, Masashi. et al. Vascular endothelial growth factor in cartilage development and osteoarthritis. Scientific reports 7(1):13027, 1-16 (2017).
Nakamura, Yoshihiro. et al. Mesenchymal-stem-cell-derived exosomes accelerate skeletal muscle regeneration. FEBS letters 589(11):1257-1265 (2015).
Needleman, Saul B, and Christian D. Wunsch. A General Method Applicable to the Search for Similarities in the Amino Acid Sequence of Two Proteins. Journal of Molecular Biology 48(3):443-453 (1970).
Nguyen et al., Functional outcomes of arthroscopic capsular release of the elbow. Arthroscopy 22(8):842-849 (2006).
Nicola, Massimo Di. et al. Human bone marrow stromal cells suppress T-lymphocyte proliferation induced by cellular or nonspecific mitogenic stimuli. Blood 99:3838-3843 (2002).
Ning et al., SNP@lincTFBS: an integrated database of polymorphisms in human LincRNA transcription factor binding sites. PLoS One 9(7):e103851, 1-8 (2014).
Novikov A.V. Experimental and clinical use of multipotent mesenchymal stem cells to stimulate articular cartilage regeneration. Journal of Medicine 3:125-135 (2017).
Ohsu: Emergency Medicine Newsletter https://www.ohsu.edu/sites/default/files/2024-03/March%202024%20Newsletter%20%28Long%29.pdf (Mar. 2024).
Oliveira-Sales, Elizabeth B., and Mirian A. Boim. Mesenchymal stem cells and chronic renal artery stenosis. American Journal of Physiology-Renal Physiology 310(1):F6-F9 (2016).
Osborn, Erik. et al. A novel extracellular vesicle paradigm for the treatment of COVID-19 induced acute respiratory distress syndrome (ARDS). Respiratory Medicine Case Reports 51:102087, 1-5 (2024).
Otani, Kosuke. et al. Plasma exosomes regulate systemic blood pressure in rats. Biochem Biophys Res Commun 503(2):776-783 (2018).
Oyanguren-Desez et al., Gain-of-function of P2X7 receptor gene variants in multiple sclerosis. Cell Calcium 50(5):468-472 (2011).
Paicius, Rick. et al. Safety and efficacy of intravenous ExoFlo in the treatment of complex regional pain syndrome. Pain Physician 26(7):E851-E857 (2023).
Panes, Julian. et al. Long-term Efficacy and Safety of Stem Cell Therapy (Cx601) for Complex Perianal Fistulas in Patients With Crohn's Disease. Gastroenterology 154(5):1334-1342 (2018).
Panes, Julián. et al. Expanded allogeneic adipose-derived mesenchymal stem cells (Cx601) for complex perianal fistulas in Crohn's disease: a phase 3 randomised, double-blind controlled trial. Lancet 388(10051):1281-1290 (2016).

(56) References Cited

OTHER PUBLICATIONS

Papadopoulos, Konstantinos I. et al. Novel use of intraarticular granulocyte colony stimulating factor (hG-CSF) combined with activated autologous peripheral blood stem cells mobilized with systemic hG-CSF: safe and efficient in early osteoarthritis. Cartilage 13(1_suppl):1671S-1674S (2021).
Papathanasiou, Ioanna. et al. Bone morphogenetic protein-2-induced Wnt/β-catenin signaling pathway activation through enhanced low-density-lipoprotein receptor-related protein 5 catabolic activity contributes to hypertrophy in osteoarthritic chondrocytes. Arthritis research & therapy 14(2):R82, 1-14 (2012).
Park et al., Hair growth stimulated by conditioned medium of adipose-derived stem cells is enhanced by hypoxia: evidence of increased growth factor secretion. Biomed Res. 31(1):27-34 (2010).
Park, Hang-soo. et al. Human BM-MSC secretome enhances human granulosa cell proliferation and steroidogenesis and restores ovarian function in primary ovarian insufficiency mouse model. Scientific reports 11(1):4525, 1-12 (2021).
Parks, A G. et al. A Classification of Fistula-in-ano. British Journal of Surgery 63(1):1-12 (1976).
Partain, Brittany D. et al. Intra-articular delivery of an indoleamine 2, 3-dioxygenase galectin-3 fusion protein for osteoarthritis treatment in male Lewis rats. Arthritis Research & Therapy 25(1):173, 1-15 (2023).
Patel, Amit N., and Jorge Genovese. Potential Clinical Applications of Adult Human Mesenchymal Stem Cell (Prochymal®) Therapy. Stem Cells and Cloning: Advances and Applications 4:61-72 (2011).
Patton, Mary C. et al. Hypoxia Alters the Release and Size Distribution of Extracellular Vesicles in Pancreatic Cancer Cells to Support Their Adaptive Survival. Journal of cellular biochemistry 121(1):828-839 (2021).
PCT/US2016/022629 International Search Report and Written Opinion dated Aug. 25, 2016.
PCT/US2019/026595 International Search Report and Written Opinion dated Jul. 2, 2019.
PCT/US2019/068615 International Search Report and Written Opinion dated Mar. 26, 2020.
PCT/US2020/012359 International Search Report and Written Opinion dated Mar. 24, 2020.
PCT/US2020/015982 International Search Report and Written Opinion dated Apr. 24, 2020.
PCT/US2020/017341 International Search Repot and Written Opinion dated Apr. 28, 2020.
PCT/US2020/018821 International Search Report and Written Opinion dated May 21, 2020.
PCT/US2020/030476 International Search Report and Written Opinion dated Aug. 12, 2020.
PCT/US2020/042762 International Search Report and Written Opinion dated Dec. 10, 2020.
PCT/US2021/028686 International Search Report and Written Opinion dated Aug. 16, 2021.
PCT/US2023/065115 International Search Report and Written Opinion dated Sep. 27, 2023.
PCT/US2024/019725 International Search Report and Written Opinion dated Jun. 28, 2024.
PCT/US2024/019725 Invitation to Pay Additional Fees dated May 7, 2024.
PCT/US2024/026444 International Search Report and Written Opinion dated Jul. 15, 2024.
PCT/US2024/033022 International Search Report and Written Opinion dated Sep. 3, 2024.
PCT/US2024/033123 International Search Report and Written Opinion dated Sep. 17, 2024.
PCT/US2024/054785 Invitation to Pay Additional Fees with Partial International Search Report dated Feb. 24, 2025.
PCT/US2024/054793 International Search Report and Written Opinion dated Apr. 14, 2025.
PCT/US2024/054793 Invitation to Pay Additional Fees dated Feb. 24, 2025.
PCT/US2024/054794 International Search Report and Written Opinion dated Apr. 14, 2025.
PCT/US2024/054794 Invitation to Pay Additional Fees dated Feb. 24, 2025.
PCT/US2024/054800 International Search Report and Written Opinion dated Apr. 14, 2025.
PCT/US2024/054800 Invitation to Pay Additional Fees dated Feb. 24, 2025.
Pearson, William R, and David J. Lipman. Improved Tools for Biological Sequence Comparison. Proceedings of the National Academy of Sciences 85(8):2444-2448 (1988).
Pettine et al., Autogenous bone marrow concentrate for the treatment of osteoarthritis of the knee, hip and shoulder in former NFL players. J Stem Cell Res Ther. 4(1):9-13 (2018).
Pettine et al., Percutaneous injection of Autologous bone marrow concentrate significantly reduces lumbar discogenic pain through twelve months. Stem Cells 33:146-156 (2015).
Pettine et al., The biologic treatment of osteoarthritis with mesenchymal stem cell exosomes: the future is now. J Stem Cell Res Dev Ther. S1001:1-5 (2019).
Pettine et al., Tibial metaphyseal injection with bone marrow concentrate to treat knee arthritis. American J Stem Cell Res Ther. 2(1):5-10 (2018).
Pettine et al.: Treating Discogenic Pain with Mesenchymal Stem Cell Exosomes: What Is the Biologic Mechanism of Action. Jacobs Journal of Bone Marrow and Stem Cell Research. 5(1):017 (2019).
Pezato, Rogerio. et al. Immunoregulatory Effects of Bone Marrow-derived Mesenchymal Stem Cells in the Nasal Polyp Microenvironment. Mediators of Inflammation 2014(1):583409, 1-11 (2014).
Philippon et al., The hip fluid seal-part I: the effect of an acetabularlabral tear, repair, resection, and reconstruction on hip fluid pressurization. Knee Surg Sports Traumatol Arthrosc. 22(4):722-729 (2014).
Phillips et aL: One month safety study of ExoFlo injection for the treatment of lumbar or cervical radiculopathy in the epidural space. International Journal of Science and Research Archive. 119-124 eISSN:2582-8185 (2021).
Phinney et al.: MSC-Derived Exosomes for Cell-Free Therapy. Stem Cells. 35:851-858 (2017).
Pietersz et al., Antibody conjugates for the treatment of cancer. Immunological Reviews 129(1):57-80 (1992).
Portilla, F de la. et al. Expanded allogeneic adipose-derived stem cells (eASCs) for the treatment of complex perianal fistula in Crohn's disease: results from a multicenter phase I/IIa clinical trial. Int J Colorectal Dis 28(3):313-323 (2013).
Pourakbari, Ramin. et al. The potential of exosomes in the therapy of the cartilage and bone complications; emphasis on osteoarthritis. Life Sciences 236:116861, 1-8 (2019).
Prentice, David Andrew. et al. Vascular Ehlers-Danlos syndrome: Treatment of a complex abdominal wound with vitamin C and mesenchymal stromal cells. Advances in Skin and Wound Care 34(7):1-6 (2021).
Qi et al.: Exosomes Secreted by Human-Induced Pluripotent Stem Cell-Derived Mesenchymal Stem Cells Repair Critical-Sized Bone Defects through Enhanced Angiogenesis and Osteogenesis in Osteoporotic Rats. International Journal of Biological Sciences 12(7):836-849 (2016).
Qian et al., Vacuum therapy prevents corporeal veno-occlusive dysfunction and penile shrinkage in a cavernosal nerve injured rat model. Asian J Androl. 22(3):274-279 (2020).
Ragni, Enrico. et al. Secreted factors and extracellular vesicles account for the immunomodulatory and tissue regenerative properties of bone-marrow-derived mesenchymal stromal cells for osteoarthritis. Cells 11(21):3501, 1-21 (2022).
Rajan et al., Cannabidiol activates neuronal precursor genes in human gingival mesenchymal stromal cells. Journal of Cellular Biochemistry 118(6):1531-1546 (2016).
Rhee, Sung-Mi. et al. Injectable Tissue-engineered Soft Tissue for Tissue Augmentation. Journal of Korean Medical Science 29(Suppl3):S170-S175 (2014).
Rodriguez-Fontenla, Cristina. et al. Association of a BMP5 microsatellite with knee osteoarthritis: case-control study. Arthritis Research & Therapy 14(6):R257, 1-8 (2012).

(56) References Cited

OTHER PUBLICATIONS

Roffler et al., Anti-neoplastic glucuronide prodrug treatment of human tumor cells targeted with a monoclonal antibody-enzyme conjugate. Biochemical Pharmacology 42(10):2062-2065 (1991).
Rolandsson Enes, Sara. et al. Quantitative proteomic characterization of lung-MSC and bone marrow-MSC using DIA-mass spectrometry. Scientific Reports 7(1):9316, 1-12 (2017).
Roman-Blas, Jorge A. et al. Osteoarthritis associated with estrogen deficiency. Arthritis research & therapy 11(5):241, 1-14 (2009).
Romanov et al.: Comparative Analysis of Secretome of Human Umbilical Cord- and Bone Marrow-Derived Multipotent Mesenchymal Stromal Cells. Cell Technologies in Biology and Medicine. 4:535-540 (2019).
Rutgeerts, Paul. et al. Comparison of scheduled and episodic treatment strategies of infliximab in Crohn's disease. Gastroenterology 126(2):402-413 (2004).
Rutgeerts, Paul. et al. Infliximab for induction and maintenance therapy for ulcerative colitis. New England Journal of Medicine 353(23):2462-2476 (2005).
Ryan, J. M et al. Interferon-gamma Does Not Break, but Promotes the Immunosuppressive Capacity of Adult Human Mesenchymal Stem Cells. Clinical and Experimental Immunology 149(2):353-363 (2007).
Saad, Ahmed. et al. Autologous Mesenchymal Stem Cells Increase Cortical Perfusion in Renovascular Disease. Journal of the American Society of Nephrology 28(9):2777-2785 (2017).
Saldanha-Araujo et al.: Mesenchymal Stem Cells: A New Piece in the Puzzle of COVID-19 Treatment. Frontiers in Immunology. 11:1563. (2020).
Salisbury et al.: SNP and haplotype variation in the human genome. Mutat Res 526(1-2):53-61 (2003).
Sandborn, William J. et al. Adalimumab induction therapy for Crohn disease previously treated with infliximab: a randomized trial. Ann Intern Med 146(12):829-838 (2007).
Sandborn, William J. et al. Certolizumab Pegol for the Treatment of Crohn's Disease. The New England Journal of Medicine 357(3):228-238 (2007).
Sandborn, William J. et al. Vedolizumab as induction and maintenance therapy for Crohn's disease. N Engl J Med 369(8):711-721 (2013).
Santos et al., Three-dimensional spheroid cell culture of umbilical cord tissue-derived mesenchymal stromal cells leads to enhanced paracrine induction of wound healing. Stem Cell Res Ther. 6(1):90 (2015).
Sasaki, Gordon H. Clinical Use of Extracellular Vesicles in the Management of Male and Female Pattern Hair Loss: A Preliminary Retrospective Institutional Review Board Safety and Efficacy Study. Aesthetic Surgery Journal. Open Forum 4:ojac045, 1-15 (2022).
Savitz, Sean I. et al. Stem cell therapy as an emerging paradigm for stroke (STEPS) II. Stroke 42(3):825-829 (2011).
Savoie et al., Arthroscopic management of the arthritic elbow: indications, technique, and results. Journal of Shoulder and Elbow Surgery 8(3):214-219 (1999).
Schreiber, Stefan. et al. Maintenance therapy with certolizumab pegol for Crohn's disease. New England Journal of Medicine 357(3):239-250 (2007).
Schwartz, David A. et al. The Natural History of Fistulizing Crohn's Disease in Olmsted County, Minnesota. Gastroenterology 122(4):875-880 (2002).
Seldes et al., Anatomy, histologic features, and vascularity of the adult acetabular labrum. Clin Orthop Relat Res 2001(382):232-240 (2001).
Semont, Alexandra. et al. Mesenchymal Stem Cell Therapy Stimulates Endogenous Host Progenitor Cells to Improve Colonic Epithelial Regeneration. Plos One 8(7):e70170, 1-14 (2013).
Semont, Alexandra. et al. Mesenchymal Stem Cells Increase Self-renewal of Small Intestinal Epithelium and Accelerate Structural Recovery After Radiation Injury. Tissue Engineering 585:19-30 (2006).
Seneviratne, Suranjith L. et al. Mast cell disorders in Ehlers-Danlos syndrome. American Journal of Medical Genetics Part C: Seminars in Medical Genetics 175(1):226-236 (2017).
Sengupta et al.: Response to Lim et al. re "Exosomes Derived from Bone Marrow Mesenchymal Stem Cells as Treatment for Severe COVID-19". Stem Cells and Development. 29(14):879-881 (2020).
Sengupta, Vikram. et al. Exosomes derived from bone marrow mesenchymal stem cells as treatment for severe COVID-19. Stem cells and development 29(12):747-754 (2020).
Senter et al., Generation of 5-fluorouracil from 5-fluorocytosine by monoclonal antibody-cytosine deaminase conjugates. Bioconjugate Chemistry 2(6):447-451 (1991).
Senter et al., Generation of cytotoxic agents by targeted enzymes. Bioconjugate Chemistry 4(1):3-9 (1993).
Shao, Mingyang. et al. Exosomes derived from human umbilical cord mesenchymal stem cells ameliorate IL-6-induced acute liver injury through miR-455-3p. Stem Cell Res Ther 11(1):37, 1-13 (2020).
Shao, Yan. et al. BMP5 silencing inhibits chondrocyte senescence and apoptosis as well as osteoarthritis progression in mice. Aging (albany NY) 13(7):9646-9664 (2021).
Sheinkop et al.: Intra-Articular Injection of an Extracellular Vesicle Isolate Product to Treat Hip Osteoarthritis. International Journal of Recent Scientific Research. 10(12A):36230-36232 (2019).
Shen et al., Four genetic variants interact to confer susceptibility to atopic dermatitis in Chinese Han population. Molecular Genetics and Genomics 290(4):1493-1498 (2015).
Shen, Jie. TGF-beta signaling and the development of osteoarthritis. Bone research 2(1):1-7 (2014).
Shi, Ming. et al. A Pilot Study of Mesenchymal Stem Cell Therapy for Acute Liver Allograft Rejection. Stem Cells Translational Medicine 6(12):2053-2061 (2017).
Sivalingam et al., Single-nucleotide polymorphisms of the interleukin-18 gene promoter region in rheumatoid arthritis patients: protective effect of AA genotype. Tissue Antigens 62:498-504 (2003).
Skovronova, Renata. et al. Surface marker expresion in small and medium/large mesenchymal stromal cell-derived extracellular vesicles in naive or apoptotic condition using orthogonal techniques. bioRxiv. 1-32 (2021).
Smith et al., Isolation and implantation of autologous equine mesenchymal stem cells from bone marrow into the superficial digital flexor tendon as a potential novel treatment. Equine Vet J 35(1):99-102 (2003).
Smith et al., Mesenchymal stem cell therapy in equine tendinopathy. Disabil Rehabil 30:20-22, 1752-1758 (2008).
Smith, Temple F, and Michael S. Waterman. Comparison of Biosequences. Advances in Applied Mathematics 2(4):482-489 (1981).
Spencer, Paige S, and Jose M Barral. Genetic Code Redundancy and Its Influence on the Encoded Polypeptides. Computational and Structural Biotechnology Journal 1:e201204006, 1-8 (2012).
Stevanato et al.: Investigation of Content, Stoichiometry and Transfer of miRNA from Human Neural Stem Cell Line Derived Exomes. PLoS ONE. 11(1):e0146353 (2016).
Suarez-Faritas et al., Alopecia areata profiling shows TH1, TH2, and IL-23 cytokine activation without parallel TH17/TH22 skewing. J Allergy Clin Immunol. 136(5):1277-1287 (2015).
Sugimoto, K.: Basic knowledge of ultrasonography in sports injury and trauma. Medical Technology. 43(5):440-444 (2015).
Sun, JiaYang. et al. The healing effects of conditioned medium derived from mesenchymal stem cells on radiation-induced skin wounds in rats. Cell transplantation 28(1):105-115 (2019).
Sun, Lingyun. et al. Umbilical Cord Mesenchymal Stem Cell Transplantation in Severe and Refractory Systemic Lupus Erythematosus. Arthritis and Rheumatology 62(8):2467-2475 (2010).
Sun, Qipeng. et al. Allogeneic Mesenchymal Stem Cells as Induction Therapy Are Safe and Feasible in Renal Allografts: Pilot Results of a Multicenter Randomized Controlled Trial. Journal of Translational Medicine 16:52, 1-10 (2018).
Sun, Zhongwei. et al. Stem Cell Therapies for Chronic Obstructive Pulmonary Disease: Current Status of Pre-clinical Studies and Clinical Trials. Journal of Thoracic Disease 10(2):1084-1098 (2018).

(56) References Cited

OTHER PUBLICATIONS

Taisuke et al.: Mesenchymal Stem Cell-Derived Exosomes Promote Fracture Healing in a Mouse Model. Stem Cells Translational Medicine. Alphamed Press, Inc. US. 5(12):1620-1630 (2016).
Talegaonkar, The Role of Human MSC Derived Exosomes in the Treatment of Periodontal Diseases, Master's Thesis (2017).
Tamama, Kenichi, and Svetoslava S Kerpedjieva. Acceleration of Wound Healing by Multiple Growth Factors and Cytokines Secreted from Multipotential Stromal Cells/Mesenchymal Stem Cells. Advances in Wound Care 1(4):177-182 (2012).
Tamimi et al., Breast cancer susceptibility loci and mammographic density. Breast Cancer Research 10:R66 [1-9] (2008).
Tan, Guangyun. et al. NF-κB-dependent microRNA-125b up-regulation promotes cell survival by targeting p38alpha upon ultra-violet radiation. The Journal of biological chemistry 287(39):33036-33047 (2012).
Tang, Yuling et al. Human umbilical cord-derived mesenchymal stem cell transplantation improves the long COVID. Journal of Medical Virology 96(6) (2023).
Thelen et al., Depending on its nano spacing, ALCAM promotes cell attachment and axon growth. PLoS One 7(12):e40493 (2012).
Tinkle, Brad. et al. Hypermobile Ehlers-Danlos syndrome (aka Ehlers-Danlos syndrome Type III and Ehlers-Danlos syndrome hypermobility type): Clinical description and natural history. American Journal of Medical Genetics Part C: Seminars in Medical Genetics 175(1):48-69 (2017).
Toh et al., Advances in mesenchymal stem cell-based strategies for cartilage repair and regeneration. Stem Cell Reviews and Reports 10(5):686-696 (2014).
Toh, et al. MSC exosome as a cell-free MSC therapy for cartilage regeneration: Implications for osteoarthritis treatment. Seminars in Cell & Developmental Biology 67:56-64 (2017).
Toma, Jean G. et al. Isolation of Multipotent Adult Stem Cells From the Dermis of Mammalian Skin. Nature Cell Biology 3(9):778-784 (2001).
Ueshima et al.: Imaging Diagnosis of Hip Diseases-Diagnostic Imaging of Glenohumeral Labrum Injuries. MB Orthop. 26(5):191-197 (2013).
U.S. Appl. No. 17/059,874 Office Action dated Dec. 30, 2024.
U.S. Appl. No. 17/059,874 Office Action dated Jul. 11, 2024.
U.S. Appl. No. 17/059,874 Restriction Requirement dated Nov. 8, 2023.
U.S. Appl. No. 17/418,342 Office Action dated Dec. 30, 2024.
U.S. Appl. No. 17/418,342 Office Action dated Mar. 12, 2024.
U.S. Appl. No. 17/418,342 Office Action dated Sep. 5, 2024.
U.S. Appl. No. 17/420,500 Office Action dated Jan. 30, 2025.
U.S. Appl. No. 17/420,500 Office Action dated Jul. 18, 2024.
U.S. Appl. No. 17/420,500 Office Action dated Mar. 14, 2024.
U.S. Appl. No. 17/427,192 Office Action dated Apr. 17, 2024.
U.S. Appl. No. 17/427,192 Office Action dated Apr. 7, 2025.
U.S. Appl. No. 17/427,192 Office Action dated Oct. 28, 2024.
U.S. Appl. No. 17/429,553 Office Action dated Feb. 27, 2025.
U.S. Appl. No. 17/429,553 Office Action dated May 10, 2024.
U.S. Appl. No. 17/432,138 Office Action dated Feb. 15, 2024.
U.S. Appl. No. 17/606,514 Office Action dated Mar. 4, 2025.
U.S. Appl. No. 17/606,514 Office Action dated Sep. 16, 2024.
U.S. Appl. No. 17/628,011 Office Action dated Jun. 24, 2024.
Usmani, Shirine E. et al. Transforming growth factor-alpha induces endothelin receptor A expression in osteoarthritis. Journal of Orthopaedic Research 30(9): 1391-1397 (2012).
Usmani, Shirine E. The Role of Transforming Growth Factor Alpha in Osteoarthritis and Skeletal Development. Electronic Thesis and Dissertation Repository (2012).
Van Helvoort, E M. et al. The Role of Interleukin-4 and Interleukin-10 in Osteoarthritic Joint Disease: A Systematic Narrative Review. Cartilage 13(2):19476035221098167, 1-14 (2022).
Van Rijn, Kyra L. et al. Fibrosis and MAGNIFI-CD Activity Index at Magnetic Resonance Imaging to Predict Treatment Outcome in Perianal Fistulizing Crohn's Disease Patients. Journal of Crohn's and Colitis 16(5):708-716 (2022).
Vanamee et al., Structural principles of tumor necrosis factor superfamily signaling. Sci Signal. 11(511):eaao4910 (2018).
Vangsness et al., Adult human mesenchymal stem cells delivered via intra-articular injection to the knee following partial medial meniscectomy: a randomized, double-blind controlled study. J Bone Joint Surg Am. 96(2):90-98 (2014).
Vizoso et al.: Mesenchymal Stem CellSecretome: Toward Cell-Free Therapeutic Strategies in Regenerative Medicine.Int. J. Mol. Sci. 18:1852 (2017).
Vogel, Jon D. et al. Clinical Practice Guideline for the Management of Anorectal Abscess, Fistula-in-Ano, and Rectovaginal Fistula. Dis Colon Rectum 59(12):1117-1133 (2016).
Von Kaeppler, Ericka P. et al. Interleukin 4 promotes anti-inflammatory macrophages that clear cartilage debris and inhibits osteoclast development to protect against osteoarthritis. Clinical immunology 229:108784, 1-10 (2021).
Vuckovic et al., Cannabinoids and pain: new insights from old molecules. Front Pharmacol. 9:1259 (2018).
Vulliet, P. Richard. et al. Intra-coronary arterial injection of mesenchymal stromal cells and microinfarction in dogs. The Lancet 363(9411):783-784 (2004).
Walczak, Piotr. et al. Dual-modality monitoring of targeted intraarterial delivery of mesenchymal stem cells after transient ischemia. Stroke 39(5):1569-1574 (2008).
Wang, et al. Exosomes from embryonic mesenchymal stem cells alleviate osteoarthritis through balancing synthesis and degradation of cartilage extracellular matrix. Stem Cell Res Ther 8(1):189, 1-13 (2017).
Wang et al., Macrophages induce AKT/beta-catenin-dependent Lgr5(+) stem cell activation and hair follicle regeneration through TNF. Nat Commun. 8:14091 (2017).
Wang et al. Mesenchymal Stem Cells in the Wharton's Jelly of the Human Umbilical Cord. Stem Cells 22:1330-1337 (2004).
Wang et al., Upregulation of neuregulin-1 reverses signs of neuropathic pain in rats. Int J Clin Exp Pathol. 7(9):5916-5921 (2014).
Wang, Hai-jun. et al. Suppression of experimental osteoarthritis by adenovirus-mediated double gene transfer. Chinese medical journal 119(16):1365-1373 (2006).
Wang, Jiaqi. et al. Exosomes: A Novel Strategy for Treatment and Prevention of Diseases. Frontiers in Pharmacology 8:300, 1-13 (2017).
Watkins, Linda R. et al. Targeted interleukin-10 plasmid DNA therapy in the treatment of osteoarthritis: Toxicology and pain efficacy assessments. Brain, behavior, and immunity 90:155-166 (2020).
Website: ACS Webinars. https://www.acs.org/content/dam/acsorg/acs-webinars/2023/Slides/2023-03-09-exosomes-cas1.pdf (2023).
Website: https://www.youtube.com/watch?v=0RtcsA5MQPs (2019).
Website: https://www.youtube.com/watch?v=8nvgzHzBRP0 (2021).
Website: https://www.youtube.com/watch?v=dNkcd3x1HBY (2020.
Website: https://www.youtube.com/watch?v=RaV2s6x-clg (2020).
Website: https://www.youtube.com/watch?v=V606jT6aHH0 (2021).
Weiss et al.: Letter to the Editor. Response to Sengupta et al. Stem Cells and Development. 29(24):1533-1534 (2020).
Wen, Caining. et al. Insulin-like growth factor-1 in articular cartilage repair for osteoarthritis treatment. Arthritis research & therapy 23(1):277, 1-9 (2021).
Wesselius et al., Association of P2X7 receptor polymorphisms with bone mineral density and osteoporosis risk in a cohort of Dutch fracture patients. Osteoporosis International 24(4):1235-1246 (2012).
Wilkins, James M. et al. Association of a functional microsatellite within intron 1 of the BMP5 gene with susceptibility to osteoarthritis. BMC medical genetics 10:141, 1-10 (2009).
Wilson, James E. et al. Safety of bone marrow derived mesenchymal stem cell extracellular vesicle injection for lumbar facet joint pain. Regenerative Medicine 19(1):19-26 (2024).
Wilson, Jennifer G. et al. Mesenchymal stem (stromal) cells for treatment of ARDS: a phase 1 clinical trial. Lancet Respir Med 3(1):24-32 (2015).
Xia Xianfeng et al., Secretome from hypoxia-conditioned adipose-derived mesenchymal stem cells promotes the healing of gastric mucosal injury in a rodent model. Biochim Biophys Acta Mol Basis Dis 1864(1):178-188 (2018).

(56) References Cited

OTHER PUBLICATIONS

Xiong, Ye. et al. Mesenchymal stem cell-derived extracellular vesicles as a cell-free therapy for traumatic brain injury via neuroprotection and neurorepair. Chinese Journal of Neural Regeneration Research 19(1):49-54 (2024).
Xunian, Zhou, and Raghu Kalluri. Biology and Therapeutic Potential of Mesenchymal Stem Cell-derived Exosomes. Cancer Science 111(9):3100-3110 (2020).
Yamout, Bassem. et al. Bone Marrow Mesenchymal Stem Cell Transplantation in Patients With Multiple Sclerosis: a Pilot Study. Journal of Neuroimmunology 227(1-2):185-189 (2010).
Yan et al., The platelet-derived growth factor receptor/STAT3 signaling pathway regulates the phenotypic transition of corpus cavernosum smooth muscle in rats. PLoS One 12(2):e0172191 (2017).
Yan, Tingting. et al. Bone marrow mesenchymal stem cell-derived exosome miR-29b-3p alleviates UV irradiation-induced photoaging in skin fibroblast. Photodermatology, photoimmunology and photomedicine 39(3):235-245 (2023).
Yang et al., Cannabidiol regulates gene expression in encephalitogenic T cells using histone methylation and noncoding RNA during experimental autoimmune encephalomyelitis. Sci Rep. 9(1):15780 (2019).
Yang et al., Effect of mesenchymal stem cells in autoimmune arthritis. Eur. J. Med. 34:130-137 (2018).
Yap, Chloe X. et al. Dissection of Genetic Variation and Evidence for Pleiotropy in Male Pattern Baldness. Nature communications 9(1):5407, 1-12 (2018).
Ye, Hantao. et al. MST1 knockdown inhibits osteoarthritis progression through Parkin-mediated mitophagy and Nrf2/NF-κB signalling pathway. Journal of cellular and molecular medicine 28(11):e18476, 1-15 (2024).
Yepes, M. Urokinase-type plasminogen activator is a modulator of synaptic plasticity in the central nervous system: implications for neurorepair in the ischemic brain. Neural Regen Res. 15(4):620-624 (2020).
Yoshimura, Kotaro. et al. Characterization of Freshly Isolated and Cultured Cells Derived From the Fatty and Fluid Portions of Liposuction Aspirates. Journal of Cellular Physiology 208(1):64-76 (2006).
Yu, Bo. et al. Exosomes derived from mesenchymal stem cells. Int J Mol Sci 15(3):4142-4157 (2014).
Yuan et al.: Current advances in stem cell-based therapies for hari regeneration. E. J. of Pharmacology. 881(173197):1-12 (2020).
Zafranskaya, M. et al. PGE2 contributes to in vitro MSC-mediated inhibition of non-specific and antigen-specific T cell proliferation in MS patients. Scandinavian journal of immunology 78(5):455-462 (2013).
Zhang, et al. Exosomes derived from human embryonic mesenchymal stem cells promote osteochondral regeneration. Osteoarthritis Cartilage 24(12):2135-2140 (2016).
Zhang et al., MSC exosomes mediate cartilage repair by enhancing proliferation, attenuating apoptosis and modulating immune reactivity. Biomaterials 156:16-27 (2018).
Zhang, Yanlu. et al. Therapeutic role of microRNAs of small extracellular vesicles from human mesenchymal stromal/stem cells in treatment of experimental traumatic brain injury. Journal of neurotrauma 40(7-8):758-771 (2023).
Zhao et al., NLRP3 inflammasome activation plays a carcinogenic role through effector cytokine IL-18 in lymphoma. Oncotarget 8(65):108571-108583 (2017).
Zhao et al., Stem cells for thetreatment of knee osteoarthritis: a comprehensive review. Pain Physician 21:229-241 (2018).
Zhao, Xiaoyi. et al. RNA-seq characterization of histamine-releasing mast cells as potential therapeutic target of osteoarthritis. Clinical Immunology 244:109117 (2022).
Zhou et al., Cross-talk between interferon-gamma and interleukin-18 in melanogenesis. J Photochem Photobiol B. 163:133-143 (2016).
Zhou et al., Effects of adipose-derived stem cells plus insulin on erectile function in streptozotocin-induced diabetic rats. Int Urol Nephrol. 48(5):657-669 (2016).
Zhou et al., Interleukin-18 augments growth ability of primary human melanocytes by PTEN inactivation through the AKT/NF-KB pathway. Int J Biochem Cell Biol. 45:308-331 (2013).
Zhu, et al. Comparison of exosomes secreted by induced pluripotent stem cell-derived mesenchymal stem cells and synovial membrane-derived mesenchymal stem cells for the treatment of osteoarthritis. Stem Cell Res Ther 8(1):64, 1-11 (2017).
Zhu, Ling-Ping. et al. Hypoxia-elicited Mesenchymal Stem Cell-derived Exosomes Facilitates Cardiac Repair Through Mir-125b-mediated Prevention of Cell Death in Myocardial Infarction. Theranostics 8(22):6163-6177 (2018).
Zhu, Pengfei. et al. Recombinant platelet-derived growth factor-BB alleviates osteoarthritis in a rat model by decreasing chondrocyte apoptosis in vitro and in vivo. Journal of Cellular and Molecular Medicine 25(15):7472-7484 (2021).
Zhu, Ying-gang. et al. Human mesenchymal stem cell microvesicles for treatment of *Escherichia coli* endotoxin-induced acute lung injury in mice. Stem cells 32(1):116-125 (2014).
Zinoviev et al.: Clinical evaluation of the effectiveness of mesenchymal stem cells in thermal burns. Bulletin of the National Medical and Surgical Center named after N.A. Pirogov. 13(4):Abstract (2018).
Zohora, Fatema Tuz. et al. Secretome-based acellular therapy of bone marrow-derived mesenchymal stem cells in degenerative and immunological disorders: a narrative review. Heliyon 9(7):e18120, 1-20 (2023).
Zuker, M., On Finding All Suboptimal Foldings of an RNA Molecule. Science 244(4900):48-52 (1989).
Airan, Liu, and Qiu Haibo. et al. Research Progress on the Application of Mesenchymal Stem Cells in ALI/ARDS. Chinese Journal of Respiratory and Critical Care Medicine 9(3):332-335 (2010).
Co-pending Appl. Serial No. PCT/US2024/054785 Application as Filed Nov. 6, 2024.
Co-pending Appl. Serial No. PCT/US2024/054793 Application as Filed Nov. 6, 2024.
Co-pending Appl. Serial No. PCT/US2024/054794 Application as Filed Nov. 6, 2024.
Co-pending Appl. Serial No. PCT/US2024/054800 Application as Filed Nov. 6, 2024.
Co-pending Appl. Serial No. PCT/US2025/018972 Application as Filed Mar. 7, 2025.
Co-pending Appl. Serial No. PCT/US2025/020723 Application as Filed Mar. 20, 2025.
Co-pending Appl. Serial No. PCT/US2025/026049 Application as Filed Apr. 23, 2025.
Co-pending Appl. Serial No. PCT/US2025/026052 Application as Filed Apr. 23, 2025.
Co-pending U.S. Appl. No. 19/256,922 Claims as of Jul. 1, 2025.
Co-pending U.S. Appl. No. 19/300,197 Claims as of Aug. 14, 2025.
Co-pending U.S. Appl. No. 19/098,197, inventors Pettine; Kenneth Allen et al., filed Apr. 2, 2025.
Co-pending U.S. Appl. No. 19/256,922, inventors Pettine; Kenneth Allen et al., filed Jul. 1, 2025.
PCT/US2024/054785 International Search Report and Written Opinion dated Apr. 16, 2025.
Qingui, Chen, and Zeng Mian. Research Progress on Inductive Differentiation of Mesenchymal Stem Cells into Alveolar Epithelial Cells for the Treatment of Acute Respiratory Distress Syndrome. Chinese Journal of Cell and Stem Cell (Electric Edition) 7(2):124-128 (2017).
Zhuo, Miao. et al. Research Progress on Exosomes of Human Mesenchymal Stem Cells. Chinese Medical Biotechnology 14(4):361-365 (2019).

\* cited by examiner

TREATMENT OF FISTULA WITH BONE MARROW MESENCHYMAL STEM CELL DERIVED EXTRACELLULAR VESICLES

CROSS REFERENCE

This application is a continuation of International Application No. PCT/US2024/026444, filed on Apr. 26, 2024, which claims the benefit of U.S. Provisional Application No. 63/638,807, filed on Apr. 25, 2024, each of which is incorporated herein by reference in its entirety.

BACKGROUND

Perianal fistulas can result from a variety of conditions including, for example, inflammation of the colon, rectum, or anal glands. Standard surgical interventions for perianal fistula management include abscess drainage and seton replacement. Such techniques can be used as primary interventions in acute phase cases with sepsis. Other methods of managing perianal fistula include fistulotomy, ligation of intersphincteric fistula tract, video-assisted anal fistula treatment (VAAFT), mucosal advancement flaps, and fistula tract laser treatment (FiLaC®). Medical management for perianal fistula closure can also be used, including combined therapy with antitumor necrosis factor-α (TNF-α) (e.g., infliximab) and thiopurines. The efficacy of the combination of antitumor necrosis factor (TNF)-α and surgery is estimated to be ≤50%. Thus, there exists a need for safe and effective treatments for perianal fistulas.

SUMMARY

Disclosed herein is a method of treating perianal fistula in a subject in need thereof, the method comprising administering to the subject a composition comprising a therapeutic MSC secretome composition made by a method comprising: (a) culturing bone marrow-derived MSCs under the following conditions to produce an MSC conditioned media: (i) oxygen tension below 5%; and (ii) culture media having a pH below 7; (b) harvesting the MSC conditioned media; and (c) formulating the MSC conditioned media to produce the therapeutic MSC secretome composition, wherein the therapeutic MSC secretome composition comprises proteins and extracellular vesicles produced by the bone marrow-derived MSCs in step (a).

In some embodiments, the subject has cryptoglandular perianal fistula. In some embodiments, the subject has anal gland inflammation. In some embodiments, the subject has an inflammatory bowel disease. In some embodiments, the subject does not have an inflammatory bowel disease. In some embodiments, the subject does not have Crohn's disease. In some embodiments, the administering comprises one or more injections. In some embodiments, the one or more injections are to tissue surrounding the perianal fistula.

In some embodiments, the dosage of the therapeutic MSC secretome composition administered to the subject is a cell-equivalent dosage of 0.7 to 7 million cells/kg. In some embodiments, the therapeutic MSC secretome composition is administered at least a first time and a second time, wherein the first time and the second time are separated by at least 5 days.

In some embodiments, the subject has had a previous failed surgical treatment of the perianal fistula. In some embodiments, the subject has had a seton placement at least 2 weeks before the administering. In some embodiments, the culture media is serum-free. In some embodiments, the culture media has a glucose concentration below 4.5 g/L. In some embodiments, at least 80% of the extracellular vesicles in the therapeutic MSC secretome composition are $CD63^+$ $CD9^-$ $CD81^-$.

In some embodiments, the therapeutic MSC secretome composition comprises one or more of the following proteins: Ferritin, NUP85, LAMP2, GPR115, Serpin F1, OPN, PAI-1, DAPP1, Cathepsin B, Semaphorin 6C, PDGF R alpha, Sortilin, Serpin B6, Dkk-3, Thrombomodulin, PF4, MIF, Periostin, Furin, TIMP-1, Decorin, PCK1, CD99, CD63, CD9, CD81, Transferrin, DcR3, Lumican, TIMP-2, SLITRK5, FAP, Artemin, DPPII, cIAP-1, Pentraxin 3, Visfatin, Neprilysin, Albumin, Galectin-1, UNC5H3, IL-20 R beta, SREC-II, JAM-C, TNF RI, htPAPP-A, eNOS, MSP R, TPP1, LAMP1, B2M, NCAM-1, HIF-1 alpha, ST6GAL1, CD99-L2, Plexin A4, EMMPRIN, p53, Semaphorin 7A, NKp80, Cystatin B, Osteoadherin, Midkine, Calreticulin, Osteoactivin, Legumain, TAZ, Cathepsin L, RBP4, Serpin A4, JAM-A, MCSF, LIMPII, OPG, IL-22, Galectin-3, MOG, Trypsin 3, SIRP alpha, and Syndecan-4, and at least one protein selected from the following: Ferritin, IGFBP-4 IL-1 R6 GSTM1, NUP85, LAMP2, MeprinA, IL-1 F10, bIG-H3, GPR115, TGFbl, Ephrin-A4, CD109, Serpin F1, IGFBP-6, HS3ST4, Aminopeptidase LRAP, OPN, PAI-1, DAPP1, GDF-9, Cathepsin B, IGFBP-2, Semaphorin 6C, IGF-2, PDGF R alpha, Sortilin, Serpin B6, Dkk-3, CNTF, TSP-1, GM-CSF Ra, Thrombomodulin, Endoglycan, IGFBP-3, RGM-C, PF4, MIF, TGM4, Periostin, Furin, TIMP-1, PAPP-A, Decorin, PCK1, Arylsulfatase A, CD99, CA2, PRDX4, Transferrin, DcR3, GP73, LAIR2, ULBP-4, Lumican, TIMP-2, TFPI, SOX2, SLITRK5, FAP, Spinesin, ENPP-2, CD97, CTACK, Integrin alpha 1, EXTL3, IL-18 BPa, PD-L2, PSMA, IL-20 Ra, Glyoxalase II, Trypsin 1, IGF-2R, ADAMTSL-1, Erythropoietin, Plexin D1, DNMT3A, BCL-2, CL-P1, Ephrin-B3, FABP6, CHI3L1, FCRLS, TFF3, Artemin, DPPII, cIAP-1, PDGF Rb, Pentraxin 3, Angiotensinogen, Follistatin, CF VII, Persephin, TRAIL R1, THAP11, CD200, CLEC-2, AMIGO, IGFBP-5, PON1, SOX7, GALNT10, Visfatin, Progranulin, PCSK2, GKN1, IL-18, Neprilysin, Stabilin-2, IL-17 RD, Albumin, Follistatin-like 1, MMP-10, FKBP51, LRRC4, Pref-1, Galectin-1, Troponin C, UNC5H3, FLRT2, CD314, Semaphorin 6B, Netrin-4, CD27 Ligand, IL-20 R beta, Semaphorin 6A, TSK, Cytokeratin-8, CHST3, Mc1-1, DPPIV, SREC-II, Norrin, JAM-C, Bc1-10, Wnt-4, LSECtin, Kell, TNF RI, PTP1B, htPAPP-A, IDO, PDGF-CC, Galanin, Activin A, TLR2, SCCA2, FABP1, eNOS, SHP-1, ICOS, ClqTNF9, MMP-1, TC-PTP, IL-24, gp130, C-myc, LILRB4, BMP-2, MIA, CD34, CD63, CD9, CD81, IFNab R2, Glypican 2, MSP R, DSCAM, Matriptase, KIR2DL3, CD30, Siglec-10, CLEC-1, TPP1, Ubiquitin+1, ANGPTL4, TWEAK R, Nidogen-1, CD2, Kallikrein 1, TSLP R, LAMP1, TROY, VCAM-1, Siglec-11, S100A1, PAR1, Thyroid Peroxidase, Aminopeptidase P2, IL-1 RI, ADAMS, OSM R beta, Thrombospondin-2, SMPD1, B2M, MFRP, LRP-6, ST3GAL1, NCAM-1 (CD56), Granzyme B, Adiponectin, IL-22BP, TPST2, PD-ECGF, LH, LEDGF, Cyr61, ULBP-3, IFNb, THSD1, FGF-23, LAMA4, Adipsin, AIF, SorCS2, SULT2A1, CD39L2, Insulin R, HIF-1 alpha, OX40 Ligand, Pax3, UCH-L3, cMASP3, Langerin, Desmin, SOX9, ST6GAL1, MEP1B, CD99-L2, Plexin A4, Semaphorin 4D, ROBO2, PDX-1, APRIL, Neurturin, Kremen-2, EMMPRIN, Activin RIB, Neuroligin 2, Epiregulin, CASA, MMP-12, GALNT2, CEACAM-5, VEGF R1, DSPG3, SorCS1, Matrilin-2, sFRP-3, p53, EphB3, NCK1, Semaphorin 7A, NKp80, Prolactin, Cystatin B, Sirtuin 1, FGF-16, FGF R5, NQO-1, Semaphorin 6D, FGF-3, GATA-4, VAP-A, CHST2, Pappalysin-2, Syndecan-3, Jagged 1, AKR1C4, Olfactomedin-2, Osteoadherin, NKp44, Thyroglobulin, IL-21R, Chemerin, EphA1, CD48, MICB, FGF-5, TRANCE, CES2, ULBP-1, Integrin alpha 5, VAMP-2, FLRG, Ret Midkine, CD73, TRACP, proGRP, Granzyme H, PRX2, p2'7, Siglec-6, Dectin-1, CD51, Notch-1, Calreticulin, DR3, DCTN1, CDC25B, Osteoactivin, ACE, CA125, HAO-1, PSMA1, FCRLB, BMP-9, CRIM1, LIF, SPINK1, EphB6, RGM-B, HS3ST1, ROR1, CMG-2, 4-1BB Ligand, L1CAM-2, p63, Cathepsin V, Testican 2, Glypican 5, CD6, Siglec-2, Legumain, PRELP, CES1, TAZ, NSE, TECK, HTRA2, HIF-1 beta, TAFA1, Podocalyxin, RalA, CRELD2, GRAP2, SP-D, BID, GFR alpha-2, Notch-3, VEGF R3, DLL4, TGFb2, LIGHT, XIAP, ST8SIA1, Cathepsin L, 6Ckine, MIS RII, Kallikrein 5, TGM3, FCAR, Contactin-2, CD83, IL-1 R3, SALM4, GBA3, ROBO4, OSCAR, VEGF, IGSF3, Biglycan, Neudesin, ILT4, uPAR, Axl, WIF-1, IL-7 R alpha, GPR56, CEACAM-3, MCEMP1, FABP2, Plexin B3, MEPE, Activin RIIA, ANG-2, Cochlin, Presenilin 1, NPTXR, SLAM, COMT, SPHK1, RBP4, Nectin-1, GUSB, Nidogen-2, IL-17F, SR-AI, TAFA2, N-Cadherin, IL-17B, IL-17 RC, MIP-3b, Cystatin C, Cystatin D, AMSH, FcERI, CLEC10A, HGF R, ANG-1, Prolactin R, FGF-20, CD28, Nogo-A, HSD17B1, IL-19, Enteropeptidase, Cathepsin E, TSLP, TCN2, GDF-15, Epimorphin, GRKS, PD-1, Serpin A4, ADAM23, NOV, Galectin-2, Neurexin 3 beta, TLR3, Sirtuin 2, Numb, IL-28 R alpha, IL-33, Lin28, FCRL1, KLF4, NKp30, Lymphotactin, Cystatin SN, JAM-A, Calreticulin-2, ErbB4, BMP-8, IL-27 Ra, Fas, IL-4 Ra, Kallikrein 14, Matrilin-3, Olig2, Kallikrein 12, CA13, IL-9, Nectin-3, MPIF-1, Cystatin S, ADA, IL-2 Rb, GFR alpha-1, Smad4, ICAM-1, MEF2C, TREM-1, L-Selectin, Hepsin, CD42b, MCSF, RANK, CHST4, CA8, FCRL3, ASAH2, CF XIV, PYY, HGF, I-TAC, Semaphorin 4C, SorCS3, Tie-1, IL-31 RA, Arginase 1, POGLUT1, IL-1ra, Podoplanin, TIM-3, CREG, CD300f, uPA, EphA2, LRRTM4, LIMPII, Tenascin R, CPE, PECAM-1, DNAM-1, DKK-1, OPG, CPB1, TSH, MMP-2, Siglec-9, ICAM-3, Cystatin SA, Galectin-4, Pepsinogen II, Desmoglein-3, Nectin-4, SCF, Serpin A5, PTH, FGF-19, MSP, IL-28A, FGF-12, METAP2, ASAHL, EDIL3, NTAL, EGF R, TAFAS, Galectin-9, vWF-A2, TACE, Activin RIM, Cathepsin S, LDL R, BMPR-IA, OX40, IL-13 R2, B7-H4, MMP-13, ANGPTL7, TRAIL R4, IGSF4B, Sirtuin 5, PEAR1, SH2D1A, Cerberus 1, GDF-11, Nrf2, TROP-2, NUDTS, ROR2, EphB4, Glypican 1, LAP (TGFb1), Gash, Contactin-1, IL-27, UNC5H4, ICAM-2, MBL, HS3ST3B1, RCOR1, IL-10 Rb, XEDAR, IL-22, PILR-alpha, NRG1-131, FABP4, RGM-A, RELT, TrkC, CSa, SREC-I, Nestin, TPO, ErbB3, Kirre13, FLRT1, Galectin-3, CXCL16, JAM-B, DR6, Nogo Receptor, TLR4, VEGF R2, Tie-2, IL-15 R, Caspr2, LTbR, LAMP, ALCAM, GLP-1, NG2, IL-22 R alpha 1, AMIGO2, HCC-1, TFPI-2, ULBP-2, Desmoglein 2, Aggrecan, Syntaxin 4, VAMP-1, Nectin-2, FGF-21, Flt-3, GFAP, TIM-1, Inhibin A, Cadherin-4, PIGF-2, Neurogranin, HE4, IL-23 R, Galectin-7, GALNT3, GITR L, CD14, R-Spondin 2, CK19, Cardiotrophin-1, TREML1, HAPLN1, CD27, ANG-4, Siglec-7, CD155, VEGF-C, TNF RII, PGRP-S, SDF-la, PDGF-AB, GPVI, CD40, SCF R, Thrombospondin-5, IL-1 RII, Neuropilin-2, Cadherin-13, E-Selectin, GITR, WISP-1, Renin, AgRP, MDL-1, ROBO3, RANTES, Endocan, Granulysin, hCGb, Mesothelin, TLR1, TRAIL, MOG, DDR1, NGF R, TRAIL R3, Trypsin 3, ARSB, LIF R alpha, BAFF R, CD157, Granzyme A, 2B4, ESAM, IL-1 R4, CXCL14, IL-31, SIRP alpha, Uromodulin, CTRC, CEACAM-1, TARC, MIP-3a, SDF-lb, NKp46, MCP-3, IL-32 alpha, TGFb3 FOLR2, CD58, IL-23, CD36, TNFb, Shh-N, Ficolin-1, Reg4, ILT2, Mer, TREM-2, Flt-3L, CDS, IL-6, CD229, Insulin, Syntaxin 6, GRO, Bcl-w, Lipocalin-2, PDGF-AA, IL-2 Ra, Angiogenin, LYVE-1, CD4, RAGE, CDNF, Brevican, NAP-2, PU.1, EDAR, ADAMTS13, Kynureninase, PTH1R, IFN-gamma R1, CrkL, B7-1, PARC, Draxin, VE-Cadherin, Procalcitonin, SOX15, Kallikrein 11, BCMA, Dectin-2, EpCAM, HCC-4, TGFa, IP-10, BLAME, CILP-1, PIGF, LOX-1, MCP-2, Resistin, HVEM, ENPP-7, Syndecan-4, IL-2 Rg, MICA, Dopa Decarboxylase, NPDC-1, MCP-4, EG-VEGF, Glycoprotein V, Semaphorin 4G, IL-12p40, PSA-total, IL-15, MAP1D, Clq, TNF4, Dtk, Endoglin, ENA-78, Reg3A, MIP-lb, FGF-17, IL-6R, IL-8, Galectin-8, CA4, Cystatin E M, FUT8, B7-H3, GCP-2, CD40L, MDC, 4-1BB, HO-1, SOST, S100A13, Kallikrein 7, and IL-13.

In some embodiments, the therapeutic MSC secretome composition comprises one or more of the following nucleic acids: hsa-let-7a-5p, hsa-let-7b-5p, hsa-let-7c-5p, hsa-let-7d-3p, hsa-let-7e-5p, hsa-let-7g-5p, hsa-let-7i, hsa-let-7i-5p, hsa-miR-100-5p, hsa-miR-103a-3p, hsa-miR-106a-5p, hsa-miR-106b-5p, hsa-mir-10b, hsa-miR-10b-5p, hsa-mir-1246, hsa-miR-1246, hsa-miR-125a-5p, hsa-miR-125b-5p, hsa-miR-130a-3p, hsa-mir-130b, hsa-miR-130b-3p, hsa-miR-132-3p, hsa-miR-136-5p, hsa-miR-138-5p, hsa-miR-139-5p, hsa-mir-140, hsa-miR-140-3p, hsa-miR-145-5p, hsa-mir-146a, hsa-miR-146a-5p, hsa-miR-148a-3p, hsa-miR-152-3p, hsa-miR-15a-5p, hsa-miR-15b-5p, hsa-mir-16-1, hsa-mir-16-2, hsa-miR-16-5p, hsa-miR-1'7-5p, hsa-miR-181a-5p, hsa-miR-191-5p, hsa-miR-193a-5p, hsa-miR-193b-3p, hsa-miR-19'7-3p, hsa-miR-199a-3p, hsa-miR-199a-5p, hsa-miR-199b-5p, hsa-miR-19a-3p, hsa-miR-19b-3p, hsa-miR-20a-5p, hsa-mir-203a, hsa-miR-203a-3p, hsa-miR-214-3p, hsa-mir-21, hsa-miR-21-3p, hsa-miR-21-5p, hsa-mir-221, hsa-miR-221-3p, hsa-mir-222, hsa-miR-222-3p, hsa-miR-22-3p, hsa-miR-23a-3p, hsa-miR-23b-3p, hsa-mir-24-1, hsa-mir-24-2, hsa-miR-24-3p, hsa-mir-25, hsa-miR-25-3p, hsa-miR-26a-5p, hsa-miR-27a-3p, hsa-mir-27b, hsa-miR-27b-3p, hsa-miR-29a-3p, hsa-miR-29c-3p, hsa-miR-30a-5p, hsa-miR-30a-5p, hsa-miR-30b-5p, hsa-miR-30c-5p, hsa-mir-30d, hsa-miR-30d-5p, hsa-mir-30e, hsa-miR-30e-5p, hsa-miR-31-3p, hsa-miR-31-5p, hsa-miR-320a, hsa-miR-342-3p, hsa-miR-345-5p, hsa-miR-34a-5p, hsa-miR-361-5p, hsa-miR-376a-3p, hsa-miR-376c-3p, hsa-miR-423-3p, hsa-miR-423-5p, hsa-miR-424-5p, hsa-miR-484, hsa-mir-486-1, hsa-mir-486-2, hsa-miR-486-5p, hsa-miR-570-3p, hsa-miR-574-3p, hsa-miR-663a, hsa-miR-874-3p, hsa-mir-92a-1, hsa-mir-92a-2, hsa-miR-92a-3p, hsa-miR-92b-3p, hsa-mir-93, hsa-miR-93-5p, hsa-miR-940, hsa-miR-99a-5p, and hsa-miR-99b-5p.

In some aspects, disclosed herein is a method of treating perianal fistula in a subject in need thereof, the method comprising administering to the subject a composition comprising a therapeutic MSC secretome composition comprising extracellular vesicles, wherein at least 80% of the extracellular vesicles in the therapeutic MSC secretome composition are CD63+ CD9− CD81−.

In some embodiments, the therapeutic MSC secretome composition further comprises one or more of the following proteins: Ferritin, NUP85, LAMP2, GPR115, Serpin Fl, OPN, PAI-1, DAPP1, Cathepsin B, Semaphorin 6C, PDGF R alpha, Sortilin, Serpin B6, Dkk-3, Thrombomodulin, PF4, MIF, Periostin, Furin, TIMP-1, Decorin, PCK1, CD99, CD63, CD9, CD81, Transferrin, DcR3, Lumican, TIMP-2, SLITRK5, FAP, Artemin, DPPII, cIAP-1, Pentraxin 3, Visfatin, Neprilysin, Albumin, Galectin-1, UNC5H3, IL-20 R beta, SREC-II, JAM-C, TNF RI, htPAPP-A, eNOS, MSP R, TPP1, LAMP1, B2M, NCAM-1, HIF-1 alpha, ST6GAL1, CD99-L2, Plexin A4, EMMPRIN, p53, Semaphorin 7A, NKp80, Cystatin B, Osteoadherin, Midkine, Calreticulin, Osteoactivin, Legumain, TAZ, Cathepsin L, RBP4, Serpin A4, JAM-A, MCSF, LIMPII, OPG, IL-22, Galectin-3, MOG, Trypsin 3, SIRP alpha, and Syndecan-4, and at least one protein selected from the following: Ferritin, IGFBP-4 IL-1 R6 GSTM1, NUP85, LAMP2, MeprinA, IL-1 F10, bIG-H3, GPR115, TGFbl, Ephrin-A4, CD109, Serpin Fl, IGFBP-6, HS3ST4, Aminopeptidase LRAP, OPN, PAI-1, DAPP1, GDF-9, Cathepsin B, IGFBP-2, Semaphorin 6C, IGF-2, PDGF R alpha, Sortilin, Serpin B6, Dkk-3, CNTF, TSP-1, GM-CSF Ra, Thrombomodulin, Endoglycan, IGFBP-3, RGM-C, PF4, MIF, TGM4, Periostin, Furin, TIMP-1, PAPP-A, Decorin, PCK1, Arylsulfatase A, CD99, CA2, PRDX4, Transferrin, DcR3, GP73, LAIR2, ULBP-4, Lumican, TIMP-2, TFPI, SOX2, SLITRK5, FAP, Spinesin, ENPP-2, CD97, CTACK, Integrin alpha 1, EXTL3, IL-18 BPa, PD-L2, PSMA, IL-20 Ra, Glyoxalase II, Trypsin 1, IGF-2R, ADAMTSL-1, Erythropoietin, Plexin D1, DNMT3A, BCL-2, CL-P1, Ephrin-B3, FABP6, CHI3L1, FCRLS, TFF3, Artemin, DPPII, cIAP-1, PDGF Rb, Pentraxin 3, Angiotensinogen, Follistatin, CF VII, Persephin, TRAIL R1, THAP11, CD200, CLEC-2, AMIGO, IGFBP-5, PON1, SOX7, GALNT10, Visfatin, Progranulin, PCSK2, GKN1, IL-18, Neprilysin, Stabilin-2, IL-17 RD, Albumin, Follistatin-like 1, MMP-10, FKBP51, LRRC4, Pref-1, Galectin-1, Troponin C, UNC5H3, FLRT2, CD314, Semaphorin 6B, Netrin-4, CD27 Ligand, IL-20 R beta, Semaphorin 6A, TSK, Cytokeratin-8, CHST3, Mc1-1, DPPIV, SREC-II, Norrin, JAM-C, Bc1-10, Wnt-4, LSECtin, Kell, TNF RI, PTP1B, htPAPP-A, IDO, PDGF-CC, Galanin, Activin A, TLR2, SCCA2, FABP1, eNOS, SHP-1, ICOS, ClqTNF9, MMP-1, TC-PTP, IL-24, gp130, C-myc, LILRB4, BMP-2, MIA, CD34, CD63, CD9, CD81, IFNab R2, Glypican 2, MSP R, DSCAM, Matriptase, KIR2DL3, CD30, Siglec-10, CLEC-1, TPP1, Ubiquitin+1, ANGPTL4, TWEAK R, Nidogen-1, CD2, Kallikrein 1, TSLP R, LAMP1, TROY, VCAM-1, Siglec-11, S100A1, PAR1, Thyroid Peroxidase, Aminopeptidase P2, IL-1 RI, ADAMS, OSM R beta, Thrombospondin-2, SMPD1, B2M, MFRP, LRP-6, ST3GAL1, NCAM-1 (CD56), Granzyme B, Adiponectin, IL-22BP, TPST2, PD-ECGF, LH, LEDGF, Cyr61, ULBP-3, IFNb, THSD1, FGF-23, LAMA4, Adipsin, AIF, SorCS2, SULT2A1, CD39L2, Insulin R, HIF-1 alpha, OX40 Ligand, Pax3, UCH-L3, cMASP3, Langerin, Desmin, SOX9, ST6GAL1, MEP1B, CD99-L2, Plexin A4, Semaphorin 4D, ROBO2, PDX-1, APRIL, Neurturin, Kremen-2, EMMPRIN, Activin RIB, Neuroligin 2, Epiregulin, CASA, MMP-12, GALNT2, CEACAM-5, VEGF R1, DSPG3, SorCS1, Matrilin-2, sFRP-3, p53, EphB3, NCK1, Semaphorin 7A, NKp80, Prolactin, Cystatin B, Sirtuin 1, FGF-16, FGF R5, NQO-1, Semaphorin 6D, FGF-3, GATA-4, VAP-A, CHST2, Pappalysin-2, Syndecan-3, Jagged 1, AKR1C4, Olfactomedin-2, Osteoadherin, NKp44, Thyroglobulin, IL-21R, Chemerin, EphA1, CD48, MICB, FGF-5, TRANCE, CES2, ULBP-1, Integrin alpha 5, VAMP-2, FLRG, Ret Midkine, CD73, TRACP, proGRP, Granzyme H, PRX2, p2'7, Siglec-6, Dectin-1, CD51, Notch-1, Calreticulin, DR3, DCTN1, CDC25B, Osteoactivin, ACE, CA125, HAO-1, PSMA1, FCRLB, BMP-9, CRIM1, LIF, SPINK1, EphB6, RGM-B, HS3ST1, ROR1, CMG-2, 4-1BB Ligand, L1CAM-2, p63, Cathepsin V, Testican 2, Glypican 5, CD6, Siglec-2, Legumain, PRELP, CES1, TAZ, NSE, TECK, HTRA2, HIF-1 beta, TAFA1, Podocalyxin, RalA, CRELD2, GRAP2, SP-D, BID, GFR alpha-2, Notch-3, VEGF R3, DLL4, TGFb2, LIGHT, XIAP, ST8SIA1, Cathepsin L, 6Ckine, MIS RII, Kallikrein 5, TGM3, FCAR, Contactin-2, CD83, IL-1 R3, SALM4, GBA3, ROBO4, OSCAR, VEGF, IGSF3, Biglycan, Neudesin, ILT4, uPAR, Axl, WIF-1, IL-7 R alpha, GPR56, CEACAM-3, MCEMP1, FABP2, Plexin B3, MEPE, Activin RIIA, ANG-2, Cochlin, Presenilin 1, NPTXR, SLAM, COMT, SPHK1, RBP4, Nectin-1, GUSB, Nidogen-2, IL-17F, SR-AI, TAFA2, N-Cadherin, IL-17B, IL-17 RC, MIP-3b, Cystatin C, Cystatin D, AMSH, FcERI, CLEC10A, HGF R, ANG-1, Prolactin R, FGF-20, CD28, Nogo-A, HSD17B1, IL-19, Enteropeptidase, Cathepsin E, TSLP, TCN2, GDF-15, Epimorphin, GRKS, PD-1, Serpin A4, ADAM23, NOV, Galectin-2, Neurexin 3 beta, TLR3, Sirtuin 2, Numb, IL-28 R alpha, IL-33, Lin28, FCRL1, KLF4, NKp30, Lymphotactin, Cystatin SN, JAM-A, Calreticulin-2, ErbB4, BMP-8, IL-27 Ra, Fas, IL-4 Ra, Kallikrein 14, Matrilin-3, Olig2, Kallikrein 12, CA13, IL-9, Nectin-3, MPIF-1, Cystatin S, ADA, IL-2 Rb, GFR alpha-1, Smad4, ICAM-1, MEF2C, TREM-1, L-Selectin, Hepsin, CD42b, MCSF, RANK, CHST4, CA8, FCRL3, ASAH2, CF XIV, PYY, HGF, I-TAC, Semaphorin 4C, SorCS3, Tie-1, IL-31 RA, Arginase 1, POGLUT1, IL-1ra, Podoplanin, TIM-3, CREG, CD300f, uPA, EphA2, LRRTM4, LIMPII, Tenascin R, CPE, PECAM-1, DNAM-1, DKK-1, OPG, CPB1, TSH, MMP-2, Siglec-9, ICAM-3, Cystatin SA, Galectin-4, Pepsinogen II, Desmoglein-3, Nectin-4, SCF, Serpin A5, PTH, FGF-19, MSP, IL-28A, FGF-12, METAP2, ASAHL, EDIL3, NTAL, EGF R, TAFAS, Galectin-9, vWF-A2, TACE, Activin RIM, Cathepsin S, LDL R, BMPR-IA, OX40, IL-13 R2, B7-H4, MMP-13, ANGPTL7, TRAIL R4, IGSF4B, Sirtuin 5, PEAR1, SH2D1A, Cerberus 1, GDF-11, Nrf2, TROP-2, NUDTS, ROR2, EphB4, Glypican 1, LAP (TGFb1), Gash, Contactin-1, IL-27, UNC5H4, ICAM-2, MBL, HS3ST3B1, RCOR1, IL-10 Rb, XEDAR, IL-22, PILR-alpha, NRG1-131, FABP4, RGM-A, RELT, TrkC, CSa, SREC-I, Nestin, TPO, ErbB3, Kirre13, FLRT1, Galectin-3, CXCL16, JAM-B, DR6, Nogo Receptor, TLR4, VEGF R2, Tie-2, IL-15 R, Caspr2, LTbR, LAMP, ALCAM, GLP-1, NG2, IL-22 R alpha 1, AMIGO2, HCC-1, TFPI-2, ULBP-2, Desmoglein 2, Aggrecan, Syntaxin 4, VAMP-1, Nectin-2, FGF-21, Flt-3, GFAP, TIM-1, Inhibin A, Cadherin-4, P1GF-2, Neurogranin, HE4, IL-23 R, Galectin-7, GALNT3, GITR L, CD14, R-Spondin 2, CK19, Cardiotrophin-1, TREML1, HAPLN1, CD27, ANG-4, Siglec-7, CD155, VEGF-C, TNF RII, PGRP-S, SDF-la, PDGF-AB, GPVI, CD40, SCF R, Thrombospondin-5, IL-1 RII, Neuropilin-2, Cadherin-13, E-Selectin, GITR, WISP-1, Renin, AgRP, MDL-1, ROBO3, RANTES, Endocan, Granulysin, hCGb, Mesothelin, TLR1, TRAIL, MOG, DDR1, NGF R, TRAIL R3, Trypsin 3, ARSB, LIF R alpha, BAFF R, CD157, Granzyme A, 2B4, ESAM, IL-1 R4, CXCL14, IL-31, SIRP alpha, Uromodulin, CTRC, CEACAM-1, TARC, MIP-3a, SDF-lb, NKp46, MCP-3, IL-32 alpha, TGFb3 FOLR2, CD58, IL-23, CD36, TNFb, Shh-N, Ficolin-1, Reg4, ILT2, Mer, TREM-2, Flt-3L, CDS, IL-6, CD229, Insulin, Syntaxin 6, GRO, Bc1-w, Lipocalin-2, PDGF-AA, IL-2 Ra, Angiogenin, LYVE-1, CD4, RAGE, CDNF, Brevican, NAP-2, PU.1, EDAR, ADAMTS13, Kynureninase, PTH1R, IFN-gamma RI, CrkL, B7-1, PARC, Draxin, VE-Cadherin, Procalcitonin, SOX15, Kallikrein 11, BCMA, Dectin-2, EpCAM, HCC-4, TGFa, IP-10, BLAME, CILP-1, PIGF, LOX-1, MCP-2, Resistin, HVEM, ENPP-7, Syndecan-4, IL-2 Rg, MICA, Dopa Decarboxylase, NPDC-1, MCP-4, EG-VEGF, Glycoprotein V, Semaphorin 4G, IL-12p40, PSA-total, IL-15, MAP1D, Clq, TNF4, Dtk, Endoglin, ENA-78, Reg3A, MIP-lb, FGF-17, IL-6R, IL-8, Galectin-8, CA4, Cystatin E M, FUT8, B7-H3, GCP-2, CD40L, MDC, 4-1BB, HO-1, SOST, S100A13, Kallikrein 7, and IL-13.

In some embodiments, the extracellular vesicles comprise one or more of the following nucleic acids: hsa-let-7a-5p, hsa-let-7b-5p, hsa-let-7c-5p, hsa-let-7d-3p, hsa-let-7e-5p, hsa-let-7g-5p, hsa-let-7i, hsa-let-7i-5p, hsa-miR-100-5p, hsa-miR-103a-3p, hsa-miR-106a-5p, hsa-miR-106b-5p, hsa-mir-10b, hsa-miR-10b-5p, hsa-mir-1246, hsa-miR-1246, hsa-miR-125a-5p, hsa-miR-125b-5p, hsa-miR-130a-3p, hsa-mir-130b, hsa-miR-130b-3p, hsa-miR-132-3p, hsa-miR-136-5p, hsa-miR-138-5p, hsa-miR-139-5p, hsa-mir-140, hsa-miR-140-3p, hsa-miR-145-5p, hsa-mir-146a, hsa-miR-146a-5p, hsa-miR-148a-3p, hsa-miR-152-3p, hsa-miR-15a-5p, hsa-miR-15b-5p, hsa-mir-16-1, hsa-mir-16-2, hsa-miR-16-5p, hsa-miR-1'7-5p, hsa-miR-181a-5p, hsa-miR-191-5p, hsa-miR-193a-5p, hsa-miR-193b-3p, hsa-miR-19'7-3p, hsa-miR-199a-3p, hsa-miR-199a-5p, hsa-miR-199b-5p, hsa-miR-19a-3p, hsa-miR-19b-3p, hsa-miR-20a-5p, hsa-mir-203a, hsa-miR-203a-3p, hsa-miR-214-3p, hsa-mir-21, hsa-miR-21-3p, hsa-miR-21-5p, hsa-mir-221, hsa-miR-221-3p, hsa-mir-222, hsa-miR-222-3p, hsa-miR-22-3p, hsa-miR-23a-3p, hsa-miR-23b-3p, hsa-mir-24-1, hsa-mir-24-2, hsa-miR-24-3p, hsa-mir-25, hsa-miR-25-3p, hsa-miR-26a-5p, hsa-miR-27a-3p, hsa-mir-27b, hsa-miR-27b-3p, hsa-miR-29a-3p, hsa-miR-29c-3p, hsa-miR-30a-5p, hsa-miR-30a-5p, hsa-miR-30b-5p, hsa-miR-30c-5p, hsa-mir-30d, hsa-miR-30d-5p, hsa-mir-30e, hsa-miR-30e-5p, hsa-miR-31-3p, hsa-miR-31-5p, hsa-miR-320a, hsa-miR-342-3p, hsa-miR-345-5p, hsa-miR-34a-5p, hsa-miR-361-5p, hsa-miR-376a-3p, hsa-miR-376c-3p, hsa-miR-423-3p, hsa-miR-423-5p, hsa-miR-424-5p, hsa-miR-484, hsa-mir-486-1, hsa-mir-486-2, hsa-miR-486-5p, hsa-miR-570-3p, hsa-miR-574-3p, hsa-miR-663a, hsa-miR-874-3p, hsa-mir-92a-1, hsa-mir-92a-2, hsa-miR-92a-3p, hsa-miR-92b-3p, hsa-mir-93, hsa-miR-93-5p, hsa-miR-940, hsa-miR-99a-5p, and hsa-miR-99b-5p.

In some embodiments, the subject has cryptoglandular perianal fistula. In some embodiments, the subject has anal gland inflammation. In some embodiments, the subject has an inflammatory bowel disease. In some embodiments, the subject does not have an inflammatory bowel disease. In some embodiments, the subject does not have Crohn's disease. In some embodiments, the administering comprises one or more injections. In some embodiments, the one or more injections are to tissue surrounding the perianal fistula.

In some embodiments, the dosage of the therapeutic MSC secretome composition administered to the subject is a cell-equivalent dosage of 0.7 to 7 million cells/kg. In some embodiments, the therapeutic MSC secretome composition is administered at least a first time and a second time, wherein the first time and the second time are separated by at least 5 days. In some embodiments, the subject has had a previous failed surgical treatment of the perianal fistula. In some embodiments, the subject has had a seton placement at least 2 weeks before the administering.

INCORPORATION BY REFERENCE

Each patent, publication, and non-patent literature cited in the application is hereby incorporated by reference in its entirety as if each was incorporated by reference individually. To the extent publications and patents or patent applications incorporated by reference contradict the disclosure contained in the specification, the specification is intended to supersede and/or take precedence over any such contradictory material.

DETAILED DESCRIPTION

I. Definitions

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise. The terms "and/or" and "any combination thereof" and their grammatical equivalents as used herein, can be used interchangeably. These terms can convey that any combination is specifically contemplated. Solely for illustrative purposes, the following phrases "A, B, and/or C" or "A, B, C, or any combination thereof" can mean "A individually; B individually; C individually; A and B; B and C; A and C; and A, B, and C." The term "or" can be used conjunctively or disjunctively, unless the context specifically refers to a disjunctive use.

The term "about" or "approximately" can mean within an acceptable error range for the particular value, which may depend in part on how the value is measured or determined, e.g., the limitations of the measurement system. For example, "about" can mean within 1 or more than 1 standard deviation. Alternatively, "about" can mean a range of up to 20%, up to 10%, up to 5%, or up to 1% of a given value. Alternatively, particularly with respect to biological systems or processes, the term can mean within an order of magnitude, within 5-fold, or within 2-fold, of a value. Where particular values are described in the application and claims, unless otherwise stated the term "about" meaning within an acceptable error range for the particular value should be assumed.

Throughout this disclosure, numerical features are presented in a range format. It should be understood that the description in range format is merely for convenience and brevity and should not be construed as an inflexible limitation on the scope of any embodiments. Accordingly, the description of a range should be considered to have specifically disclosed all the possible subranges as well as individual numerical values within that range to the tenth of the unit of the lower limit unless the context clearly dictates otherwise. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual values within that range, for example, 1.1, 2, 2.3, 5, and 5.9. This applies regardless of the breadth of the range. The upper and lower limits of these intervening ranges may independently be included in the smaller ranges, and are also encompassed within the present disclosure, subject to any specifically excluded limit in the stated range. Where the stated range includes one or both of the limits, ranges excluding either or both of those included limits are also included in the present disclosure, unless the context clearly dictates otherwise.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. It is contemplated that any embodiment discussed in this specification can be implemented with respect to any method or composition of the present disclosure, and vice versa. Furthermore, compositions of the present disclosure can be used to achieve methods of the present disclosure.

Reference in the specification to "some embodiments," "an embodiment," "one embodiment" or "other embodiments" means that a particular feature, structure, or characteristic described in connection with the embodiments is included in at least some embodiments, but not necessarily all embodiments, of the present disclosures. To facilitate an understanding of the present disclosure, a number of terms and phrases are defined below.

Certain specific details of this description are set forth in order to provide a thorough understanding of various embodiments. However, one skilled in the art will understand that the present disclosure may be practiced without these details. In other instances, well-known techniques or methods have not been shown or described in detail to avoid unnecessarily obscuring descriptions of the embodiments. Unless the context requires otherwise, throughout the specification and claims which follow, the word "comprise" and variations thereof, such as, "comprises" and "comprising" are to be construed in an open, inclusive sense, that is, as "including, but not limited to." Further, headings provided herein are for convenience only and do not interpret the scope or meaning of the claimed disclosure.

Although methods and materials similar or equivalent to those described herein can be used in the practice or testing of the present disclosure, suitable methods, and materials are described below.

II. Therapeutic Composition

Disclosed are the components to be used to prepare the disclosed compositions as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds may not be explicitly disclosed, each is specifically contemplated and described herein. For example, if a particular MSC secretome (including, but not limited to a MSC exosome (with or without growth factors) referred to herein as an extracellular vesicle isolate product (EVIP)) is disclosed and discussed and a number of modifications that can be made to a number of molecules including the MSC secretome are discussed, specifically contemplated is each and every combination and permutation of MSC secretome and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the disclosed compositions. Thus, if there are a variety of additional steps that can be performed it is understood that each of these additional steps can be performed with any specific embodiment or combination of embodiments of the disclosed methods.

A primary trophic property of MSCs is the secretion of growth factors and exosomes to induce cell proliferation and angiogenesis. Exosomes express mitogenic proteins such as transforming growth factor-alpha (TGF-α), TGFβ, hepatocyte growth factor (HGF), epithelial growth factor (EGF), basic fibroblast growth factor (FGF-2) and insulin-like growth factor-1 (IGF-1). These increase fibroblast, epithelial and endothelial cell division. Vascular endothelial growth factor (VEGF), IGF-1, EGF and angiopoietin-1 are released to recruit endothelial lineage cells and initiate vascularization. MSCs assist via paracrine mechanisms and modulate the regenerative environment via anti-inflammatory and immunomodulatory mechanisms. In response to inflammatory molecules such as interleukin-1 (IL-1), IL-6, IL-2, IL-12, tumor necrosis factor-α (TNF-α) and interferon-gamma (INF-γ), MSCs secrete an array of growth factors and anti-inflammatory proteins with complex feedback mechanisms among the many types of immune cells. The key immunomodulatory cytokines include prostaglandin 2, TGF-131, HGF, SDF-1, nitrous oxide, indoleamine 2, 3-dioxygenase, IL-4, IL-10, IL-1 receptor antagonist and soluble tumor necrosis factor-α receptor. MSCs prevent proliferation and function of many inflammatory immune cells, including T-cells, natural killer cells, B-cells, monocytes, macrophages, and dendritic cells. Although MSCs across species are able to regulate T-cell activity, the mechanisms are not identical across mammalian species.

A characteristic of chronically inflamed environments is a persistent imbalance in the types of helper T-cells and macrophages. MSC exosomes indirectly promote the transition of TH1 to TH2 cells by reducing INF-γ and increasing IL-4 and IL-10. The restored TH1/TH2 balance has been shown to improve tissue regeneration in cartilage, muscle, and other soft tissue injuries, alleviate symptoms of autoimmune diseases, and have an anti-diabetic effect. Similarly, reduction in INF-γ and secretion of IL-4 promotes a shift in macrophages from M1 (proinflammatory, anti-angiogenic and tissue growth inhibition) to M2 (anti-inflammatory, pro-remodeling and tissue healing) type, an effect required for skeletal, muscular, and neural healing and regeneration.

Disclosed herein is a complex composition of secreted biomolecules (proteins, lipids, and ribonucleic acids) and/or extracellular vesicles comprising biomolecules, originating from mesenchymal lineage cells. In one aspect, disclosed herein are compositions comprising a therapeutically effective amount of a MSC secretome (such as, for example, including, but not limited to MSC growth factor, MSC exosome, MSC extracts and/or extracellular vesicle comprising compositions) and one or more biomolecules (such as, for example, a peptide, polypeptide, protein, siRNA, shRNA, and/or microRNA (miRNA)).

In some embodiments, the therapeutic composition comprises 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 40, 45, 50, 55, 60, 65, 70, 75, 80, 85, 90, 95, or 100 or more of the following proteins, in any combination, or all of the following proteins: Ferritin, NUP85, LAMP2, GPR115, Serpin Fl, OPN, PAI-1, DAPP1, Cathepsin B, Semaphorin 6C, PDGF R alpha, Sortilin, Serpin B6, Dkk-3, Thrombomodulin, PF4, MIF, Periostin, Furin, TIMP-1, Decorin, PCK1, CD99, CD63, CD9, CD81, Transferrin, DcR3, Lumican, TIMP-2, SLITRK5, FAP, Artemin, DPPII, cIAP-1, Pentraxin 3, Visfatin, Neprilysin, Albumin, Galectin-1, UNC5H3, IL-20 R beta, SREC-II, JAM-C, TNF RI, htPAPP-A, eNOS, MSP R, TPP1, LAMP1, B2M, NCAM-1, HIF-1 alpha, ST6GAL1, CD99-L2, Plexin A4, EMMPRIN, p53, Semaphorin 7A, NKp80, Cystatin B, Osteoadherin, Midkine, Calreticulin, Osteoactivin, Legumain, TAZ, Cathepsin L, RBP4, Serpin A4, JAM-A, MCSF, LIMPII, OPG, IL-22, Galectin-3, MOG, Trypsin 3, SIRP alpha, and Syndecan-4, and at least one protein selected from the following: Ferritin, IGFBP-4 IL-1 R6 GSTM1, NUP85, LAMP2, MeprinA, IL-1 F10, bIG-H3, GPR115, TGFbl, Ephrin-A4, CD109, Serpin Fl, IGFBP-6, HS3ST4, Aminopeptidase LRAP, OPN, PAI-1, DAPP1, GDF-9, Cathepsin B, IGFBP-2, Semaphorin 6C, IGF-2, PDGF R alpha, Sortilin, Serpin B6, Dkk-3, CNTF, TSP-1, GM-CSF Ra, Thrombomodulin, Endoglycan, IGFBP-3, RGM-C, PF4, MIF, TGM4, Periostin, Furin, TIMP-1, PAPP-A, Decorin, PCK1, Arylsulfatase A, CD99, CA2, PRDX4, Transferrin, DcR3, GP73, LAIR2, ULBP-4, Lumican, TIMP-2, TFPI, SOX2, SLITRK5, FAP, Spinesin, ENPP-2, CD97, CTACK, Integrin alpha 1, EXTL3, IL-18 BPa, PD-L2, PSMA, IL-20 Ra, Glyoxalase II, Trypsin 1, IGF-2R, ADAMTSL-1, Erythropoietin, Plexin D1, DNMT3A, BCL-2, CL-P1, Ephrin-B3, FABP6, CHI3L1, FCRLS, TFF3, Artemin, DPPII, cIAP-1, PDGF Rb, Pentraxin 3, Angiotensinogen, Follistatin, CF VII, Persephin, TRAIL RI, THAP11, CD200, CLEC-2, AMIGO, IGFBP-5, PON1, SOX7, GALNT10, Visfatin, Progranulin, PCSK2, GKN1, IL-18, Neprilysin, Stabilin-2, IL-17 RD, Albumin, Follistatin-like 1, MMP-10, FKBP51, LRRC4, Pref-1, Galectin-1, Troponin C, UNC5H3, FLRT2, CD314, Semaphorin 6B, Netrin-4, CD27 Ligand, IL-20 R beta, Semaphorin 6A, TSK, Cytokeratin-8, CHST3, Mc1-1, DPPIV, SREC-II, Norrin, JAM-C, Bc1-10, Wnt-4, LSECtin, Kell, TNF RI, PTP1B, htPAPP-A, IDO, PDGF-CC, Galanin, Activin A, TLR2, SCCA2, FABP1, eNOS, SHP-1, ICOS, ClqTNF9, MMP-1, TC-PTP, IL-24, gp130, C-myc, LILRB4, BMP-2, MIA, CD34, CD63, CD9, CD81, IFNab R2, Glypican 2, MSP R, DSCAM, Matriptase, KIR2DL3, CD30, Siglec-10, CLEC-1, TPP1, Ubiquitin+1, ANGPTL4, TWEAK R, Nidogen-1, CD2, Kallikrein 1, TSLP R, LAMP1, TROY, VCAM-1, Siglec-11, S100A1, PAR1, Thyroid Peroxidase, Aminopeptidase P2, IL-1 RI, ADAMS, OSM R beta, Thrombospondin-2, SMPD1, B2M, MFRP, LRP-6, ST3GAL1, NCAM-1 (CD56), Granzyme B, Adiponectin, IL-22BP, TPST2, PD-ECGF, LH, LEDGF, Cyr61, ULBP-3, IFNb, THSD1, FGF-23, LAMA4, Adipsin, AIF, SorCS2, SULT2A1, CD39L2, Insulin R, HIF-1 alpha, OX40 Ligand, Pax3, UCH-L3, cMASP3, Langerin, Desmin, SOX9, ST6GAL1, MEP1B, CD99-L2, Plexin A4, Semaphorin 4D, ROBO2, PDX-1, APRIL, Neurturin, Kremen-2, EMMPRIN, Activin RIB, Neuroligin 2, Epiregulin, CASA, MMP-12, GALNT2, CEACAM-5, VEGF RI, DSPG3, SorCS1, Matrilin-2, sFRP-3, p53, EphB3, NCK1, Semaphorin 7A, NKp80, Prolactin, Cystatin B, Sirtuin 1, FGF-16, FGF R5, NQO-1, Semaphorin 6D, FGF-3, GATA-4, VAP-A, CHST2, Pappalysin-2, Syndecan-3, Jagged 1, AKR1C4, Olfactomedin-2, Osteoadherin, NKp44, Thyroglobulin, IL-21R, Chemerin, EphA1, CD48, MICB, FGF-5, TRANCE, CES2, ULBP-1, Integrin alpha 5, VAMP-2, FLRG, Ret Midkine, CD73, TRACP, proGRP, Granzyme H, PRX2, p2'7, Siglec-6, Dectin-1, CD51, Notch-1, Calreticulin, DR3, DCTN1, CDC25B, Osteoactivin, ACE, CA125, HAO-1, PSMA1, FCRLB, BMP-9, CRIM1, LIF, SPINK1, EphB6, RGM-B, HS3ST1, ROR1, CMG-2, 4-1BB Ligand, L1CAM-2, p63, Cathepsin V, Testican 2, Glypican 5, CD6, Siglec-2, Legumain, PRELP, CES1, TAZ, NSE, TECK, HTRA2, HIF-1 beta, TAFA1, Podocalyxin, RalA, CRELD2, GRAP2, SP-D, BID, GFR alpha-2, Notch-3, VEGF R3, DLL4, TGFb2, LIGHT, XIAP, ST8SIA1, Cathepsin L, 6Ckine, MIS RII, Kallikrein 5, TGM3, FCAR, Contactin-2, CD83, IL-1 R3, SALM4, GBA3, ROBO4, OSCAR, VEGF, IGSF3, Biglycan, Neudesin, ILT4, uPAR, Axl, WIF-1, IL-7 R alpha, GPR56, CEACAM-3, MCEMP1, FABP2, Plexin B3, MEPE, Activin RIIA, ANG-2, Cochlin, Presenilin 1, NPTXR, SLAM, COMT, SPHK1, RBP4, Nectin-1, GUSB, Nidogen-2, IL-17F, SR-AI, TAFA2, N-Cadherin, IL-17B, IL-17 RC, MIP-3b, Cystatin C, Cystatin D, AMSH, FcERI, CLEC10A, HGF R, ANG-1, Prolactin R, FGF-20, CD28, Nogo-A, HSD17B1, IL-19, Enteropeptidase, Cathepsin E, TSLP, TCN2, GDF-15, Epimorphin, GRKS, PD-1, Serpin A4, ADAM23, NOV, Galectin-2, Neurexin 3 beta, TLR3, Sirtuin 2, Numb, IL-28 R alpha, IL-33, Lin28, FCRL1, KLF4, NKp30, Lymphotactin, Cystatin SN, JAM-A, Calreticulin-2, ErbB4, BMP-8, IL-27 Ra, Fas, IL-4 Ra, Kallikrein 14, Matrilin-3, Olig2, Kallikrein 12, CA13, IL-9, Nectin-3, MPIF-1, Cystatin S, ADA, IL-2 Rb, GFR alpha-1, Smad4, ICAM-1, MEF2C, TREM-1, L-Selectin, Hepsin, CD42b, MCSF, RANK, CHST4, CA8, FCRL3, ASAH2, CF XIV, PYY, HGF, I-TAC, Semaphorin 4C, SorCS3, Tie-1, IL-31 RA, Arginase 1, POGLUT1, IL-1ra, Podoplanin, TIM-3, CREG, CD300f, uPA, EphA2, LRRTM4, LIMPII, Tenascin R, CPE, PECAM-1, DNAM-1, DKK-1, OPG, CPB1, TSH, MMP-2, Siglec-9, ICAM-3, Cystatin SA, Galectin-4, Pepsinogen II, Desmoglein-3, Nectin-4, SCF, Serpin A5, PTH, FGF-19, MSP, IL-28A, FGF-12, METAP2, ASAHL, EDIL3, NTAL, EGF R, TAFAS, Galectin-9, vWF-A2, TACE, Activin RIM, Cathepsin S, LDL R, BMPR-IA, OX40, IL-13 R2, B7-H4, MMP-13, ANGPTL7, TRAIL R4, IGSF4B, Sirtuin 5, PEAR1, SH2D1A, Cerberus 1, GDF-11, Nrf2, TROP-2, NUDTS, ROR2, EphB4, Glypican 1, LAP (TGFb1), Gash, Contactin-1, IL-27, UNC5H4, ICAM-2, MBL, HS3ST3B1, RCOR1, IL-10 Rb, XEDAR, IL-22, PILR-alpha, NRG1-131, FABP4, RGM-A, RELT, TrkC, CSa, SREC-I, Nestin, TPO, ErbB3, Kirre13, FLRT1, Galectin-3, CXCL16, JAM-B, DR6, Nogo Receptor, TLR4, VEGF R2, Tie-2, IL-15 R, Caspr2, LTbR, LAMP, ALCAM, GLP-1, NG2, IL-22 R alpha 1, AMIGO2, HCC-1, TFPI-2, ULBP-2, Desmoglein 2, Aggrecan, Syntaxin 4, VAMP-1, Nectin-2, FGF-21, Flt-3, GFAP, TIM-1, Inhibin A, Cadherin-4, PIGF-2, Neurogranin, HE4, IL-23 R, Galectin-7, GALNT3, GITR L, CD14, R-Spondin 2, CK19, Cardiotrophin-1, TREML1, HAPLN1, CD27, ANG-4, Siglec-7, CD155, VEGF-C, TNF RII, PGRP-S, SDF-la, PDGF-AB, GPVI, CD40, SCF R, Thrombospondin-5, IL-1 RII, Neuropilin-2, Cadherin-13, E-Selectin, GITR, WISP-1, Renin, AgRP, MDL-1, ROBO3, RANTES, Endocan, Granulysin, hCGb, Mesothelin, TLR1, TRAIL, MOG, DDR1, NGF R, TRAIL R3, Trypsin 3, ARSB, LIF R alpha, BAFF R, CD157, Granzyme A, 2B4, ESAM, IL-1 R4, CXCL14, IL-31, SIRP alpha, Uromodulin, CTRC, CEACAM-1, TARC, MIP-3a, SDF-lb, NKp46, MCP-3, IL-32 alpha, TGFb3 FOLR2, CD58, IL-23, CD36, TNFb, Shh-N, Ficolin-1, Reg4, ILT2, Mer, TREM-2, Flt-3L, CDS, IL-6, CD229, Insulin, Syntaxin 6, GRO, Bcl-w, Lipocalin-2, PDGF-AA, IL-2 Ra, Angiogenin, LYVE-1, CD4, RAGE, CDNF, Brevican, NAP-2, PU.1, EDAR, ADAMTS13, Kynureninase, PTH1R, IFN-gamma RI, CrkL, B7-1, PARC, Draxin, VE-Cadherin, Procalcitonin, SOX15, Kallikrein 11, BCMA, Dectin-2, EpCAM, HCC-4, TGFa, IP-10, BLAME, CILP-1, PIGF, LOX-1, MCP-2, Resistin, HVEM, ENPP-7, Syndecan-4, IL-2 Rg, MICA, Dopa Decarboxylase, NPDC-1, MCP-4, EG-VEGF, Glycoprotein V, Semaphorin 4G, IL-12p40, PSA-total, IL-15, MAP1D, Clq, TNF4, Dtk, Endoglin, ENA-78, Reg3A, MIP-lb, FGF-17, IL-6R, IL-8, Galectin-8, CA4, Cystatin E M, FUT8, B7-H3, GCP-2, CD40L, MDC, 4-1BB, HO-1, SOST, S100A13, Kallikrein 7, and IL-13.

Extracellular vesicles (EV) are small membrane bound spheres containing proteins and RNA (of which exosomes are a subset). Exosomes are small (e.g., 20-150 nm) diameter lipid bilayer vesicles secreted by cells to enable paracrine communication. Other EV populations are derived directly from the plasma membrane or are formed during apoptosis (apoptotic bodies). Disclosed herein are compositions comprising a therapeutically effective amount of an MSC secretome (such as, for example, including, but not limited to MSC growth factor, MSC exosome, MSC extracts and/or extracellular vesicle comprising compositions). In some embodiments, the therapeutic composition comprises 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 40, 45, 50, 55, 60, 65, 70, 75, 80, 85, 90, 95, or 100 or more of the following nucleic acids, in any combination, or all of the following nucleic acids: hsa-let-7a-5p, hsa-let-7b-5p, hsa-let-7c-5p, hsa-let-7d-3p, hsa-let-7e-5p, hsa-let-7g-5p, hsa-let-7i, hsa-let-7i-5p, hsa-miR-100-5p, hsa-miR-103a-3p, hsa-miR-106a-5p, hsa-miR-106b-5p, hsa-mir-10b, hsa-miR-10b-5p, hsa-mir-1246, hsa-miR-1246, hsa-miR-125a-5p, hsa-miR-125b-5p, hsa-miR-130a-3p, hsa-mir-130b, hsa-miR-130b-3p, hsa-miR-132-3p, hsa-miR-136-5p, hsa-miR-138-5p, hsa-miR-139-5p, hsa-mir-140, hsa-miR-140-3p, hsa-miR-145-5p, hsa-mir-146a, hsa-miR-146a-5p, hsa-miR-148a-3p, hsa-miR-152-3p, hsa-miR-15a-5p, hsa-miR-15b-5p, hsa-mir-16-1, hsa-mir-16-2, hsa-miR-16-5p, hsa-miR-1'7-5p, hsa-miR-181a-5p, hsa-miR-191-5p, hsa-miR-193a-5p, hsa-miR-193b-3p, hsa-miR-19'7-3p, hsa-miR-199a-3p, hsa-miR-199a-5p, hsa-miR-199b-5p, hsa-miR-19a-3p, hsa-miR-19b-3p, hsa-miR-20a-5p, hsa-mir-203a, hsa-miR-203a-3p, hsa-miR-214-3p, hsa-mir-21, hsa-miR-21-3p, hsa-miR-21-5p, hsa-mir-221, hsa-miR-221-3p, hsa-mir-222, hsa-miR-222-3p, hsa-miR-22-3p, hsa-miR-23a-3p, hsa-miR-23b-3p, hsa-mir-24-1, hsa-mir-24-2, hsa-miR-24-3p, hsa-mir-25, hsa-miR-25-3p, hsa-miR-26a-5p, hsa-miR-27a-3p, hsa-mir-27b, hsa-miR-27b-3p, hsa-miR-29a-3p, hsa-miR-29c-3p, hsa-miR-30a-5p, hsa-miR-30a-5p, hsa-miR-30b-5p, hsa-miR-30c-5p, hsa-mir-30d, hsa-miR-30d-5p, hsa-mir-30e, hsa-miR-30e-5p, hsa-miR-31-3p, hsa-miR-31-5p, hsa-miR-320a, hsa-miR-342-3p, hsa-miR-345-5p, hsa-miR-34a-5p, hsa-miR-361-5p, hsa-miR-376a-3p, hsa-miR-376c-3p, hsa-miR-423-3p, hsa-miR-423-5p, hsa-miR-424-5p, hsa-miR-484, hsa-mir-486-1, hsa-mir-486-2, hsa-miR-486-5p, hsa-miR-570-3p, hsa-miR-574-3p, hsa-miR-663a, hsa-miR-874-3p, hsa-mir-92a-1, hsa-mir-92a-2, hsa-miR-92a-3p, hsa-miR-92b-3p, hsa-mir-93, hsa-miR-93-5p, hsa-miR-940, hsa-miR-99a-5p, and hsa-miR-99b-5p.

Exemplary microRNA content may include human miRNA sequences hsa-let-7a-5p, hsa-let-7b-5p, hsa-let-7c-5p, hsa-let-7g-5p, hsa-let-7i-5p, hsa-miR-214-3p, and hsa-miR-27a-3p, which all have binding sites in mRNA for TMPRSS2.

In some embodiments, the therapeutic composition comprises extracellular vesicles with a phenotype of $CD63^+$ $CD9^-$ $CD81^-$. In some embodiments, at least 70, 75, 80, 85, 90, 91, 92, 93, 94, or 95% of the extracellular vesicles in the therapeutic composition are $CD63^+$ $CD9^-$ $CD81^-$. In some embodiments, at least 50, 60, 70, 80, 85, 90, 91, 92, 93, 94, or 95% of the extracellular vesicles in the therapeutic composition are $CD9^-$. In some embodiments, at least 50, 60, 70, 80, 85, 90, 91, 92, 93, 94, or 95% of the extracellular vesicles in the therapeutic composition are $CD81^-$.

In some embodiments, the MSCs cultured to produce the therapeutic composition have the capacity to undergo trilineage differentiation in vitro toward adipocyte, osteoblast, and chondrocyte phenotypes. In some embodiments, the MSCs are positive for CD73, CD105, CD166, and CD90 and are negative for CD14, CD31, CD34, and CD45.

It is understood and herein contemplated that the MSC secretome comprises exosomes and growth factors. The growth factors and exosomes can be allogenic or autogenic. The growth factors and exosomes can be derived from any cell in the human body, such as from ectodermal cells, endodermal cells, or mesodermal cells. For example, the MSC secretomes may comprise mesenchymal stem cell (MSC) derived growth factors, MSC derived exosomes, or both MSC derived growth factors and exosomes. In some embodiments, the method further comprises adding at least one additive with the exosomes and growth factors. Specifically, MSCs under appropriate wound healing conditions may produce suitable therapeutic agents, such as exosomes and growth factors, that can provide therapy for inflammatory lung diseases. In one aspect, disclosed herein are compositions, wherein the MSC secretome composition further comprises prostaglandin E2 (PGE2), transforming growth factor 131 (TGF-I31), hepatocyte growth factor (HGF), stromal cell derived factor-1 (SDF-1), nitric oxide, indoleamine 2,3-dioxygenase, interleukin-4 (IL-4), IL-6, interleukin-10 (IL-10), IL-1 receptor antagonist and soluble TNF-α receptor, insulin-like growth factors, fibroblast growth factors (FGF) 1-23 (especially, FGF1 and FGF2), bone morphogenetic proteins (BMPs) 1-15, epidermal growth factor (EGF), transforming growth factor-a (TGF-a) macrophage-stimulating protein (MSP), platelet derived growth factor (PLGF), vascular endothelial growth factor (VEGF), macrophage colony stimulating factor (M-CSF), insulin, granulocyte colony stimulating factor (G-CSF), granulocyte macrophage colony stimulating factor (GM-CSF estrogen, and/or thyroid hormones.

Embodiments of a therapeutic composition described herein may comprise proteins and microRNAs, some of which may be embedded in or surrounded by a lipid membrane to create vesicles in the size range of about >20 nm to about 200 nm in size. The number of vesicles within the composition may be between about 1 million to about 100 billion vesicles per mL when suspended or about 10 million to about 1 trillion when formulated as a lyophilized powder.

A. Pharmaceutical Carriers/Delivery of Pharmaceutical Products

Therapeutic compositions described herein may be administered in vivo in a pharmaceutically acceptable carrier. By "pharmaceutically acceptable" is meant a material that is not biologically or otherwise undesirable, i.e., the material may be administered to a subject, along with the nucleic acid or vector, without causing any undesirable biological effects or interacting in a deleterious manner with any of the other components of the pharmaceutical composition in which it is contained. The carrier would naturally be selected to minimize any degradation of the active ingredient and to minimize any adverse side effects in the subject, as would be well known to one of skill in the art. The compositions may be administered orally, parenterally (e.g., intravenously), by intramuscular injection, by intraperitoneal injection, transdermally, extracorporeally, topically or the like, including topical intranasal administration or administration by inhalant. As used herein, "topical intranasal administration" means delivery of the compositions into the nose and nasal passages through one or both of the nares and can comprise delivery by a spraying mechanism or droplet mechanism, or through aerosolization of the nucleic acid or vector.

Administration of the compositions by inhalant can be through the nose or mouth via delivery by a spraying or droplet mechanism such as, for example, a metered-dose inhaler, a dry powder inhaler, a nebulizer, a vaporization device, or the like. Delivery can also be directly to any area of the respiratory system (e.g., lungs) via intubation. The exact amount of the compositions required will vary from subject to subject, depending on the species, age, weight and general condition of the subject, the severity of the disorder being treated, mode of administration and the like.

Parenteral administration of the composition, if used, is generally characterized by injection. Injectables can be prepared in conventional forms, either as liquid solutions or suspensions, solid forms suitable for solution of suspension in liquid prior to injection, or as emulsions. Parenteral administration may involve use of a slow release or sustained release system such that a constant dosage is maintained.

Suitable carriers and their formulations are described in *Remington: The Science and Practice of Pharmacy* (19th ed.) ed. A. R. Gennaro, Mack Publishing Company, Easton, PA 1995. Typically, an appropriate amount of a pharmaceutically-acceptable salt is used in the formulation to render the formulation isotonic. Examples of the pharmaceutically-acceptable carrier include, but are not limited to, saline, Ringer's solution, and dextrose solution. The pH of the solution is preferably from about 5 to about 8, and more preferably from about 7 to about 7.5. Further carriers include sustained release preparations such as semipermeable matrices of solid hydrophobic polymers containing the antibody, which matrices are in the form of shaped articles, e.g., films, liposomes or microparticles. It will be apparent to those persons skilled in the art that certain carriers may be more preferable depending upon, for instance, the route of administration and concentration of composition being administered.

Pharmaceutical carriers are known to those skilled in the art. These most typically would be standard carriers for administration of drugs to humans, including solutions such as sterile water, saline, and buffered solutions at physiological pH. The compositions can be administered intramuscularly or subcutaneously. Other compounds will be administered according to standard procedures used by those skilled in the art.

Pharmaceutical compositions may include carriers, thickeners, diluents, buffers, preservatives, surface active agents and the like in addition to the molecule of choice. Pharmaceutical compositions may also include one or more active ingredients such as antimicrobial agents, anti-inflammatory agents, anesthetics, and the like.

The pharmaceutical composition may be administered in a number of ways depending on whether local or systemic treatment is desired, and on the area to be treated. Administration may be topically (including ophthalmically, vaginally, rectally, intranasally), orally, by inhalation, or parenterally, for example by intravenous drip, subcutaneous, intraperitoneal or intramuscular injection. The disclosed antibodies can be administered intravenously, intraperitoneally, intramuscularly, subcutaneously, intracavity, or transdermally.

Preparations for parenteral administration include sterile aqueous or non-aqueous solutions, suspensions, and emulsions. Examples of non-aqueous solvents are propylene glycol, polyethylene glycol, vegetable oils such as olive oil, and injectable organic esters such as ethyl oleate. Aqueous carriers include water, alcoholic/aqueous solutions, emulsions or suspensions, including saline and buffered media. Parenteral vehicles include sodium chloride solution, Ringer's dextrose, dextrose and sodium chloride, lactated Ringer's, or fixed oils. Intravenous vehicles include fluid and nutrient replenishers, electrolyte replenishers (such as those based on Ringer's dextrose), and the like. Preservatives and other additives may also be present such as, for example, antimicrobials, anti-oxidants, chelating agents, and inert gases and the like. Formulations for topical administration may include ointments, lotions, creams, gels, drops, suppositories, sprays, liquids and powders. Conventional pharmaceutical carriers, aqueous, powder or oily bases, thickeners and the like may be necessary or desirable.

Compositions for oral administration may include powders or granules, suspensions or solutions in water or non-aqueous media, capsules, sachets, or tablets. Thickeners, flavorings, diluents, emulsifiers, dispersing aids or binders may be desirable.

Some of the compositions may potentially be administered as a pharmaceutically acceptable acid- or base-addition salt, formed by reaction with inorganic acids such as hydrochloric acid, hydrobromic acid, perchloric acid, nitric acid, thiocyanic acid, sulfuric acid, and phosphoric acid, and organic acids such as formic acid, acetic acid, propionic acid, glycolic acid, lactic acid, pyruvic acid, oxalic acid, malonic acid, succinic acid, maleic acid, and fumaric acid, or by reaction with an inorganic base such as sodium hydroxide, ammonium hydroxide, potassium hydroxide, and organic bases such as mono-, di-, trialkyl and aryl amines and substituted ethanolamines.

B. Therapeutic Uses

Effective dosages and schedules for administering the compositions may be determined empirically, and making such determinations is within the skill in the art. The dosage ranges for the administration of the compositions are those large enough to produce the desired effect in which the symptoms of the disorder are affected. The dosage should not be so large as to cause adverse side effects, such as unwanted cross-reactions, anaphylactic reactions, and the like. Generally, the dosage will vary with the age, condition, sex and extent of the disease in the patient, route of administration, or whether other drugs are included in the regimen, and can be determined by one of skill in the art. The dosage can be adjusted by the individual physician in the event of any counterindications. Dosage can vary, and can be administered in one or more dose administrations daily, for one or several days, and/or one or more dose administrations monthly, or once every 1, 2, or 3 or more months. Guidance can be found in the literature for appropriate dosages for given classes of pharmaceutical products.

C. Mesenchymal Stem Cells and Therapeutic Secretome Compositions

The treatment compositions disclosed herein utilize MSC secretomes and/or growth factors derived from mesenchymal stem cells (MSCs). In one aspect, disclosed herein are MSC secretome compositions (including, but not limited to MSC growth factor, MSC exosome, MSC extracts and/or extracellular vesicle comprising compositions). The treatment compositions may be used in the treatment, inhibition, decrease, reduction, amelioration, and/or prevention of conditions such as, for example, fistula or perianal fistula. In some embodiments, fistula can comprise cryptoglandular perianal fistula or Crohn's disease-associated perianal fistula.

MSCs are multipotent cells that have the ability to differentiate into a multitude of cell types including myocytes, chondrocytes, adipocytes, and osteoblasts. Typically, these cells can be found in the placenta, umbilical cord blood, adipose tissue, bone marrow, or amniotic fluid, including perivascular tissue. As used herein, "MSC" refers to non-terminally differentiated cells including but not limited to multipotential stem cell, multipotential stromal cell, stromal vascular cells, pericytes, perivascular cells, stromal cells, pluripotent cells, multipotent cells, adipose-derived fibroblast-like cells, adipose-derived stromal vascular fraction, adipose-derived MSC, bone marrow-derived fibroblast-like cells, bone marrow-derived stromal vascular fraction, bone marrow-derived MSC, tissue-derived fibroblast-like cells, adult stem cells, adult stromal cells, keratinocytes, and/or melanocytes.

MSCs, in addition to their differentiation potential, have immunomodulatory abilities resulting in the expression of many different cytokines and growth factors. As used herein, a "MSC preparation" or "MSC secretome composition" refers to a composition comprising MSC growth factors, MSC exosomes, extracellular vesicles, extracellular vesicle isolate product (EVIP), or acellular extracts of MSCs and/or MSC lysates obtained from human MSCs, fibroblast-like cells, and non-human animal MSCs including, but not limited to MSCs from horses, cows, pigs, sheep, non-human primates, dogs, cats, rabbits, rats, and mice. In embodiments, the MSCs may be derived from the patient to which the composition will be applied (autologous) or derived from another individual (allogeneic). The MSCs may be culture expanded to collect the conditioned media or to increase the quantity of cells for the lysate or used freshly prior to incorporation into the composition of the present disclosure. The MSC secretome compositions (including, but not limited to MSC growth factor, MSC exosome, MSC extracts and/or extracellular vesicle comprising compositions) may comprise about 0.00001 to about 20 wt. %, such as from about 0.01 to about 10 wt. %, of a mesenchymal stem cell (MSC) extract, MSC exosome, or MSC growth factor preparation. The MSC preparation may comprise either MSC conditioned media or MSC lysate from cell culture expanded MSCs. In some embodiments, the composition may further comprise from about 0.01 to about 10 wt. % of a cell-free medium conditioned by growth of MSCs or MSC lineage cells, wherein the cells are cultured under normal hyperoxic culturing conditions or under artificial wound healing conditions.

As disclosed herein the MSCs used to produce the disclosed MSC additives (including growth factor secretome composition either frozen or powdered additives) can be selectively stimulated to produce MSC growth factors, secretomes, cytokines, chemokines, mesenchymal stem cell proteins, peptides, glycosaminoglycans, extracellular matrix (ECM), proteoglycans, secretomes, and exosomes. The growth factors and exosomes may be derived from any cell in the human body, such as from ectodermal cells, endodermal cells, or mesodermal cells. As used herein, MSC growth factors include but are not limited to prostaglandin E2 (PGE2), transforming growth factor 131 (TGF-(31), hepatocyte growth factor (HGF), stromal cell derived factor-1 (SDF-1), nitric oxide, indoleamine 2,3-dioxygenase, interleukin-4 (IL-4), IL-6, interleukin-10 (IL-10), IL-1 receptor antagonist and soluble TNF-α receptor, insulin-like growth factors, fibroblast growth factors (FGF) 1-23 (especially, FGF1 and FGF2), bone morphogenetic proteins (BMPs) 1-15, epidermal growth factor (EGF), transforming growth factor-a (TGF-a) macrophage-stimulating protein (MSP), platelet derived growth factor (PLGF), vascular endothelial growth factor (VEGF), macrophage colony stimulating factor (M-CSF), insulin, granulocyte colony stimulating factor (G-CSF), granulocyte macrophage colony stimulating factor (GM-CSF), as well as hormones including estrogen, and thyroid hormones.

Culturing the MSCs may occur under wound healing and/or hypoxic conditions. Hypoxic conditions may comprise about 1% to about 5% oxygen, reduced or no serum, reduced glucose, or these elements in various combinations. The combined reduced nutrient and metabolite environment may trigger the cultured cells to produce wound healing and anti-inflammatory ECM proteins and growth factors to direct tissue healing. Direct tissue healing likely is in the form of new ECM proteins, such as collagen and glycosaminoglycans (GAGs), as well as growth factors and cytokines. In one aspect, the MSC preparation (such as, for example, a MSC secretome composition) comprises MSC growth factors, MSC exosomes, and/or cellular extracts of MSCs or MSC lysates obtained from MSCs cultured under standard hyperoxic culturing conditions (for example, 21% oxygen) or MSCs cultured under artificial wound healing conditions (such as, for example, 0.1% to about 5% oxygen).

As disclosed herein artificial wound healing conditions simulate growth conditions in real wounds where there is a reduction in nutrient supply and reduction of waste removal that is usually caused by a disruption in local blood circulation. This creates a harsh environment for cells until new blood vessels are created and blood circulation is restored. Accordingly, artificial wound healing conditions used to culture MSCs may include one or more of the following growth conditions: reduction in glucose availability, reduction in oxygen tension, reduction in pH, and increased temperature.

In some embodiments, the glucose availability can be reduced relative to normal control (e.g., 4.5 g/L). Modified culture media to reduce glucose, but not damage the cells can be between 0 and 50% reduction in glucose, more preferably between about 5% and 40% reduction in glucose. For example, MSC artificial wound healing culture conditions can comprise glucose reduction of about 5% to about 15%, from about 10% to about 20%, from about 15% to about 25%, from about 20% to about 30%, or from about 25% to about 35%. In some embodiments, glucose is present at a concentration of about 0.1, 0.5, 1.0, 1.5, 2.0, 2.5, 3.0, 3.5, or 4.0 g/L, or a range between any two of these values. In some embodiments, glucose is present at a concentration of less than or no more than 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, or 4.5 g/L.

In some embodiments, oxygen tension can be reduced to oxygen levels to hypoxic conditions. Normal atmospheric oxygen is approximately 21% and any reduction is considered hypoxic. Thus, in one aspect, MSCs can be cultured at between 0.0% and 20.9% oxygen, from about 0.1% to about 0.5% oxygen, from about 0.1% to about 2.0%, from about 0.1% to about 5.0% oxygen, from about 0.5% to 5.0%, from about 1.0% to about 10% oxygen, about 5.0% to about 10.0% oxygen, or from about 10.0% to about 15.0%. The hypoxic oxygen conditions may be an aspect of artificial wound healing conditions. Oxygen tension may be between about 0.5% and 20.5% oxygen when culturing MSCs to produce a therapeutic secretome composition comprising extracellular vesicles and/or MSC-secreted growth factors, such as, for example, 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9, 5, 5.1, 5.2, 5.3, 5.4, 5.5, 5.6, 5.7, 5.8, 5.9, 6, 6.1, 6.2, 6.3, 6.4, 6.5, 6.6, 6.7, 6.8, 6.9, 7, 7.1, 7.2, 7.3, 7.4, 7.5, 7.6, 7.7, 7.8, 7.9, 8, 8.1, 8.2, 8.3, 8.4, 8.5, 8.6, 8.7, 8.8, 8.9, 9, 9.1, 9.2, 9.3, 9.4, 9.5, 9.6, 9.7, 9.8, 9.9, 10, 10.1, 10.2, 10.3, 10.4, 10.5, 10.6, 10.7, 10.8, 10.9, 11, 11.1, 11.2, 11.3, 11.4, 11.5, 11.6, 11.7, 11.8, 11.9, 12, 12.1, 12.2, 12.3, 12.4, 12.5, 12.6, 12.7, 12.8, 12.9, 13, 13.1, 13.2, 13.3, 13.4, 13.5, 13.6, 13.7, 13.8, 13.9, 14, 14.1, 14.2, 14.3, 14.4, 14.5, 14.6, 14.7, 14.8, 14.9, 15, 15.1, 15.2, 15.3, 15.4, 15.5, 15.6, 15.7, 15.8, 15.9, 16, 16.1, 16.2, 16.3, 16.4, 16.5, 16.6, 16.7, 16.8, 16.9, 17, 17.1, 17.2, 17.3, 17.4, 17.5, 17.6, 17.7, 17.8, 17.9, 18, 18.1, 18.2, 18.3, 18.4, 18.5, 18.6, 18.7, 18.8, 18.9, 19, 19.1, 19.2, 19.3, 19.4, 19.5, 19.6, 19.7, 19.8, 19.9, or 20.0% oxygen, or a range between any two of these values.

The pH can also be reduced during MSC culturing. The pH can be from about 6.0 to about 7.4, for example, from 6.0 to about 6.4, from about 6.2 to about 6.4, from about 6.2 to about 6.6, from about 6.4 to about 6.6, from about 6.4 to about 6.8, or from about 6.6 to about 7.0, such as 6.0, 6.1, 6.2, 6.3, 6.4, 6.5, 6.6, 6.7, 6.8, 6.9, 7.0, 7.1, 7.2, 7.3 or 7.4.

The temperature of the culture environment may be raised relative to physiologic homeostasis temperature (e.g., 37° C.). In one aspect, the culture conditions for the MSCs can comprise from about 35° C. to about 39° C., from about 35° C. to about 36° C., from about 36° C. to about 37° C., from about 37° C. to about 38° C., from about 38° C. to about 39° C., or from about 39° C. to about 40° C. In one aspect, the temperature of the culture can be 35.0, 35.1, 35.2, 35.3, 36.4, 35.5, 35.6, 35.7, 35.8, 35.9, 36.0, 36.1, 36.2, 36.3, 36.4, 36.5, 36.6, 36.7, 36.8, 36.9, 37.0, 37.1, 37.2, 37.3, 37.4, 37.5, 37.6, 37.7, 37.8, 37.9, 38.0, 38.1, 38.2, 38.3, 38.4, 38.5, 38.6, 38.7, 38.8, 38.9, 39.0, 39.1, 39.2, 39.3, 39.4, 39.5, 39.6, 39.7, 39.8, 39.9, or 40.0° C.

In some embodiments, the culture media is serum free. In some embodiments, the serum free culture media comprises platelet lysate. In some embodiments, the platelet lysate is human platelet lysate (HPL). In some embodiments, the serum free culture media comprises at least 1%, 2%, 3%, 4%, 5%, 6%, 7%, 8%, 9%, 10%, 11%, 12%, 13%, 14%, 15%, 16%, 17%, 18%, 19%, or 20% of HPL by volume, or a range between any two of these values. In some embodiments, the culture media comprises from 8% to 12%, from 5% to 15%, or from 9% to 110% of HPL by volume. In some embodiments, a serum free culture media with any of the above-described amounts of HPL can be used during an MSC proliferation culture step. In some embodiments, an MSC proliferation culture step is performed before a secretome production culture step. In some embodiments, an MSC proliferation culture step is performed using culture media and conditions that favor proliferation without stressing the MSCs, such as, for example, oxygen about or at least about 15%, 16%, 17%, 18%, 19%, or 20% oxygen, and/or glucose about or at least about 4.0, 4.1, 4.2, 4.3, 4.4, or 4.5 g/L, and/or pH about or at least about 7.0, 7.1, or 7.2. Once a desired confluence of MSCs is achieved during an MSC proliferation culture step (e.g., about or at least about 70, 75, 80, 85, 90, or 95% confluence), the media can be removed, for example by washing, and the MSCs can be subjected to harsher conditions for a secretome production culture step using conditions described above (e.g., lower oxygen, glucose, and/or pH than during the MSC proliferation culture step, and/or conditions described herein as wound healing conditions).

In one aspect, the MSC secretome compositions (including, but not limited to MSC growth factor, MSC exosome, MSC extracts and/or extracellular vesicle comprising compositions) can further comprise a protective coating (such as, for example, a cryoprotectant oligosaccharide and a protein solution) to reduce degradation of the growth factors. It is understood and herein contemplated that the protective coating can be engineered as a polymer. "Polymer" refers to a relatively high molecular weight organic compound, natural or synthetic, whose structure can be represented by a repeated small unit, the monomer. Non-limiting examples of polymers include polyethylene, rubber, cellulose. Synthetic polymers are typically formed by addition or condensation polymerization of monomers. The term "copolymer" refers to a polymer formed from two or more different repeating units (monomer residues). By way of example and without limitation, a copolymer can be an alternating copolymer, a random copolymer, a block copolymer, or a graft copolymer. It is also contemplated that, in certain aspects, various block segments of a block copolymer can themselves comprise copolymers. The term "polymer" encompasses all forms of polymers including, but not limited to, natural polymers, synthetic polymers, homopolymers, heteropolymers or copolymers, addition polymers, etc. In one aspect, the gel matrix can comprise copolymers, block copolymers, diblock copolymers, and/or triblock copolymers. In one aspect, the protective coating can comprise a biocompatible polymer. In one aspect, biocompatible polymer can be crosslinked. Such polymers can also serve to slowly release the adipose browning agent and/or fat modulating agent into tissue. As used herein biocompatible polymers include, but are not limited to polysaccharides; hydrophilic polypeptides; poly (amino acids) such as poly-L-glutamic acid (PGS), gamma-polyglutamic acid, poly-L-aspartic acid, poly-L-serine, or poly-L-lysine; polyalkylene glycols and polyalkylene oxides such as polyethylene glycol (PEG), polypropylene glycol (PPG), and poly(ethylene oxide) (PEO); poly(oxyethylated polyol); poly(olefinic alcohol); polyvinylpyrrolidone); poly (hydroxyalkylmethacrylamide); poly(hydroxyalkylmethacrylate); poly(saccharides); poly(hydroxy acids); poly(vinyl alcohol), polyhydroxyacids such as poly(lactic acid), poly (gly colic acid), and poly (lactic acid-co-glycolic acids); polyhydroxyalkanoates such as poly3-hydroxybutyrate or poly4-hydroxybutyrate; polycaprolactones; poly (orthoesters); polyanhydrides; poly(phosphazenes); poly (lactide-co-caprolactones); polycarbonates such as tyrosine polycarbonates; polyamides (including synthetic and natural polyamides), polypeptides, and poly(amino acids); polyesteramides; polyesters; poly(dioxanones); poly(alkylene alkylates); hydrophobic polyethers; polyurethanes; polyetheresters; polyacetals; polycyanoacrylates; polyacrylates; polymethylmethacrylates; polysiloxanes; poly(oxyethylene)/poly(oxypropylene) copolymers; polyketals; polyphosphates; polyhydroxyvalerates; polyalkylene oxalates; polyalkylene succinates; poly(maleic acids), as well as copolymers thereof. Biocompatible polymers can also include polyamides, polycarbonates, polyalkylenes, polyalkylene glycols, polyalkylene oxides, polyalkylene terephthalates, polyvinyl alcohols (PVA), methacrylate PVA(m-PVA), polyvinyl ethers, polyvinyl esters, polyvinyl halides, polyvinylpyrrolidone, polyglycolides, polysiloxanes, polyurethanes and copolymers thereof, alkyl cellulose, hydroxyalkyl celluloses, cellulose ethers, cellulose esters, nitro celluloses, polymers of acrylic and methacrylic esters, methyl cellulose, ethyl cellulose, hydroxypropyl cellulose, hydroxy-propyl methyl cellulose, hydroxybutyl methyl cellulose, cellulose acetate, cellulose propionate, cellulose acetate butyrate, cellulose acetate phthalate, carboxylethyl cellulose, cellulose triacetate, cellulose sulphate sodium salt, poly (methyl methacrylate), poly(ethylmethacrylate), poly (butylmethacrylate), poly(isobutylmethacrylate), poly(hexlmethacrylate), poly(isodecylmethacrylate), poly(lauryl methacrylate), poly (phenyl methacrylate), poly(methyl acrylate), poly(isopropyl acrylate), poly(isobutyl acrylate), poly(octadecyl acrylate), polyethylene, polypropylene, poly (ethylene glycol), poly(ethylene oxide), poly(ethylene terephthalate), poly(vinyl alcohols), poly(vinyl acetate, poly vinyl chloride polystyrene and polyvinylpryrrolidone, derivatives thereof, linear and branched copolymers and block copolymers thereof, and blends thereof. Exemplary biodegradable polymers include polyesters, poly(ortho esters), poly(ethylene amines), poly(caprolactones), poly(hydroxybutyrates), poly(hydroxyvalerates), polyanhydrides, poly(acrylic acids), polyglycolides, poly(urethanes), polycarbonates, polyphosphate esters, polyphospliazenes, derivatives thereof, linear and branched copolymers and block copolymers thereof, and blends thereof.

In some embodiments the protective coating comprises carbohydrate construction of monosaccharides as well as carbohydrate polymers such as disaccharides or polysaccharides including but not limited to non-reducing poly or disaccharides as well as any combination thereof. Examples of carbohydrates that can be used in the protective coating comprise Glucose, Aldoses (D-Allose, D-Altrose, D-Mannose, etc.), Glucopyranose, Pentahydroxyhexanal, a-D-Glucopyranosyl-D-glucose, a-D-Glucopyranosyl-dihydrate, Polymer of P-D-Glycopyranosyl units, P-D-Fructofuranosyl a-D-glucopyranoside (anhydrous/dihydrate), f3-D-Galactopyranosyl-D-glucose, a-D-Glucopyranosyl-a-D-glucopyranoside (anhydrous/dihydrate), Galactose, Pentoses (Ribose, xylose, lyxose), Dextrose, Dodecacarbon monodecahydrate, Fructose, Sucrose, Lactose, Maltose, Trehalose, Agarose, D-galactosyl-O-(1-4)-anhydro-L-galactosyl, Cellulose, Polymer of P-D-Glycopyranosyl units, and Starch, as well as, Polyhydric alcohols, Polyalcohols, Alditols, Erythritol, Glycitols, Glycerol, Xylitol, and Sorbitol.

In some embodiments the protective coating contains biocompatible and/or biodegradable polyesters or polyanhydrides such as poly(lactic acid), poly(glycolic acid), and poly(lactic-co-glycolic acid). The particles can contain one more of the following polyesters: homopolymers including glycolic acid units, referred to herein as "PGA", and lactic acid units, such as poly-L-lactic acid, poly-D-lactic acid, poly-D,L-lactic acid, poly-L-lactide, poly-D-lactide, and poly-D,L-lactide5 collectively referred to herein as "PLA", and caprolactone units, such as poly(e-caprolactone), collectively referred to herein as "PCL"; and copolymers including lactic acid and glycolic acid units, such as various forms of poly(lactic acid-co-glycolic acid) and poly(lactide-co-glycolide) characterized by the ratio of lactic acid:glycolic acid, collectively referred to herein as "PLGA"; and polyacrylates, and derivatives thereof. Exemplary polymers also include copolymers of polyethylene glycol (PEG) and the aforementioned polyesters, such as various forms of PLGA-PEG or PLA-PEG copolymers, collectively referred to herein as "PEGylated polymers". In certain embodiments, the PEG region can be covalently associated with polymer to yield "PEGylated polymers" by a cleavable linker. In one aspect, the polymer comprises at least 60, 65, 70, 75, 80, 85, 89, 90, 91, 92, 93, 94, 95, 96, 97, 98, or 99 percent acetal pendant groups.

The triblock copolymers disclosed herein comprise a core polymer such as, example, polyethylene glycol (PEG), polyvinyl acetate, polyvinyl alcohol, polyvinyl pyrrolidone (PVP), polyethyleneoxide (PEO), poly(vinyl pyrrolidone-co-vinyl acetate), polymethacrylates, polyoxyethylene alkyl ethers, polyoxyethylene castor oils, polycaprolactam, polylactic acid, polyglycolic acid, poly(lactic-glycolic) acid, poly(lactic co-glycolic) acid (PLGA), cellulose derivatives, such as hydroxymethylcellulose, hydroxypropylcellulose and the like. Examples of diblock copolymers that can be used in the protective coatings disclosed herein comprise a polymer such as, example, polyethylene glycol (PEG), polyvinyl acetate, polyvinyl alcohol (PVA), polyvinyl pyrrolidone (PVP), polyethyleneoxide (PEO), poly(vinyl pyrrolidone-co-vinyl acetate), polymethacrylates, polyoxyethylene alkyl ethers, polyoxyethylene castor oils, polycaprolactam, polylactic acid, polyglycolic acid, poly(lactic-glycolic) acid, poly(lactic co-glycolic) acid (PLGA).

In one aspect, the protective coating contains (i.e., the encapsulated, the encapsulated compositions can further comprise lecithin or hydrolyzed lecithin as a carrier or as encapsulation material. As used herein, lecithin and/or hydrolyzed lecithin coatings include coatings comprising phosphatidyl choline, phosphatidyl inositol, phosphatidyl ethanolamine, phosphatidylserine, and phosphatidic acid. Sources of the lecithin can be plant or animal sources.

In one aspect, any of the polymers, monosaccharides, disaccharides, or polysaccharides used to form the protective coating formed by placing the MSC additive in an encapsulating solution can be at an appropriate concentration for form the protective coating. For example, polymers, monosaccharides, disaccharides, or polysaccharides can be at any concentration between 0.01 mM and 10.0 M concentration, for example, from about 0.01 M to about 0.1 M, from about 0.1 mM to about 1.0 M, or from about 1.0 M to about 10.0 M.

In one aspect, the MSC secretome compositions (including, but not limited to MSC growth factor, MSC exosome, MSC extracts and/or extracellular vesicle comprising compositions) disclosed herein may comprise any known ingredients typically found pharmaceutical fields such as agents for combating free radicals; bactericides; sequestering agents; preservatives; basifying or acidifying agents; fragrances; surfactants; fillers; natural products or extracts of natural product, such as aloe or green tea extract; vitamins; or coloring materials. Other ingredients that may be combined with the powder may include an antioxidant, which can be selected from a variety of antioxidants. Suitable antioxidants include vitamins, such as Vitamin C (L-Ascorbate, Ascorbate-2 Phosphate magnesium salt, Ascorbyl Palmitate, Tetrahexyldecyl Ascorbate), Vitamin E (Tocotrienol), Vitamin A (retinol, retinal, retinoic acid, provitamin A carotenoids, such as beta-carotene), N-acetyl glucosamine, or other derivatives of glucosamine. Other ingredients may include at least one essential fatty acid, such as S2-3, S2-6, and S2-9 polyunsaturated fatty acids, such as linoleic acid (LA), gamma-linoleic acid (GLA), alpha-linoleic acid (ALA), dihomo-y-linolenic acid (DGLA), arachidonic acid (ARA), and others. The fatty acids may be derived from various sources including evening primrose oil, black currant oil, borage oil, or GLA modified safflower seeds. Other ingredients may include a platelet rich fibrin matrix, at least one ingredient to support ECM production and production of hyaluronic acid, such as N-acetyl glucosamine or other derivatives of glucosamine, ultra-low molecular weight (ULMW) hyaluronic acid, chondroitin sulfate, or keratin sulfate.

Producing the MSC secretome compositions can comprise culturing MSCs collected from a donor to create a cultured media under culturing conditions including, in some embodiments, reduced oxygen and nutrition; stimulating the cultured cells to selectively secrete desired anti-inflammatory proteins, peptides, glycosaminoglycans, proteoglycans exosomes, and secretomes by adjusting the cell growth conditions; collecting, combining the conglomerate mixture with an encapsulation solution, and freezing the conglomerate mixture, wherein the conglomerate mixture comprises exosomes, peptides, proteins, cytokines, growth factors, extracellular matrix (ECM), proteoglycans, glycosaminoglycans; and chemokines selected from the group consisting of human MSCs, animal MSCs, multipotential stromal cells, fibroblasts, and fibroblast cells; combining the conglomerate mixture with an encapsulation solution, such as oligosaccharides, like a trehalose solution or protein solution and freezing the mixture; and lyophilizing or freeze-drying the frozen mixture, creating a dry powder. Alternatively, the MSCs may be lysed to collect all of the MSCs from the culture process, creating an extracted lysate; concentrating the extracted lysate and combining the extracted lysate with an encapsulation solution, such as oligosaccharides like a trehalose solution or protein solution and freezing the mixture; and lyophilizing or freeze-drying the frozen mixture, creating a dry powder. The powder contains a highly concentrated collection of analgesic MSC secretomes and exosomes and extracellular matrix components that are specific to anti-inflammation.

The method may also include filter-sterilizing, concentrating, freezing, or freeze drying the MSC conditioned culture medium. Additionally, the MSC culture medium may be combined with a cryoprotectant prior to freezing.

There are various methods for lysing the MSCs. Lysing may be achieved by the addition of a hypotonic solution or repeated freeze-thaw processes to disrupt the cell membranes. Moreover, the cells may be lysed while attached to the culture surface or in suspension. The cells may also be enzymatically released and/or lysed by mechanical homogenization.

Stimulating the MSC to selectively secrete the desired anti-inflammatory proteins, peptides, glycosaminoglycans, proteoglycans, exosomes and secretomes may be achieved by adjusting the cell growth conditions, such as cell confluency, culture media supplements, nutritional supplements, oxygen levels, length of culture in those conditions, cell passage number or combinations of those, and the like.

III. Methods of Treating Perianal Fistula

A perianal fistula is a pathological connection between the anorectal canal and the perianal skin. Perianal fistulas can cause anorectal pain, malodorous drainage, and sometimes fecal incontinence. The majority of perianal fistulas are cryptoglandular fistulas which are originate from infected or inflamed anal glands. Acute infection of these glands results in the onset of perianal abscess and subsequent fistulas. Another type of fistula is Crohn's disease (CD)-associated fistula. CD, a chronic inflammatory disease, is characterized by segmental, transmural, and recurrent intestinal inflammation and fistulas are a very common and severe complication of CD.

In some embodiments, therapeutic compositions disclosed herein are used in methods of treating perianal fistula in a subject. Any of the therapeutic compositions described herein may be used in such a method. In some embodiments, the subject can have a cryptoglandular fistula. In some embodiments, the subject can have an inflammatory bowel disease such as, for example, Crohn's disease or ulcerative colitis. In some embodiments, the subject does not have an inflammatory bowel disease. In some embodiments, the subject does not have Crohn's disease or ulcerative colitis. In some embodiments, the subject does not have an autoimmune disorder.

In some embodiments, a therapeutic composition can be administered to a subject. The administering may comprise injecting the therapeutic composition. In some embodiments, the therapeutic composition can be injected into tissue surrounding the perianal fistula. In some embodiments, the therapeutic composition can be administered systemically such as, for example, by intravenous administration.

Also disclosed herein are methods of treating or preventing perianal fistula a subject comprising administering to the subject a composition comprising secreted extracellular vesicles that contain a composition that includes any combination of composition proteins and/or miRNAs, selected from the following: Ferritin, NUP85, LAMP2, GPR115, Serpin Fl, OPN, PAI-1, DAPP1, Cathepsin B, Semaphorin 6C, PDGF R alpha, Sortilin, Serpin B6, Dkk-3, Thrombomodulin, PF4, MIF, Periostin, Furin, TIMP-1, Decorin, PCK1, CD99, CD63, CD9, CD81, Transferrin, DcR3, Lumican, TIMP-2, SLITRK5, FAP, Artemin, DPPII, cIAP-1, Pentraxin 3, Visfatin, Neprilysin, Albumin, Galectin-1, UNC5H3, IL-20 R beta, SREC-II, JAM-C, TNF RI, htPAPP-A, eNOS, MSP R, TPP1, LAMP1, B2M, NCAM-1, HIF-1 alpha, ST6GAL1, CD99-L2, Plexin A4, EMMPRIN, p53, Semaphorin 7A, NKp80, Cystatin B, Osteoadherin, Midkine, Calreticulin, Osteoactivin, Legumain, TAZ, Cathepsin L, RBP4, Serpin A4, JAM-A, MCSF, LIMPII, OPG, IL-22, Galectin-3, MOG, Trypsin 3, SIRP alpha, and Syndecan-4, and at least one protein selected from the group consisting of: Ferritin, IGFBP-4 IL-1 R6 GSTM1, NUP85, LAMP2, MeprinA, IL-1 F10, bIG-H3, GPR115, TGFbl, Ephrin-A4, CD109, Serpin Fl, IGFBP-6, HS3ST4, Aminopeptidase LRAP, OPN, PAI-1, DAPP1, GDF-9, Cathepsin B, IGFBP-2, Semaphorin 6C, IGF-2, PDGF R alpha, Sortilin, Serpin B6, Dkk-3, CNTF, TSP-1, GM-CSF Ra, Thrombomodulin, Endoglycan, IGFBP-3, RGM-C, PF4, MIF, TGM4, Periostin, Furin, TIMP-1, PAPP-A, Decorin, PCK1, Arylsulfatase A, CD99, CA2, PRDX4, Transferrin, DcR3, GP73, LAIR2, ULBP-4, Lumican, TIMP-2, TFPI, SOX2, SLITRK5, FAP, Spinesin, ENPP-2, CD97, CTACK, Integrin alpha 1, EXTL3, IL-18 BPa, PD-L2, PSMA, IL-20 Ra, Glyoxalase II, Trypsin 1, IGF-2R, ADAMTSL-1, Erythropoietin, Plexin D1, DNMT3A, BCL-2, CL-P1, Ephrin-B3, FABP6, CHI3L1, FCRLS, TFF3, Artemin, DPPII, cIAP-1, PDGF Rb, Pentraxin 3, Angiotensinogen, Follistatin, CF VII, Persephin, TRAIL RI, THAP11, CD200, CLEC-2, AMIGO, IGFBP-5, PON1, SOX7, GALNT10, Visfatin, Progranulin, PCSK2, GKN1, IL-18, Neprilysin, Stabilin-2, IL-17 RD, Albumin, Follistatin-like 1, MMP-10, FKBP51, LRRC4, Pref-1, Galectin-1, Troponin C, UNC5H3, FLRT2, CD314, Semaphorin 6B, Netrin-4, CD27 Ligand, IL-20 R beta, Semaphorin 6A, TSK, Cytokeratin-8, CHST3, Mc1-1, DPPIV, SREC-II, Norrin, JAM-C, Bc1-10, Wnt-4, LSECtin, Kell, TNF RI, PTP1B, htPAPP-A, IDO, PDGF-CC, Galanin, Activin A, TLR2, SCCA2, FABP1, eNOS, SHP-1, ICOS, C1qTNF9, MMP-1, TC-PTP, IL-24, gp130, C-myc, LILRB4, BMP-2, MIA, CD34, CD63, CD9, CD81, IFNab R2, Glypican 2, MSP R, DSCAM, Matriptase, KIR2DL3, CD30, Siglec-10, CLEC-1, TPP1, Ubiquitin+1, ANGPTL4, TWEAK R, Nidogen-1, CD2, Kallikrein 1, TSLP R, LAMP1, TROY, VCAM-1, Siglec-11, S100A1, PAR1, Thyroid Peroxidase, Aminopeptidase P2, IL-1 RI, ADAMS, OSM R beta, Thrombospondin-2, SMPD1, B2M, MFRP, LRP-6, ST3GAL1, NCAM-1 (CD56), Granzyme B, Adiponectin, IL-22BP, TPST2, PD-ECGF, LH, LEDGF, Cyr61, ULBP-3, IFNb, THSD1, FGF-23, LAMA4, Adipsin, AIF, SorCS2, SULT2A1, CD39L2, Insulin R, HIF-1 alpha, OX40 Ligand, Pax3, UCH-L3, cMASP3, Langerin, Desmin, SOX9, ST6GAL1, MEP1B, CD99-L2, Plexin A4, Semaphorin 4D, ROBO2, PDX-1, APRIL, Neurturin, Kremen-2, EMMPRIN, Activin RIB, Neuroligin 2, Epiregulin, CASA, MMP-12, GALNT2, CEACAM-5, VEGF R1, DSPG3, SorCS1, Matrilin-2, sFRP-3, p53, EphB3, NCK1, Semaphorin 7A, NKp80, Prolactin, Cystatin B, Sirtuin 1, FGF-16, FGF R5, NQO-1, Semaphorin 6D, FGF-3, GATA-4, VAP-A, CHST2, Pappalysin-2, Syndecan-3, Jagged 1, AKR1C4, Olfactomedin-2, Osteoadherin, NKp44, Thyroglobulin, IL-21R, Chemerin, EphAl, CD48, MICB, FGF-5, TRANCE, CES2, ULBP-1, Integrin alpha 5, VAMP-2, FLRG, Ret Midkine, CD73, TRACP, proGRP, Granzyme H, PRX2, p2'7, Siglec-6, Dectin-1, CD51, Notch-1, Calreticulin, DR3, DCTN1, CDC25B, Osteoactivin, ACE, CA125, HAO-1, PSMA1, FCRLB, BMP-9, CRIM1, LIF, SPINK1, EphB6, RGM-B, HS3ST1, ROR1, CMG-2, 4-1BB Ligand, L1CAM-2, p63, Cathepsin V, Testican 2, Glypican 5, CD6, Siglec-2, Legumain, PRELP, CES1, TAZ, NSE, TECK, HTRA2, HIF-1 beta, TAFA1, Podocalyxin, RalA, CRELD2, GRAP2, SP-D, BID, GFR alpha-2, Notch-3, VEGF R3, DLL4, TGFb2, LIGHT, XIAP, ST8SIA1, Cathepsin L, 6Ckine, MIS RII, Kallikrein 5, TGM3, FCAR, Contactin-2, CD83, IL-1 R3, SALM4, GBA3, ROBO4, OSCAR, VEGF, IGSF3, Biglycan, Neudesin, ILT4, uPAR, Axl, WIF-1, IL-7 R alpha, GPR56, CEACAM-3, MCEMP1, FABP2, Plexin B3, MEPE, Activin RIIA, ANG-2, Cochlin, Presenilin 1, NPTXR, SLAM, COMT, SPHK1, RBP4, Nectin-1, GUSB, Nidogen-2, IL-17F, SR-AI, TAFA2, N-Cadherin, IL-17B, IL-17 RC, MIP-3b, Cystatin C, Cystatin D, AMSH, FcERI, CLEC10A, HGF R, ANG-1, Prolactin R, FGF-20, CD28, Nogo-A, HSD17B1, IL-19, Enteropeptidase, Cathepsin E, TSLP, TCN2, GDF-15, Epimorphin, GRKS, PD-1, Serpin A4, ADAM23, NOV, Galectin-2, Neurexin 3 beta, TLR3, Sirtuin 2, Numb, IL-28 R alpha, IL-33, Lin28, FCRL1, KLF4, NKp30, Lymphotactin, Cystatin SN, JAM-A, Calreticulin-2, ErbB4, BMP-8, IL-27 Ra, Fas, IL-4 Ra, Kallikrein 14, Matrilin-3, Olig2, Kallikrein 12, CA13, IL-9, Nectin-3, MPIF-1, Cystatin S, ADA, IL-2 Rb, GFR alpha-1, Smad4, ICAM-1, MEF2C, TREM-1, L-Selectin, Hepsin, CD42b, MCSF, RANK, CHST4, CA8, FCRL3, ASAH2, CF XIV, PYY, HGF, I-TAC, Semaphorin 4C, SorCS3, Tie-1, IL-31 RA, Arginase 1, POGLUT1, IL-lra, Podoplanin, TIM-3, CREG, CD300f, uPA, EphA2, LRRTM4, LIMPII, Tenascin R, CPE, PECAM-1, DNAM-1, DKK-1, OPG, CPB1, TSH, MMP-2, Siglec-9, ICAM-3, Cystatin SA, Galectin-4, Pepsinogen II, Desmoglein-3, Nectin-4, SCF, Serpin A5, PTH, FGF-19, MSP, IL-28A, FGF-12, METAP2, ASAHL, EDIL3, NTAL, EGF R, TAFA5, Galectin-9, vWF-A2, TACE, Activin RUB, Cathepsin S, LDL R, BMPR-IA, OX40, IL-3 R2, B7-H4, MMP-13, ANGPTL7, TRAIL R4, IGSF4B, Sirtuin 5, PEAR1, SH2D1A, Cerberus 1, GDF-11, Nrf2, TROP-2, NUDT5, ROR2, EphB4, Glypican 1, LAP (TGFbl), Gash, Contactin-1, IL-27, UNC5H4, ICAM-2, MBL, HS3ST3B1, RCOR1, IL-10 Rb, XEDAR, IL-22, PILR-alpha, NRG1-bl, FABP4, RGM-A, RELT, TrkC, C5a, SREC-I, Nestin, TPO, ErbB3, Kirrel3, FLRT1, Galectin-3, CXCL16, JAM-B, DR6, Nogo Receptor, TLR4, VEGF R2, Tie-2, IL-15 R, Caspr2, LTbR, LAMP, ALCAM, GLP-1, NG2, IL-22 R alpha 1, AMIGO2, HCC-1, TFPI-2, ULBP-2, Desmoglein 2, Aggrecan, Syntaxin 4, VAMP-1, Nectin-2, FGF-21, Flt-3, GFAP, TIM-1, Inhibin A, Cadherin-4, PlGF-2, Neurogranin, HE4, IL-23 R, Galectin-7, GALNT3, GITR L, CD14, R-Spondin 2, CK19, Cardiotrophin-1, TREML1, HAPLN1, CD27, ANG-4, Siglec-7, CD155, VEGF-C, TNF RH, PGRP-S, SDF-la, PDGF-AB, GPVI, CD40, SCF R, Thrombospondin-5, IL-1 MI, Neuropilin-2, Cadherin-13, E-Selectin, GITR, WISP-1, Renin, AgRP, MDL-1, ROBO3, RANTES, Endocan, Granulysin, hCGb, Mesothelin, TLR1, TRAIL, MOG, DDR1, NGF R, TRAIL R3, Trypsin 3, ARSB, LIF R alpha, BAFF R, CD157, Granzyme A, 2B4, ESAM, IL-1 R4, CXCL14, IL-31, SIRP alpha, Uromodulin, CTRC, CEACAM-1, TARC, MIP-3a, SDF-lb, NKp46, MCP-3, IL-32 alpha, TGFb3 FOLR2, CD58, IL-23, CD36, TNFb, Shh-N, Ficolin-1, Reg4, ILT2, Mer, TREM-2, Flt-3L, CDS, IL-6, CD229, Insulin, Syntaxin 6, GRO, Bcl-w, Lipocalin-2, PDGF-AA, IL-2 Ra, Angiogenin, LYVE-1, CD4, RAGE, CDNF, Brevican, NAP-2, PU.1, EDAR, ADAMTS13, Kynureninase, PTH1R, IFN-gamma RI, CrkL, B7-1, PARC, Draxin, VE-Cadherin, Procalcitonin, SOX15, Kallikrein 11, BCMA, Dectin-2, EpCAM, HCC-4, TGFa, IP-10, BLAME, CILP-1, PlGF, LOX-1, MCP-2, Resistin, HVEM, ENPP-7, Syndecan-4, IL-2 Rg, MICA, Dopa Decarboxylase, NPDC-1, MCP-4, EG-VEGF, Glycoprotein V, Semaphorin 4G, IL-12p40, PSA-total, IL-15, MAP1D, Clq, TNF4, Dtk, Endoglin, ENA-78, Reg3A, MIP-lb, FGF-17, IL-6R, IL-8, Galectin-8, CA4, Cystatin E M, FUT8, B7-H3, GCP-2, CD40L, MDC, 4-1BB, HO-1, SOST, S100A13, Kallikrein 7, IL-13, hsa-let-7a-5p, hsa-let-7b-5p, hsa-let-7c-5p, hsa-let-7d-3p, hsa-let-7e-5p, hsa-let-7g-5p, hsa-let-7i, hsa-let-7i-5p, hsa-miR-100-5p, hsa-miR-103a-3p, hsa-miR-106a-5p, hsa-miR-106b-5p, hsa-mir-10b, hsa-miR-10b-5p, hsa-mir-1246, hsa-miR-1246, hsa-miR-125a-5p, hsa-miR-125b-5p, hsa-miR-130a-3p, hsa-mir-130b, hsa-miR-130b-3p, hsa-miR-132-3p, hsa-miR-136-5p, hsa-miR-138-5p, hsa-miR-139-5p, hsa-mir-140, hsa-miR-140-3p, hsa-miR-145-5p, hsa-mir-146a, hsa-miR-146a-5p, hsa-miR-148a-3p, hsa-miR-152-3p, hsa-miR-15a-5p, hsa-miR-15b-5p, hsa-mir-16-1, hsa-mir-16-2, hsa-miR-16-5p, hsa-miR-1'7-5p, hsa-miR-181a-5p, hsa-miR-191-5p, hsa-miR-193a-5p, hsa-miR-193b-3p, hsa-miR-19'7-3p, hsa-miR-199a-3p, hsa-miR-199a-5p, hsa-miR-199b-5p, hsa-miR-19a-3p, hsa-miR-19b-3p, hsa-miR-20a-5p, hsa-mir-203a, hsa-miR-203a-3p, hsa-miR-214-3p, hsa-mir-21, hsa-miR-21-3p, hsa-miR-21-5p, hsa-mir-221, hsa-miR-221-3p, hsa-mir-222, hsa-miR-222-3p, hsa-miR-22-3p, hsa-miR-23a-3p, hsa-miR-23b-3p, hsa-mir-24-1, hsa-mir-24-2, hsa-miR-24-3p, hsa-mir-25, hsa-miR-25-3p, hsa-miR-26a-5p, hsa-miR-27a-3p, hsa-mir-27b, hsa-miR-27b-3p, hsa-miR-29a-3p, hsa-miR-29c-3p, hsa-miR-30a-5p, hsa-miR-30a-5p, hsa-miR-30b-5p, hsa-miR-30c-5p, hsa-mir-30d, hsa-miR-30d-5p, hsa-mir-30e, hsa-miR-30e-5p, hsa-miR-31-3p, hsa-miR-31-5p, hsa-miR-320a, hsa-miR-342-3p, hsa-miR-345-5p, hsa-miR-34a-5p, hsa-miR-361-5p, hsa-miR-376a-3p, hsa-miR-376c-3p, hsa-miR-423-3p, hsa-miR-423-5p, hsa-miR-424-5p, hsa-miR-484, hsa-mir-486-1, hsa-mir-486-2, hsa-miR-486-5p, hsa-miR-570-3p, hsa-miR-574-3p, hsa-miR-663a, hsa-miR-874-3p, hsa-mir-92a-1, hsa-mir-92a-2, hsa-miR-92a-3p, hsa-miR-92b-3p, hsa-mir-93, hsa-miR-93-5p, hsa-miR-940, hsa-miR-99a-5p, and hsa-miR-99b-5p.

In some embodiments, the therapeutic product can be administered at a cell-equivalent dose range of 0.7 to 7 million cells/kg. In some embodiments, the therapeutic product can be administered at a cell-equivalent dose of at least about, at most about, or about 0.2, 0.5, 0.7, 1.0, 1.5, 2.0, 2.5, 3.0, 3.5, 4.0, 4.5, 5.0, 5.5, 6.0, 6.5, 7.0, 7.5, 8.0, 8.5, 9.0, 9.5, 10.0, 10.5, 11.0, 11.5, or 12.0 million cells/kg, or a range between any two of these values. In some embodiments, the product can be administered at a dose that provides $9 \times 10^{11}$ to $1.2 \times 10^{12}$ extracellular vesicles or $5 \times 10^{11}$ to $1.5 \times 10^{12}$, $6 \times 10^{11}$ to $1.4 \times 10^{12}$, $7 \times 10^{11}$ to $1.3 \times 10^{12}$, $8 \times 10^{11}$ to $1.2 \times 10^{12}$, or $8 \times 10^{11}$ to $1.3 \times 10^{12}$ extracellular vesicles. In some embodiments, the product can be administered at a dose that provides at least or at most $5 \times 10^{11}$, $6 \times 10^{11}$, $7 \times 10^{11}$, $8 \times 10^{11}$, $9 \times 10^{11}$, $1 \times 10^{12}$, $1.1 \times 10^{12}$, $1.2 \times 10^{12}$, $1.3 \times 10^{12}$, $1.4 \times 10^{12}$, or $1.5 \times 10^{12}$ extracellular vesicles. In some embodiments, the therapeutic product can comprise $6 \times 10^{10}$ to $8 \times 10^{10}$, $5 \times 10^{10}$ to $9 \times 10^{10}$, $4 \times 10^{10}$ to $10 \times 10^{10}$, $5.5 \times 10^{10}$ to $8.5 \times 10^{10}$, $6 \times 10^{10}$ to $8.5 \times 10^{10}$ cells/ml. In some embodiments, the therapeutic product can comprise $6 \times 10^{10}$ to $8 \times 10^{10}$ extracellular vesicles per ml and can be administered at a dose of 10 to 20 ml. In some embodiments, the therapeutic product can comprise $6 \times 10^{10}$ to $8 \times 10^{10}$ extracellular vesicles per ml and can be administered at a dose of 10, 11, 12, 13, 14, 15, 16, 17, 18, 19, or 20 ml, or a range between any two of these values.

IV. Examples

The following examples are put forth so as to provide those of ordinary skill in the art with a complete disclosure and description of how the compounds, compositions, articles, devices and/or methods claimed herein are made and evaluated and are intended to be purely exemplary and are not intended to limit the disclosure. Efforts have been made to ensure accuracy with respect to numbers (e.g., amounts, temperature, etc.), but some errors and deviations should be accounted for. These examples are provided for illustrative purposes only and not to limit the scope of the claims provided herein.

A. Example 1—Production of Therapeutic Composition

An MSC secretome therapeutic composition was made by the following method: human bone marrow-derived MSCs were cultured in culture vessels with growth media to expand the MSC population. Growth media was then removed, and the cells were washed with PBS. The MSCs were then cultured in reduced glucose media with a pH below 7.0 under hypoxic conditions. The conditioned media was then collected and subjected to diafiltration followed by filter sterilization. The production process for the therapeutic product was done under current Good Manufacturing Practices and Current Good Tissue Practices.

The tetraspanin profile of extracellular vesicles present in the therapeutic composition was determined, and it was found that greater than 95% of the extracellular vesicles present in the therapeutic composition were CD63$^+$ CD9$^-$ CD81$^-$.

Protein content of the therapeutic product was determined, and the following proteins were found to be present: Ferritin, NUP85, LAMP2, GPR115, Serpin Fl, OPN, PAI-1, DAPP1, Cathepsin B, Semaphorin 6C, PDGF R alpha, Sortilin, Serpin B6, Dkk-3, Thrombomodulin, PF4, MIF, Periostin, Furin, TIMP-1, Decorin, PCK1, CD99, CD63, CD9, CD81, Transferrin, DcR3, Lumican, TIMP-2, SLITRK5, FAP, Artemin, DPPII, cIAP-1, Pentraxin 3, Visfatin, Neprilysin, Albumin, Galectin-1, UNC5H3, IL-20 R beta, SREC-II, JAM-C, TNF RI, htPAPP-A, eNOS, MSP R, TPP1, LAMP1, B2M, NCAM-1, HIF-1 alpha, ST6GAL1, CD99-L2, Plexin A4, EMMPRIN, p53, Semaphorin 7A, NKp80, Cystatin B, Osteoadherin, Midkine, Calreticulin, Osteoactivin, Legumain, TAZ, Cathepsin L, RBP4, Serpin A4, JAM-A, MCSF, LIMPII, OPG, IL-22, Galectin-3, MOG, Trypsin 3, SIRP alpha, and Syndecan-4, and at least one protein selected from the following: Ferritin, IGFBP-4 IL-1 R6 GSTM1, NUP85, LAMP2, MeprinA, IL-1 F10, bIG-H3, GPR115, TGFbl, Ephrin-A4, CD109, Serpin Fl, IGFBP-6, HS3ST4, Aminopeptidase LRAP, OPN, PAI-1, DAPP1, GDF-9, Cathepsin B, IGFBP-2, Semaphorin 6C, IGF-2, PDGF R alpha, Sortilin, Serpin B6, Dkk-3, CNTF, TSP-1, GM-CSF Ra, Thrombomodulin, Endoglycan, IGFBP-3, RGM-C, PF4, MIF, TGM4, Periostin, Furin, TIMP-1, PAPP-A, Decorin, PCK1, Arylsulfatase A, CD99, CA2, PRDX4, Transferrin, DcR3, GP73, LAIR2, ULBP-4, Lumican, TIMP-2, TFPI, SOX2, SLITRK5, FAP, Spinesin, ENPP-2, CD97, CTACK, Integrin alpha 1, EXTL3, IL-18 BPa, PD-L2, PSMA, IL-20 Ra, Glyoxalase II, Trypsin 1, IGF-2R, ADAMTSL-1, Erythropoietin, Plexin D1, DNMT3A, BCL-2, CL-P1, Ephrin-B3, FABP6, CHI3L1, FCRLS, TFF3, Artemin, DPPII, cIAP-1, PDGF Rb, Pentraxin 3, Angiotensinogen, Follistatin, CF VII, Persephin, TRAIL RI, THAP11, CD200, CLEC-2, AMIGO, IGFBP-5, PON1, SOX7, GALNT10, Visfatin, Progranulin, PCSK2, GKN1, IL-18, Neprilysin, Stabilin-2, IL-17 RD, Albumin, Follistatin-like 1, MMP-10, FKBP51, LRRC4, Pref-1, Galectin-1, Troponin C, UNC5H3, FLRT2, CD314, Semaphorin 6B, Netrin-4, CD27 Ligand, IL-20 R beta, Semaphorin 6A, TSK, Cytokeratin-8, CHST3, Mc1-1, DPPIV, SREC-II, Norrin, JAM-C, Bc1-10, Wnt-4, LSECtin, Kell, TNF RI, PTP1B, htPAPP-A, IDO, PDGF-CC, Galanin, Activin A, TLR2, SCCA2, FABP1, eNOS, SHP-1, ICOS, ClqTNF9, MMP-1, TC-PTP, IL-24, gp130, C-myc, LILRB4, BMP-2, MIA, CD34, CD63, CD9, CD81, IFNab R2, Glypican 2, MSP R, DSCAM, Matriptase, KIR2DL3, CD30, Siglec-10, CLEC-1, TPP1, Ubiquitin+1, ANGPTL4, TWEAK R, Nidogen-1, CD2, Kallikrein 1, TSLP R, LAMP1, TROY, VCAM-1, Siglec-11, S100A1, PAR1, Thyroid Peroxidase, Aminopeptidase P2, IL-1 RI, ADAMS, OSM R beta, Thrombospondin-2, SMPD1, B2M, MFRP, LRP-6, ST3GAL1, NCAM-1 (CD56), Granzyme B, Adiponectin, IL-22BP, TPST2, PD-ECGF, LH, LEDGF, Cyr61, ULBP-3, IFNb, THSD1, FGF-23, LAMA4, Adipsin, AIF, SorCS2, SULT2A1, CD39L2, Insulin R, HIF-1 alpha, OX40 Ligand, Pax3, UCH-L3, cMASP3, Langerin, Desmin, SOX9, ST6GAL1, MEP1B, CD99-L2, Plexin A4, Semaphorin 4D, ROBO2, PDX-1, APRIL, Neurturin, Kremen-2, EMMPRIN, Activin RIB, Neuroligin 2, Epiregulin, CASA, MMP-12, GALNT2, CEACAM-5, VEGF RI, DSPG3, SorCS1, Matrilin-2, sFRP-3, p53, EphB3, NCK1, Semaphorin 7A, NKp80, Prolactin, Cystatin B, Sirtuin 1, FGF-16, FGF R5, NQO-1, Semaphorin 6D, FGF-3, GATA-4, VAP-A, CHST2, Pappalysin-2, Syndecan-3, Jagged 1, AKR1C4, Olfactomedin-2, Osteoadherin, NKp44, Thyroglobulin, IL-21R, Chemerin, EphA1, CD48, MICB, FGF-5, TRANCE, CES2, ULBP-1, Integrin alpha 5, VAMP-2, FLRG, Ret Midkine, CD73, TRACP, proGRP, Granzyme H, PRX2, p2'7, Siglec-6, Dectin-1, CD51, Notch-1, Calreticulin, DR3, DCTN1, CDC25B, Osteoactivin, ACE, CA125, HAO-1, PSMA1, FCRLB, BMP-9, CRIM1, LIF, SPINK1, EphB6, RGM-B, HS3ST1, ROR1, CMG-2, 4-1BB Ligand, L1CAM-2, p63, Cathepsin V, Testican 2, Glypican 5, CD6, Siglec-2, Legumain, PRELP, CES1, TAZ, NSE, TECK, HTRA2, HIF-1 beta, TAFA1, Podocalyxin, RalA, CRELD2, GRAP2, SP-D, BID, GFR alpha-2, Notch-3, VEGF R3, DLL4, TGFb2, LIGHT, XIAP, ST8SIA1, Cathepsin L, 6Ckine, MIS RII, Kallikrein 5, TGM3, FCAR, Contactin-2, CD83, IL-1 R3, SALM4, GBA3, ROBO4, OSCAR, VEGF, IGSF3, Biglycan, Neudesin, ILT4, uPAR, Axl, WIF-1, IL-7 R alpha, GPR56, CEACAM-3, MCEMP1, FABP2, Plexin B3, MEPE, Activin RIIA, ANG-2, Cochlin, Presenilin 1, NPTXR, SLAM, COMT, SPHK1, RBP4, Nectin-1, GUSB, Nidogen-2, IL-17F, SR-AI, TAFA2, N-Cadherin, IL-17B, IL-17 RC, MIP-3b, Cystatin C, Cystatin D, AMSH, FcERI, CLEC10A, HGF R, ANG-1, Prolactin R, FGF-20, CD28, Nogo-A, HSD17B1, IL-19, Enteropeptidase, Cathepsin E, TSLP, TCN2, GDF-15, Epimorphin, GRKS, PD-1, Serpin A4, ADAM23, NOV, Galectin-2, Neurexin 3 beta, TLR3, Sirtuin 2, Numb, IL-28 R alpha, IL-33, Lin28, FCRL1, KLF4, NKp30, Lymphotactin, Cystatin SN, JAM-A, Calreticulin-2, ErbB4, BMP-8, IL-27 Ra, Fas, IL-4 Ra, Kallikrein 14, Matrilin-3, Olig2, Kallikrein 12, CA13, IL-9, Nectin-3, MPIF-1, Cystatin S, ADA, IL-2 Rb, GFR alpha-1, Smad4, ICAM-1, MEF2C, TREM-1, L-Selectin, Hepsin, CD42b, MCSF, RANK, CHST4, CA8, FCRL3, ASAH2, CF XIV, PYY, HGF, I-TAC, Semaphorin 4C, SorCS3, Tie-1, IL-31

RA, Arginase 1, POGLUT1, IL-lra, Podoplanin, TIM-3, CREG, CD300f, uPA, EphA2, LRRTM4, LIMPII, Tenascin R, CPE, PECAM-1, DNAM-1, DKK-1, OPG, CPB1, TSH, MMP-2, Siglec-9, ICAM-3, Cystatin SA, Galectin-4, Pepsinogen II, Desmoglein-3, Nectin-4, SCF, Serpin A5, PTH, FGF-19, MSP, IL-28A, FGF-12, METAP2, ASAHL, EDIL3, NTAL, EGF R, TAFAS, Galectin-9, vWF-A2, TACE, Activin RIM, Cathepsin S, LDL R, BMPR-IA, OX40, IL-13 R2, B7-H4, MMP-13, ANGPTL7, TRAIL R4, IGSF4B, Sirtuin 5, PEAR1, SH2D1A, Cerberus 1, GDF-11, Nrf2, TROP-2, NUDTS, ROR2, EphB4, Glypican 1, LAP (TGFbl), Gash, Contactin-1, IL-27, UNC5H4, ICAM-2, MBL, HS3ST3B1, RCOR1, IL-10 Rb, XEDAR, IL-22, PILR-alpha, NRG1-131, FABP4, RGM-A, RELT, TrkC, CSa, SREC-I, Nestin, TPO, ErbB3, Kirre13, FLRT1, Galectin-3, CXCL16, JAM-B, DR6, Nogo Receptor, TLR4, VEGF R2, Tie-2, IL-15 R, Caspr2, LTbR, LAMP, ALCAM, GLP-1, NG2, IL-22 R alpha 1, AMIGO2, HCC-1, TFPI-2, ULBP-2, Desmoglein 2, Aggrecan, Syntaxin 4, VAMP-1, Nectin-2, FGF-21, Flt-3, GFAP, TIM-1, Inhibin A, Cadherin-4, PIGF-2, Neurogranin, HE4, IL-23 R, Galectin-7, GALNT3, GITR L, CD14, R-Spondin 2, CK19, Cardiotrophin-1, TREML1, HAPLN1, CD27, ANG-4, Siglec-7, CD155, VEGF-C, TNF RII, PGRP-S, SDF-la, PDGF-AB, GPVI, CD40, SCF R, Thrombospondin-5, IL-1 RII, Neuropilin-2, Cadherin-13, E-Selectin, GITR, WISP-1, Renin, AgRP, MDL-1, ROBO3, RANTES, Endocan, Granulysin, hCGb, Mesothelin, TLR1, TRAIL, MOG, DDR1, NGF R, TRAIL R3, Trypsin 3, ARSB, LIF R alpha, BAFF R, CD157, Granzyme A, 2B4, ESAM, IL-1 R4, CXCL14, IL-31, SIRP alpha, Uromodulin, CTRC, CEACAM-1, TARC, MIP-3a, SDF-lb, NKp46, MCP-3, IL-32 alpha, TGFb3 FOLR2, CD58, IL-23, CD36, TNFb, Shh-N, Ficolin-1, Reg4, ILT2, Mer, TREM-2, Flt-3L, CDS, IL-6, CD229, Insulin, Syntaxin 6, GRO, Bcl-w, Lipocalin-2, PDGF-AA, IL-2 Ra, Angiogenin, LYVE-1, CD4, RAGE, CDNF, Brevican, NAP-2, PU.1, EDAR, ADAMTS13, Kynureninase, PTH1R, IFN-gamma RI, CrkL, B7-1, PARC, Draxin, VE-Cadherin, Procalcitonin, SOX15, Kallikrein 11, BCMA, Dectin-2, EpCAM, HCC-4, TGFa, IP-10, BLAME, CILP-1, PIGF, LOX-1, MCP-2, Resistin, HVEM, ENPP-7, Syndecan-4, IL-2 Rg, MICA, Dopa Decarboxylase, NPDC-1, MCP-4, EG-VEGF, Glycoprotein V, Semaphorin 4G, IL-12p40, PSA-total, IL-15, MAP1D, Clq, TNF4, Dtk, Endoglin, ENA-78, Reg3A, MIP-lb, FGF-17, IL-6R, IL-8, Galectin-8, CA4, Cystatin E M, FUT8, B7-H3, GCP-2, CD40L, MDC, 4-1BB, HO-1, SOST, S100A13, Kallikrein 7, and IL-13.

The nucleic acid content of the therapeutic product was determined, and the following nucleic acids were found to be present: hsa-let-7a-5p, hsa-let-7b-5p, hsa-let-7c-5p, hsa-let-7d-3p, hsa-let-7e-5p, hsa-let-7g-5p, hsa-let-7i, hsa-let-7i-5p, hsa-miR-100-5p, hsa-miR-103a-3p, hsa-miR-106a-5p, hsa-miR-106b-5p, hsa-mir-10b, hsa-miR-10b-5p, hsa-mir-1246, hsa-miR-1246, hsa-miR-125a-5p, hsa-miR-125b-5p, hsa-miR-130a-3p, hsa-mir-130b, hsa-miR-130b-3p, hsa-miR-132-3p, hsa-miR-136-5p, hsa-miR-138-5p, hsa-miR-139-5p, hsa-mir-140, hsa-miR-140-3p, hsa-miR-145-5p, hsa-miR-146a, hsa-miR-146a-5p, hsa-miR-148a-3p, hsa-miR-152-3p, hsa-miR-15a-5p, hsa-miR-15b-5p, hsa-mir-16-1, hsa-mir-16-2, hsa-miR-16-5p, hsa-miR-1'7-5p, hsa-miR-181a-5p, hsa-miR-191-5p, hsa-miR-193a-5p, hsa-miR-193b-3p, hsa-miR-19'7-3p, hsa-miR-199a-3p, hsa-miR-199a-5p, hsa-miR-199b-5p, hsa-miR-19a-3p, hsa-miR-19b-3p, hsa-miR-20a-5p, hsa-mir-203a, hsa-miR-203a-3p, hsa-miR-214-3p, hsa-mir-21, hsa-miR-21-3p, hsa-miR-21-5p, hsa-mir-221, hsa-miR-221-3p, hsa-miR-222, hsa-miR-222-3p, hsa-miR-22-3p, hsa-miR-23a-3p, hsa-miR-23b-3p, hsa-mir-24-1, hsa-mir-24-2, hsa-miR-24-3p, hsa-mir-25, hsa-miR-25-3p, hsa-miR-26a-5p, hsa-miR-27a-3p, hsa-mir-27b, hsa-miR-27b-3p, hsa-miR-29a-3p, hsa-miR-29c-3p, hsa-miR-30a-5p, hsa-miR-30a-5p, hsa-miR-30b-5p, hsa-miR-30c-5p, hsa-mir-30d, hsa-miR-30d-5p, hsa-mir-30e, hsa-miR-30e-5p, hsa-miR-31-3p, hsa-miR-31-5p, hsa-miR-320a, hsa-miR-342-3p, hsa-miR-345-5p, hsa-miR-34a-5p, hsa-miR-361-5p, hsa-miR-376a-3p, hsa-miR-376c-3p, hsa-miR-423-3p, hsa-miR-423-5p, hsa-miR-424-5p, hsa-miR-484, hsa-mir-486-1, hsa-mir-486-2, hsa-miR-486-5p, hsa-miR-570-3p, hsa-miR-574-3p, hsa-miR-663a, hsa-miR-874-3p, hsa-mir-92a-1, hsa-mir-92a-2, hsa-miR-92a-3p, hsa-miR-92b-3p, hsa-mir-93, hsa-miR-93-5p, hsa-miR-940, hsa-miR-99a-5p, and hsa-miR-99b-5p.

B. Example 2—Prospective Study of the Use of Bone Marrow Mesenchymal Stem Cell Derived Extracellular Vesicles to Treat Crohn's Disease-Associated Perianal Fistula In this Example, a human bone marrow-derived extracellular vesicle (hBM-MSC EV) therapeutic product of Example 1 above (ExoFlo™, Direct Biologics) will be evaluated for safety and efficacy for the Treatment of perianal fistulizing Crohn's Disease. This study was designed to evaluate the safety, feasibility, and potential efficacy of ExoFlo™ in treating perianal fistulas in subjects suffering from Crohn's disease. This study is a single-blind, placebo-controlled, and randomized controlled trial with dose-escalation.

Study Description

Brief Summary

This study was designed to evaluate the safety and feasibility of ExoFlo™ as a treatment for Perianal Fistulizing Crohn's Disease. A summary is provided in Table 1.

TABLE 1

Summary

| Condition or disease | Intervention/treatment | Phase |
|---|---|---|
| Perianal Fistula, Crohn's Disease | Biological: ExoFlo ™ Other: Local injection of normal saline | Phase 1 Phase 2 |

Detailed Description

This is a phase IB/IIA, multicenter, single-blind, placebo-controlled, dose-escalation design, randomized controlled trial for the treatment of Perianal Fistulizing Crohn's Disease. Subjects will be randomized 2:1 Investigational Medicinal Product (IMP) to normal saline (NS) in 3 cohorts of 12 subjects as follows:

Cohort 1: Local injection of 15 mL of IMP or NS on Day 0 (8 IMP, 4 NS)

Cohort 2: Local injection of 30 mL of IMP or NS on Day 0 (8 IMP, 4 NS)

Cohort 3: Local injection of 30 mL of IMP or NS on Day 0 and Month 3 (8 IMP, 4 NS)

Study Design
 Study Type: Interventional (Clinical Trial)
 Estimated Enrollment: 36 participants
 Allocation: Randomized
 Intervention Model: Sequential Assignment
 Intervention Model Description: Multicenter, Placebo-controlled, Dose-escalation Design, Randomized Controlled Trial.
 Masking: Single (Participant)
 Masking Description: Single-blind
 Primary Purpose: Treatment
 Official Title: A Phase IB/IIA Study of ExoFlo, an Ex Vivo Culture-expanded Adult Allogeneic Bone Marrow Mesenchymal Stem Cell Derived Extracellular Vesicle Isolate Product, for the Treatment of Perianal Fistulizing Crohn's Disease
 Details of study design and plan are described in Table 2.

TABLE 2

Arms and Interventions

| Arm | Intervention/treatment |
| --- | --- |
| Placebo Comparator: Cohort 1: Placebo Local injection 15 mL of normal saline on Day 0 | Other: Local injection of normal saline Placebo |
| Placebo Comparator: Cohort 2: Placebo Local injection 30 mL of normal saline on Day 0 | Other: Local injection of normal saline Placebo |
| Placebo Comparator: Cohort 3: Placebo Local injection 30 mL of normal saline on Day 0 and Month 3 | Other: Local injection of normal saline Placebo |
| Experimental: Cohort 1: Treatment Local injection of 15 mL of ExoFlo ™ on Day 0 | Biological: ExoFlo ™ Local injection of bone marrow mesenchymal stem cell derived extracellular vesicles |
| Experimental: Cohort 2: Treatment Local injection of 30 mL of ExoFlo ™ on Day 0 | Biological: ExoFlo ™ Local injection of bone marrow mesenchymal stem cell derived extracellular vesicles |
| Experimental: Cohort 3: Treatment Local injection of 30 mL of ExoFlo ™ on Day 0 and Month 3 | Biological: ExoFlo ™ Local injection of bone marrow mesenchymal stem cell derived extracellular vesicles |

Outcome Measures
 Primary and secondary outcomes will be measured as described below in the time frame of 12 months.
Primary Outcome Measures:
 1. Safety and Feasibility (Time Frame: 12 Months)
  Safety will be defined as the rate of Adverse Events (AEs) or Severe Adverse Events (SAEs) related to IMP and administration of IMP in this patient population. Safety and feasibility will be evaluated for one dose of 15 mL or 30 mL ExoFlo™ or two doses of 30 mL ExoFlo™ in subjects with perianal fistula(s) in the setting of Crohn's Disease.
Secondary Outcome Measures:
 1. Healing (Time Frame: 12 Months)
  The efficacy for one dose of 15 mL or 30 mL ExoFlo™ or two doses of 30 mL ExoFlo™ in subjects with perianal fistula(s) in the setting of Crohn's Disease will be evaluated. Subjects will be evaluated for healing progress: complete healing, partial healing, lack of response, or treatment failure.
Eligibility Criteria
 Ages Eligible for Study: 18 Years to 75 Years (Adult, Older Adult)
 Sexes Eligible for Study: All
 Accepts Healthy Volunteers: No
 Criteria: subjects will be selected based on the inclusion criteria and exclusion criteria as described below.
Inclusion Criteria:
 1. Men and Women 18-75 years of age with a diagnosis of Crohn's Disease (CD) for at least six months duration.
 2. Single and/or Multi-tract Perianal fistula(s).
 3. Failed at least one medical therapy within the last year including, but not limited to, antibiotics, immunomodulators (6-MP, methotrexate, azathioprine), monoclonal antibodies (infliximab, adalimumab, certolizumab, ustekinumab, golimumab, vedolizumab), or small molecule inhibitors.
 4. Previous failed surgical intervention, including seton placement at least two weeks prior, or are not candidates for surgical intervention or are not willing to undergo surgical intervention for the management of their fistula.
 5. Medical therapy for CD stable for at least 2 months prior to administration of IMP. Changes in dosing or dosing intervals related to serum drug levels are permitted.
 6. Ability to comply with protocol.
 7. Competent and able to provide written informed consent.
Exclusion Criteria:
 1. Active perianal abscess or infection at the time of screening, enrollment, or at the time of investigational product administration
 2. Clinically significant medical conditions within the six months before administration of IMP that would, in the opinion of the investigators, compromise the safety of the subject.
 3. History of cancer including melanoma (with the exception of localized skin cancers) within one year of screening.
 4. History of colorectal cancer within 2 years
 5. Subjects who have a diagnosis of coagulation disorders and/or are currently on anti-coagulant therapy
 6. Investigational drug within one month of treatment
 7. Pregnant or breast feeding or trying to become pregnant.
 8. Presence of a rectovaginal fistula
 9. Presence of an ileal anal pouch and/or history of proctectomy
 10. The presence of severe proctitis
 11. Any condition which, in the opinion of the investigator, would make it unsafe or unsuitable for patients to undergo Magnetic Resonance (MR) evaluations (i.e., presence of implantable or external MR unsafe device that cannot be removed, body weight exceeding limitations, claustrophobia etc.).
 12. A participant who is unwilling to use medically acceptable contraception methods during participation in study
 13. The following out of range laboratory results at screening (result may be repeated)
  WBC>11×109/L
  Hemoglobin <8 g/dl
  Platelet count <100,000/mL
  AST/ALT>2 times the upper limit of normal
  Creatinine >2 umol/L
  PT/INR: outside normal limits
  Hemoglobin A1c>6.5 mg/dL

C. Example 3—Prospective Study of the Use of Bone Marrow Mesenchymal Stem Cell Derived Extracellular Vesicles to Treat Cryptoglandular Perianal Fistula In this Example, a human bone marrow-derived extracellular vesicle (hBM-MSC EV) therapeutic product of Example 1 above (ExoFlo™, Direct Biologics) will be evaluated for safety and efficacy for the Treatment of cryptoglandular perianal fistula. This study can be designed to evaluate the safety, feasibility, and potential efficacy of ExoFlo™ in treating cryptoglandular perianal fistula. The details of study can be designed as described in Example 2.

Briefly, subjects with cryptoglandular perianal fistula can be recruited for the study based on selection/exclusion criteria. Subjects can be randomly divided into different cohorts for testing different doses and each cohort can include a placebo group as a control (for example, see Table 2). Study outcome can be measured as primary and secondary outcomes. Primary outcome measures can include data regarding safety of ExoFlo™ (e.g., adverse events or severe adverse events related to ExoFlo™) and feasibility. Secondary outcome measures can include data regarding efficacy of ExoFlo™ in treating cryptoglandular perianal fistula. Subjects can be evaluated for healing process (e.g., complete healing, partial healing, lack of response, or treatment failure).

The examples and embodiments described herein are for illustrative purposes only and various modifications or changes suggested to persons skilled in the art are to be included within the spirit and purview of this application.

While some embodiments have been shown and described herein, such embodiments are provided by way of example only. Numerous variations, changes, and substitutions will now occur to those skilled in the art without departing from the disclosure provided herein. It should be understood that various alternatives to the embodiments described herein can be employed.

What is claimed is:

1. A method of treating perianal fistula in a subject having ulcerative colitis or Crohn's disease, the method comprising administering to the subject a therapeutic bone marrow MSC secretome composition comprising extracellular vesicles, wherein at least 80% of the extracellular vesicles are CD63$^+$ CD9$^-$ CD81$^-$.

2. The method of claim 1, wherein the perianal fistula is a cryptoglandular perianal fistula.

3. The method of claim 1, wherein the administering comprises an injection or parenteral administration.

4. The method of claim 3, wherein the injection comprises one or more injections into a tissue surrounding the perianal fistula.

5. The method of claim 3, wherein the parenteral administration comprises a slow release or sustained release system that maintains a constant dosage.

6. The method of claim 1, wherein the therapeutic bone marrow MSC secretome composition has a cell-equivalent dosage of 0.7 to 7 million cells/kg.

7. The method of claim 1, wherein the therapeutic bone marrow MSC secretome composition has $5 \times 10^{11}$ to $1.5 \times 10^{12}$ extracellular vesicles.

8. The method of claim 1, wherein the therapeutic bone marrow MSC secretome composition has $6 \times 10^{10}$ to $8 \times 10^{10}$ extracellular vesicles per mL.

9. The method of claim 8, wherein the therapeutic bone marrow MSC secretome composition is administered to the subject at a dose of 10 to 30 mL.

10. The method of claim 1, wherein the subject has had a previous failed surgical treatment of a perianal fistula.

11. The method of claim 1, wherein the subject has had a seton placement at least 2 weeks before the administering.

12. The method of claim 1, wherein the therapeutic bone marrow MSC secretome composition comprises one or more of the following proteins: 2B4, 4-1BB, 4-1BB Ligand, 6Ckine, ACE, Activin A, Activin RIB, Activin RIIA, Activin RIM, ADA, ADAM23, ADAMS, ADAMTS13, ADAMTSL-1, Adiponectin, Adipsin, Aggrecan, AgRP, AIF, AKR1C4, Albumin, ALCAM, AMIGO, AMIGO2, Aminopeptidase LRAP, Aminopeptidase P2, AMSH, ANG-1, ANG-2, ANG-4, Angiogenin, Angiotensinogen, ANGPTL4, ANGPTL7, APRIL, Arginase 1, ARSB, Artemin, Arylsulfatase A, ASAH2, ASAHL, Ax1, B2M, B7-1, B7-H3, B7-H4, BAFF R, BCL-10, BCL-2, BCL-w, BCMA, BID, bIG-H3, Biglycan, BLAME, BMP-2, BMP-8, BMP-9, BMPR-IA, Brevican, CA125, CA13, CA2, CA4, CA8, Cadherin-13, Cadherin-4, Calreticulin, Calreticulin-2, Cardiotrophin-1, CASA, Caspr2, Cathepsin B, Cathepsin E, Cathepsin L, Cathepsin S, Cathepsin V, CD109, CD14, CD155, CD157, CD2, CD200, CD229, CD27, CD27 Ligand, CD28, CD30, CD300f, CD314, CD34, CD36, CD39L2, CD4, CD40, CD40L, CD42b, CD48, CD51, CD58, CD6, CD63, CD73, CD81, CD83, CD9, CD97, CD99, CD99-L2, CDC25B, CDNF, CDS, CEACAM-1, CEACAM-3, CEACAM-5, Cerberus 1, CES1, CES2, CF VII, CF XIV, Chemerin, CHI3L1, CHST2, CHST3, CHST4, cIAP-1, cIAP-1, CILP-1, CK19, CLEC-1, CLEC10A, CLEC-2, CL-P1, Clq, ClqTNF9, cMASP3, CMG-2, C-myc, CNTF, Cochlin, COMT, Contactin-1, Contactin-2, CPB1, CPE, CREG, CRELD2, CRIM1, CrkL, CSa, CTACK, CTRC, CXCL14, CXCL16, Cyr61, Cystatin B, Cystatin C, Cystatin D, Cystatin E M, Cystatin S, Cystatin SA, Cystatin SN, Cytokeratin-8, DAPP1, DcR3, DCTN1, DDR1, Decorin, Dectin-1, Dectin-2, Desmin, Desmoglein 2, Desmoglein-3, DKK-1, DKK-3, DKK-3, DLL4, DNAM-1, DNMT3A, Dopa Decarboxylase, DPPII, DPPIV, DR3, DR6, Nogo Receptor, Draxin, DSCAM, DSPG3, Dtk, EDAR, EDIL3, EGF R, EG-VEGF, EMMPRIN, Endocan, Endoglin, ENA-78, Endoglycan, eNOS, ENPP-2, ENPP-7, Enteropeptidase, EpCAM, EphA1, EphA2, EphB3, EphB4, EphB6, Ephrin-A4, Ephrin-B3, Epimorphin, Epiregulin, ErbB3, ErbB4, Erythropoietin, ESAM, E-Selectin, EXTL3, FABP1, FABP2, FABP4, FABP6, FAP, Fas, FCAR, FcERI, FCRL1, FCRL3, FCRLB, FCRLS, Ferritin, FGF R5, FGF-12, FGF-16, FGF-17, FGF-19, FGF-20, FGF-21, FGF-23, FGF-3, FGF-5, Ficolin-1, FKBP51, FLRG, FLRT1, FLRT2, Flt-3, Flt-3L, Follistatin, Follistatin-like 1, Furin, FUT8, Galanin, Galectin-1, Galectin-2, Galectin-3, Galectin-4, Galectin-7, Galectin-8, Galectin-9, GALNT10, GALNT2, GALNT3, Gash, GATA-4, GBA3, GCP-2, GDF-11, GDF-15, GDF-9, GFAP, GFR alpha-1, GFR alpha-2, GITR, GITR L, GKN1, GLP-1, Glycoprotein V, Glyoxalase II, Glypican 1, Glypican 2, Glypican 5, GM-CSF Ra, gp130, GP73, GPR115, GPR56, GPVI, Granulysin, Granzyme A, Granzyme B, Granzyme H, GRAP2, GRKS, GRO, GSTM1, GUSB, HAO-1, HAPLN1, HCC-1, HCC-4, hCGb, HE4, Hepsin, HGF, HGF R, HIF-1 alpha, HIF-1 beta, HO-1, HS3ST1, HS3ST3B1, HS3ST4, HSD17B1, htPAPP-A, HTRA2, HVEM, ICAM-1, ICAM-2, ICAM-3, ICOS, IDO, IFNab R2, IFNb, IFN-gamma R1, IGF-2, IGF-2R, IGFBP-2, IGFBP-3, IGFBP-4, IGFBP-5, IGFBP-6, IGSF3, IGSF4B, IL-1 F10, IL-1 R3, IL-1 R4, IL-1 R6, IL-1 RI, IL-1 RII, IL-10 Rb, IL-12p40, IL-13, IL-13 R2, IL-15, IL-15 R, IL-17 RC, IL-17 RD, IL-17B, IL-17F, IL-18, IL-18 BPa, IL-19, IL-2 Ra, IL-2 Rb, IL-2 Rg, IL-20 R beta, IL-20 Ra, IL-21 R, IL-22, IL-22 R alpha 1, IL-22 BP, IL-23, IL-23 R, IL-24, IL-27, IL-27 Ra, IL-28 R alpha, IL-28A, IL-31, IL-31 RA, IL-32 alpha, IL-33, IL-4 Ra, IL-6, IL-6 R, IL-7 R alpha, IL-8, IL-9, IL-1ra, ILT2, ILT4, Inhibin A, Insulin, Insulin R, Integrin alpha 1, Integrin alpha 5, IP-10, I-TAC, Jagged 1, JAM-A, JAM-B, JAM-C, Kallikrein 1, Kallikrein 11, Kallikrein 12, Kallikrein 14, Kallikrein 5, Kallikrein 7, Kell, KIR2DL3, Kirrel3, KLF4, Kremen-2, Kynureninase, L1CAM-2, LAIR2, LAMA4, LAMP, LAMP1, LAMP2, Langerin, LAP(TGFb1), LDL R, LEDGF, Legumain, LH, LIF, LIF R alpha, LIGHT, LILRB4, LIMPII, Lin28, Lipocalin-2, LOX-1, LRP-6, LRRC4, LRRTM4, LSECtin, L-Selectin, LTbR, Lumican, Lymphotactin, LYVE-1, MAP1D, Matrilin-2, Matrilin-3, Matriptase, MBL, Mc1-1, MCEMP1, MCP-2, MCP-3, MCP-4, MCSF, MDC, MDL-1, MEF2C, MEP1B, MEPE, MeprinA, Mer, Mesothelin, METAP2, MFRP, MIA, MICA, MICB, Midkine, MIF, MIP-3a, MIP-3b, MIP-lb, MIS RII, MMP-1, MMP-10, MMP-12, MMP-13, MMP-2, MOG, MPIF-1, MSP, MSP R, NAP-2, N-Cadherin, NCAM-1 (CD56), NCK1, Nectin-1, Nectin-2, Nectin-3, Nectin-4, Neprilysin, Nestin, Netrin-4, Neudesin, Neurexin 3 beta, Neurogranin, Neuroligin 2, Neurturin, NG2, NGF R, Nidogen-1, Nidogen-2, NKp30, NKp44, NKp46, NKp80, Nogo-A, Norrin, Notch-1, Notch-3, NOV, NPDC-1, NPTXR, NQO-1, Nrf2, NRG1-131, NSE, NTAL, NUDTS, Numb, NUP85, Olfactomedin-2, Olig2, OPG, OPN, OSCAR, OSM R beta, Osteoactivin, Osteoadherin, OX40, OX40 Ligand, PlGF-2, p2'7, p53, p63, PAI-1, PAPP-A, Pappalysin-2, PAR1, PARC, Pax3, PCK1, PCSK2, PD-1, PD-ECGF, PDGF R alpha, PDGF Rb, PDGF-AA, PDGF-AB, PDGF-CC, PD-L2, PDX-1, PEAR1, PECAM-1, Pentraxin 3, Pepsinogen II, Periostin, Persephin, PF4, PGRP-S, PIGF, PILR-alpha, Plexin A4, Plexin B3, Plexin D1, Podocalyxin, Podoplanin, POGLUT1, PON1, PRDX4, Pref-1, PRELP, Presenilin 1, Procalcitonin, Progranulin, proGRP, Prolactin, Prolactin R, PRX2, PSA-total, PSMA, PSMA1, PTH, PTH1R, PTP1B, PU.1, PYY, RAGE, RalA, RANK RANTES, RBP4, RCOR1, Reg3A, Reg4, RELT, Renin, Resistin, Ret Midkine, RGM-A, RGM-B, RGM-C, ROBO2, ROBO3, ROBO4, ROR1, ROR2, R-Spondin 2, S100A1, S100A13, SALM4, SCCA2, SCF, SCF R, SDF-la, SDF-lb, Semaphorin 4C, Semaphorin 4D, Semaphorin 4G, Semaphorin 6A, Semaphorin 6B, Semaphorin 6C, Semaphorin 6D, Semaphorin 7A, Serpin A4, Serpin A5, Serpin B6, Serpin Fl, sFRP-3, SH2D1A, Shh-N, SHP-1, Siglec-10, Siglec-11, Siglec-2, Siglec-6, Siglec-7, Siglec-9, SIRP alpha, Sirtuin 1, Sirtuin 2, Sirtuin 5, SLAM, SLITRK5, Smad4, SMPD1, SorCS1, SorCS2, SorCS3, Sortilin, SOST, SOX15, SOX2, SOX7, SOX9, SP-D, SPHK1, Spinesin, SPINK1, SR-AI, SREC-I, SREC-II, ST3GAL1, ST6GAL1, ST8SIA1, Stabilin-2, SULT2A1, Syndecan-3, Syndecan-4, Syntaxin 4, Syntaxin 6, TACE, TAFA1, TAFA2, TAFAS, TARC, TAZ, TCN2, TC-PTP, TECK, Tenascin R, Testican 2, TFF3, TFPI, TFPI-2, TGFa, TGFb2, TGFb3 FOLR2, TGFbl, TGM3, TGM4, THAP11, Thrombomodulin, Thrombospondin-2, Thrombospondin-5, THSD1, Thyroglobulin, Thyroid Peroxidase, Tie-1, Tie-2, TIM-1, TIM-3, TIMP-1, TIMP-2, TLR1, TLR2, TLR3, TLR4, TNF RI, TNF RII, TNF4, TNFb, TPO, TPP1, TPST2, TRACP, TRAIL, TRAIL R1, TRAIL R3, TRAIL R4, TRANCE, Transferrin, TREM-1, TREM-2, TREML1, TrkC, TROP-2, Troponin C, TROY, Trypsin 1, Trypsin 3, TSH, TSK, TSLP, TSLP R, TSP-1, TWEAK R, Ubiquitin+1, UCH-L3, ULBP-1, ULBP-2, ULBP-3, ULBP-4, UNC5H3, UNC5H4, uPA, uPAR, Uromodulin, VAMP-1, VAMP-2, VAP-A, VCAM-1, VE-Cadherin, VEGF, VEGF R1, VEGF R2, VEGF R3, VEGF-C, Visfatin, vWF-A2, WIF-1, WISP-1, Wnt-4, XEDAR, and XIAP.

13. The method of claim 1, wherein the therapeutic bone marrow MSC secretome composition comprises one or more of the following nucleic acids: hsa-let-7a-5p, hsa-let-7b-5p, hsa-let-7c-5p, hsa-let-7d-3p, hsa-let-7e-5p, hsa-let-7g-5p, hsa-let-7i, hsa-let-7i-5p, hsa-miR-100-5p, hsa-miR-103a-3p, hsa-miR-106a-5p, hsa-miR-106b-5p, hsa-mir-10b, hsa-miR-10b-5p, hsa-mir-1246, hsa-miR-1246, hsa-miR-125a-5p, hsa-miR-125b-5p, hsa-miR-130a-3p, hsa-mir-130b, hsa-miR-130b-3p, hsa-miR-132-3p, hsa-miR-136-5p, hsa-miR-138-5p, hsa-miR-139-5p, hsa-mir-140, hsa-miR-l 40-3p, hsa-miR-145-5p, hsa-mir-146a, hsa-miR-146a-5p, hsa-miR-148a-3p, hsa-miR-152-3p, hsa-miR-15a-5p, hsa-miR-15b-5p, hsa-mir-16-1, hsa-miR-16-2, hsa-miR-16-5p, hsa-miR-1'7-5p, hsa-miR-181a-5p, hsa-miR-191-5p, hsa-miR-193a-5p, hsa-miR-193b-3p, hsa-miR-19'7-3p, hsa-miR-199a-3p, hsa-miR-199a-5p, hsa-miR-199b-5p, hsa-miR-19a-3p, hsa-miR-19b-3p, hsa-miR-20a-5p, hsa-mir-203a, hsa-miR-203a-3p, hsa-miR-214-3p, hsa-mir-21, hsa-miR-21-3p, hsa-miR-21-5p, hsa-mir-221, hsa-miR-221-3p, hsa-mir-222, hsa-miR-222-3p, hsa-miR-22-3p, hsa-miR-23a-3p, hsa-miR-23b-3p, hsa-mir-24-1, hsa-mir-24-2, hsa-miR-24-3p, hsa-mir-25, hsa-miR-25-3p, hsa-miR-26a-5p, hsa-miR-27a-3p, hsa-mir-27b, hsa-miR-27b-3p, hsa-miR-29a-3p, hsa-miR-29c-3p, hsa-miR-30a-5p, hsa-miR-30a-5p, hsa-miR-30b-5p, hsa-miR-30c-5p, hsa-miR-30d, hsa-miR-30d-5p, hsa-mir-30e, hsa-miR-30e-5p, hsa-miR-3 1-3p, hsa-miR-3 1-5p, hsa-miR-320a, hsa-miR-342-3p, hsa-miR-345-5p, hsa-miR-34a-5p, hsa-miR-361-5p, hsa-miR-376a-3p, hsa-miR-376c-3p, hsa-miR-423-3p, hsa-miR-423-5p, hsa-miR-424-5p, hsa-miR-484, hsa-mir-486-1, hsa-mir-486-2, hsa-miR-486-5p, hsa-miR-570-3p, hsa-miR-574-3p, hsa-miR-663a, hsa-miR-874-3p, hsa-mir-92a-1, hsa-mir-92a-2, hsa-miR-92a-3p, hsa-miR-92b-3p, hsa-mir-93, hsa-miR-93-5p, hsa-miR-940, hsa-miR-99a-5p, and hsa-miR-99b-5p.

14. A method of treating perianal fistula in a subject in need thereof, the method comprising administering to the subject a therapeutic bone marrow MSC secretome composition comprising extracellular vesicles, wherein the therapeutic bone marrow MSC secretome composition comprises VEGF, TIMP1, and IGFBP4.

15. The method of claim 14, wherein the therapeutic bone marrow MSC secretome composition further comprises: 2B4, 4-lBB, 4-lBB Ligand, 6Ckine, ACE, Activin A, Activin RIB, Activin RIIA, Activin RIM, ADA, ADAM23, ADAMS, ADAMTS13, ADAMTSL-1, Adiponectin, Adipsin, Aggrecan, AgRP, AIF, AKR1C4, Albumin, ALCAM, AMIGO, AMIGO2, Aminopeptidase LRAP, Aminopeptidase P2, AMSH, ANG-1, ANG-2, ANG-4, Angiogenin, Angiotensinogen, ANGPTL4, ANGPTL 7, APRIL, Arginase 1, ARSB, Artemin, Arylsulfatase A, ASAH2, ASAHL, Ax1, B2M, B7-1, B7-H3, B7-H4, BAFF R, BCL-10, BCL-2, BCL-w, BCMA, BID, bIG-H3, Bigly can, BLAME, BMP-2, BMP-8, BMP-9, BMPR-IA, Brevican, CA125, CA13, CA2, CA4, CA8, Cadherin-13, Cadherin-4, Calreticulin, Calreticulin-2, Cardiotrophin-1, CASA, Caspr2, Cathepsin B, Cathepsin E, Cathepsin L, Cathepsin S, Cathepsin V, CD109, CD14, CD155, CD157, CD2, CD200, CD229, CD27, CD27 Ligand, CD28, CD30, CD300f, CD314, CD34, CD36, CD39L2, CD4, CD40, CD40L, CD42b, CD48, CD51, CD58, CD6, CD63, CD73, CD81, CD83, CD9, CD97, CD99, CD99-L2, CDC25B, CDNF, CDS, CEACAM-1, CEACAM-3, CEACAM-5, Cerberus 1, CES1, CES2, CF VII, CF XIV, Chemerin, CHI3L1, CHST2, CHST3, CHST4, cIAP-1, cIAP-1, CILP-1, CK19, CLEC-1, CLEC10A, CLEC-2, CL-P1, Clq, ClqTNF9, cMASP3, CMG-2, C-myc, CNTF, Cochlin, COMT, Contactin-1, Contactin-2, CPB1, CPE, CREG, CRELD2, CRIM1, CrkL, CSa, CTACK, CTRC, CXCL14, CXCL16, Cyr61, Cystatin B, Cystatin C, Cystatin D, Cystatin EM, Cystatin S, Cystatin SA, Cystatin SN, Cytokeratin-8, DAPP1, DcR3, DCTN1, DDR1, Decorin, Dectin-1, Dectin-2, Desmin, Desmoglein 2, Desmoglein-3, DKK-1, DKK-3, DKK-3, DLL4, DNAM-1, DNMT3A, Dopa Decarboxylase, DPPII, DPPIV, DR3, DR6, Nogo Receptor, Draxin, DSCAM, DSPG3, Dtk, EDAR, EDIL3, EGF R, EG-VEGF, EMMPRIN, Endocan, Endoglin, ENA-78, Endoglycan, eNOS, ENPP-2, ENPP-7, Enteropeptidase, EpCAM, EphA1, EphA2, EphB3, EphB4, EphB6, Ephrin-A4, EphrinB3, Epimorphin, Epiregulin, ErbB3, ErbB4, Erythropoietin, ESAM, E-Selectin, EXTL3, FABP1, FABP2, FABP4, FABP6, FAP, Fas, FCAR, FcERI, FCRL1, FCRL3, FCRLB, FCRLS, Ferritin, FGF RS, FGF-12, FGF-16, FGF-17, FGF-19, FGF-20, FGF-21, FGF-23, FGF-3, FGF-5, Ficolin-1, FKBP51, FLRG, FLRT1, FLRT2, Flt-3, Flt-3L, Follistatin, Follistatin-like 1, Furin, FUT8, Galanin, Galectin-1, Galectin-2, Galectin-3, Galectin-4, Galectin-7, Galectin-8, Galectin-9, GALNT10, GALNT2, GALNT3, Gash, GATA-4, GBA3, GCP-2, GDF-11, GDF-15, GDF-9, GFAP, GFR alpha-1, GFR alpha-2, GITR, GITR L, GKN1, GLP-1, Glycoprotein V, Glyoxalase II, Glypican 1, Glypican 2, Glypican 5, GM-CSF Ra, gp130, GP73, GPR115, GPR56, GPVI, Granulysin, Granzyme A, Granzyme B, GranzymeH, GRAP2, GRKS, GRO, GSTM1, GUSB, HAO-1, HAPLN1, HCC-1, HCC-4, hCGb, HE4, Hepsin, HGF, HGF R, HIF-1 alpha, HIF-1 beta, HO-1, HS3ST1, HS3ST3B1, HS3ST4, HSD17B1, htPAPP-A, HTRA2, HVEM, ICAM-1, ICAM-2, ICAM-3, ICOS, IDO, IFNab R2, IFNb, IFN-gamma R1, IGF-2, IGF-2R, IGFBP-2, IGFBP-3, IGFBP-5, IGFBP-6, IGSF3, IGSF4B, IL-1 F10, IL-1 R3, IL-1 R4, IL-1 R6, IL-1 RI, IL-1 RII, IL-10 Rb, IL-12p40, IL-13, IL-13 R2, IL-15, IL-15 R, IL-17 RC, IL-17 RD, IL-17B, IL-1 7F, IL-18, IL-18 BPa, IL-19, IL-2 Ra, IL-2 Rb, IL-2 Rg, IL-20 R beta, IL-20 Ra, IL-21 R, IL-22, IL-22 R alpha 1, IL-22 BP, IL-23, IL-23 R, IL-24, IL-27, IL-27 Ra, IL-28 R alpha, IL-28A, IL-31, IL-31 RA, IL-32 alpha, IL-33, IL-4 Ra, IL-6, IL-6 R, IL-7 R alpha, IL-8, IL-9, IL-1ra, ILT2, ILT4, Inhibin A, Insulin, Insulin R, Integrin alpha 1, Integrin alpha 5, IP-10, I-TAC, Jagged 1, JAM-A, JAM-B, JAM-C, Kallikrein 1, Kallikrein 11, Kallikrein 12, Kallikrein 14, Kallikrein 5, Kallikrein 7, Kell, KIR2DL3, Kirrel3, KLF4, Kremen-2, Kynureninase, L1CAM-2, LAIR2, LAMA4, LAMP, LAMP1, LAMP2, Langerin, LAP(TGFb1), LDL R, LEDGF, Legumain, LH, LIF, LIF R alpha, LIGHT, LILRB4, LIMPII, Lin28, Lipocalin-2, LOX-1, LRP-6, LRRC4, LRRTM4, LSECtin, L-Selectin, LTbR, Lumican, Lymphotactin, LYVE-1, MAP1D, Matrilin-2, Matrilin-3, Matriptase, MBL, Mc1-1, MCEMP1, MCP-2, MCP-3, MCP-4, MCSF, MDC, MDL-1, MEF2C, MEP1B, MEPE, MeprinA, Mer, Mesothelin, METAP2, MFRP, MIA, MICA, MICB, Midkine, MIF, MIP-3a, MIP-3b, MIP-lb, MIS RII, MMP-1, MMP-10, MMP-12, MMP-13, MMP-2, MOG, MPIF-1, MSP, MSP R, NAP-2, N-Cadherin, NCAM-1 (CD56), NCK1, Nectin-1, Nectin-2, Nectin-3, Nectin-4, Neprilysin, Nestin, Netrin-4, Neudesin, Neurexin 3 beta, Neurogranin, Neuroligin 2, Neurturin, NG2, NGF R, Nidogen-1, Nidogen-2, NKp30, NKp44, NKp46, NKp80, Nogo-A, Norrin, Notch-1, Notch-3, NOV, NPDC-1, NPTXR, NQO-1, Nrf2, NRG1-131, NSE, NTAL, NUDTS, Numb, NUP85, Olfactomedin-2, Olig2, OPG, OPN, OSCAR, OSM R beta, Osteoactivin, Osteoadherin, OX40, OX40 Ligand, P1GF-2, p2'7, p53, p63, PAI-1, PAPP-A, Pappalysin-2, PAR1, PARC, Pax3, PCK1, PCSK2, PD-1, PD-ECGF, PDGF R alpha, PDGF Rb, PDGF-AA, PDGF-AB, PDGF-CC, PD-L2, PDX-1, PEAR1, PECAM-1, Pentraxin 3, Pepsinogen II, Periostin, Persephin, PF4, PGRP-S, PIGF, PILR-alpha, Plexin A4, Plexin B3, Plexin D1, Podocalyxin, Podoplanin, POGLUT1, PON1, PRDX4, Pref-1, PRELP, Presenilin 1, Procalcitonin, Progranulin, proGRP, Prolactin, Prolactin R, PRX2, PSA-total, PSMA, PSMA1, PTH, PTH1R, PTP1B, PU.I, PYY, RAGE, RalA, RANK, RANTES, RBP4, RCOR1, Reg3A, Reg4, RELT, Renin, Resistin, Ret Midkine, RGM-A, RGM-B, RGM-C, ROBO2, ROBO3, ROBO4, ROR1, ROR2, R-Spondin 2, S100Al, S100A13, SALM4, SCCA2, SCF, SCF R, SDF-la, SDF-lb, Semaphorin 4C, Semaphorin 4D, Semaphorin 4G, Semaphorin 6A, Semaphorin 6B, Semaphorin 6C, Semaphorin 6D, Semaphorin 7A, Serpin A4, Serpin A5, Serpin B6, Serpin Fl, sFRP-3, SH2D1A, Shh-N, SHP-1, Siglec-10, Siglec-11, Siglec-2, Siglec-6, Siglec-7, Siglec-9, SIRP alpha, Sirtuin 1, Sirtuin 2, Sirtuin 5, SLAM, SLITRK5, Smad4, SMPD1, SorCS1, SorCS2, SorCS3, Sortilin, SOST, SOX15, SOX2, SOX7, SOX9, SP-D, SPHK1, Spinesin, SPINK1, SR-AI, SREC-I, SREC-11, ST3GAL1, ST6GAL 1, ST8SIA1, Stabilin-2, SUL T2A1, Syndecan-3, Syndecan-4, Syntaxin 4, Syntaxin 6, TACE, TAFA1, TAFA2, TAFAS, TARC, TAZ, TCN2, TC-PTP, TECK, Tenascin R, Testican 2, TFF3, TFPI, TFPI-2, TGFa, TGFb1, TGFb2, TGFb3 FOLR2, TGFbl, TGM3, TGM4, THAP 11, Thrombomodulin, Thrombospondin-2, Thrombospondin-5, THSD1, Thyroglobulin, Thyroid Peroxidase, Tie-1, Tie-2, TIM-1, TIM-3, TIMP-2, TLR1, TLR2, TLR3, TLR4, TNF R1, TNF RII, TNF4, TNFb, TPO, TPP1, TPST2, TRACP, TRAIL, TRAIL R1, TRAIL R3, TRAIL R4, TRANCE, Transferrin, TREM-1, TREM-2, TREML 1, TrkC, TROP-2, Troponin C, TROY, Trypsin 1, Trypsin 3, TSH, TSK, TSLP, TSLP R, TSP-1, TWEAKR, Ubiquitin+1, UCH-L3, ULBP-1, ULBP-2, ULBP-3, ULBP-4, UNC5H3, UNC5H4, uPA, uPAR, Uromodulin, VAMP-1, VAMP-2, VAP-A, VCAM-1, VE-Cadherin, VEGF R1, VEGF R2, VEGF R3, VEGF-C, Visfatin, vWF-A2, WIF-1, WISP-1, Wnt-4, XEDAR, and XIAP.

16. The method of claim 14, wherein the therapeutic bone marrow MSC secretome composition further comprises one or more of the following nucleic acids: hsa-let-7a-5p, hsa-let-7b-5p, hsa-let-7c-5p, hsa-let-7d-3p, hsa-let-7e-5p, hsa-let-7g-5p, hsa-let-7i, hsa-let-7i-5p, hsa-miR-100-5p, hsa-miR-103a-3p, hsa-miR-106a-5p, hsa-miR-106b-5p, hsa-mir-10b, hsa-miR-10b-5p, hsa-mir-1246, hsa-miR-1246, hsa-miR-125a-5p, hsa-miR-125b-5p, hsa-miR-130a-3p, hsa-miR-130b, hsa-miR-130b-3p, hsa-miR-132-3p, hsa-miR-136-5p, hsa-miR-138-5p, hsa-miR-139-5p, hsa-mir-140, hsa-miR-140-3p, hsa-miR-145-5p, hsa-mir-146a, hsa-miR-146a-5p, hsa-miR-148a-3p, hsa-miR-152-3p, hsa-miR-15a-5p, hsa-miR-15b-5p, hsa-mir-16-1, hsa-miR-16-2, hsa-miR-16-5p, hsa-miR-1'7-5p, hsa-miR-181a-5p, hsa-miR-191-5p, hsa-miR-193a-5p, hsa-miR-193b-3p, hsa-miR-19'7-3p, hsa-miR-199a-3p, hsa-miR-199a-5p, hsa-miR-199b-5p, hsa-miR-19a-3p, hsa-miR-19b-3p, hsa-miR-20a-5p, hsa-mir-203a, hsa-miR-203a-3p, hsa-miR-214-3p, hsa-mir-21, hsa-miR-21-3p, hsa-miR-21-5p, hsa-miR-221, hsa-miR-21-3p, hsa-mir-222, hsa-miR-222-3p, hsa-miR-22-3p, hsa-miR-23a-3p, hsa-miR-23b-3p, hsa-mir-24-1, hsa-mir-24-2, hsa-miR-24-3p, hsa-mir-25, hsa-miR-25-3p, hsa-miR-26a-p, hsa-miR-27a-3p, hsa-mir-27b, hsa-miR-27b-3p, hsa-miR-29a-3p, hsa-miR-29c-3p, hsa-miR-30a-5p, hsa-miR-30a-5p, hsa-miR-30b-5p, hsa-miR-30c-5p, hsa-miR-30d, hsa-miR-30d-5p, hsa-mir-30e, hsa-miR-30e-5p, hsa-miR-3l-3p, hsa-miR-31-5p, hsa-miR-320a, hsa-miR-342-3p, hsa-miR-345-5p, hsa-miR-34a-5p, hsa-miR-361-5p, has-miR-376a-3p, hsa-miR-376c-3p, hsa-miR-423-3p, hsa-miR-423-

5p, hsa-miR-424-5p, hsa-miR-484, hsa-mir-486-1, hsa-mir-486-2, hsa-miR-486-5p, hsa-miR-570-3p, hsa-miR-574-3p, hsa-miR-663a, hsa-miR-874-3p, hsa-mir-92a-1, hsa-mir-92a-2, hsa-miR-92a-3p, hsa-miR-92b-3p, hsa-mir-93, hsa-miR-93-5p, hsa-miR-940, hsa-miR-99a-5p, and has-miR-99b-5p.

17. The method of claim 14, wherein (i) the subject has been diagnosed with perianal fistula for at least six months, (ii) the subject has had at least one previous medical therapy within one year, or (iii) both (i) and (ii).

18. The method of claim 17, wherein the at least one previous medical therapy comprises one or more of: antibiotics, immunomodulators, monoclonal antibodies, small molecule inhibitors, or any combination thereof.

19. A method of treating perianal fistula in a subject having Crohn's disease or ulcerative colitis, the method comprising administering to the subject a composition comprising a therapeutic bone marrow MSC secretome composition made by a method comprising:
   (a) culturing bone marrow-derived MSCs under the following conditions to produce a bone marrow MSC conditioned media:
      (i) oxygen tension below 5%; and
      (ii) culture media having a pH below 7;
   (b) harvesting the bone marrow MSC conditioned media; and
   (c) formulating the bone marrow MSC conditioned media to produce the therapeutic bone marrow MSC secretome composition, wherein the therapeutic bone marrow MSC secretome composition comprises proteins and extracellular vesicles produced by the bone marrow-derived MSCs in (a).

* * * * *